United States Patent [19]
Nakamichi

[11] Patent Number: 6,125,090
[45] Date of Patent: Sep. 26, 2000

[54] DISK TRANSFERRING DEVICE

[75] Inventor: Niro Nakamichi, Tokyo, Japan

[73] Assignee: Nakamichi Corporation, Japan

[21] Appl. No.: 08/644,718

[22] Filed: May 10, 1996

[30] Foreign Application Priority Data

May 13, 1995 [JP] Japan .................................. 7-138484

[51] Int. Cl.[7] .............................................. G11B 33/02
[52] U.S. Cl. ...................................... 369/75.2; 369/77.1
[58] Field of Search ................................ 369/75.1, 75.2, 369/77.1, 77.2, 178, 191, 258, 263

[56] References Cited

U.S. PATENT DOCUMENTS

| | | | |
|---|---|---|---|
| 4,507,768 | 3/1985 | Ikedo et al. | 369/77.1 |
| 4,539,670 | 9/1985 | Inaba et al. | 369/77.1 |
| 4,677,607 | 6/1987 | Ejiri | 369/77.1 |
| 4,829,502 | 5/1989 | Aoyagi et al. | 369/77.1 |
| 4,979,160 | 12/1990 | Araki | 369/75.2 |
| 5,166,917 | 11/1992 | Decoster et al. | 369/77.1 |

FOREIGN PATENT DOCUMENTS 0206831  12/1986  European Pat. Off. ............. 369/77.1

Primary Examiner—Stuart S. Levy
Assistant Examiner—Tod Kupstas
Attorney, Agent, or Firm—Morrison Law Firm

[57] ABSTRACT

A disk changer employs two disk guides to support a recorded disk at opposite points along its edge. One of the disk guides has a belt that revolves around two pulleys. A surface of the belt frictionally engages an edge surface of the disk. The other disk guide has two surfaces, a low-friction guide surface parallel to the recorded surface of the disk and a resilient sloped surface that forms an angle with both the recorded surface of the disk and the perpendicular to the recorded surface of the disk. Both guides are urged together, and, as a result, the sloped surface is urged against the disk edge. Because of the slope of the surface, the sloped surface meets a corner where the recorded surface of the disk meets the edge surface of the disk and urges the disk's recorded surface toward the guide surface. This stabilizes the disk against pitching motion.

31 Claims, 71 Drawing Sheets

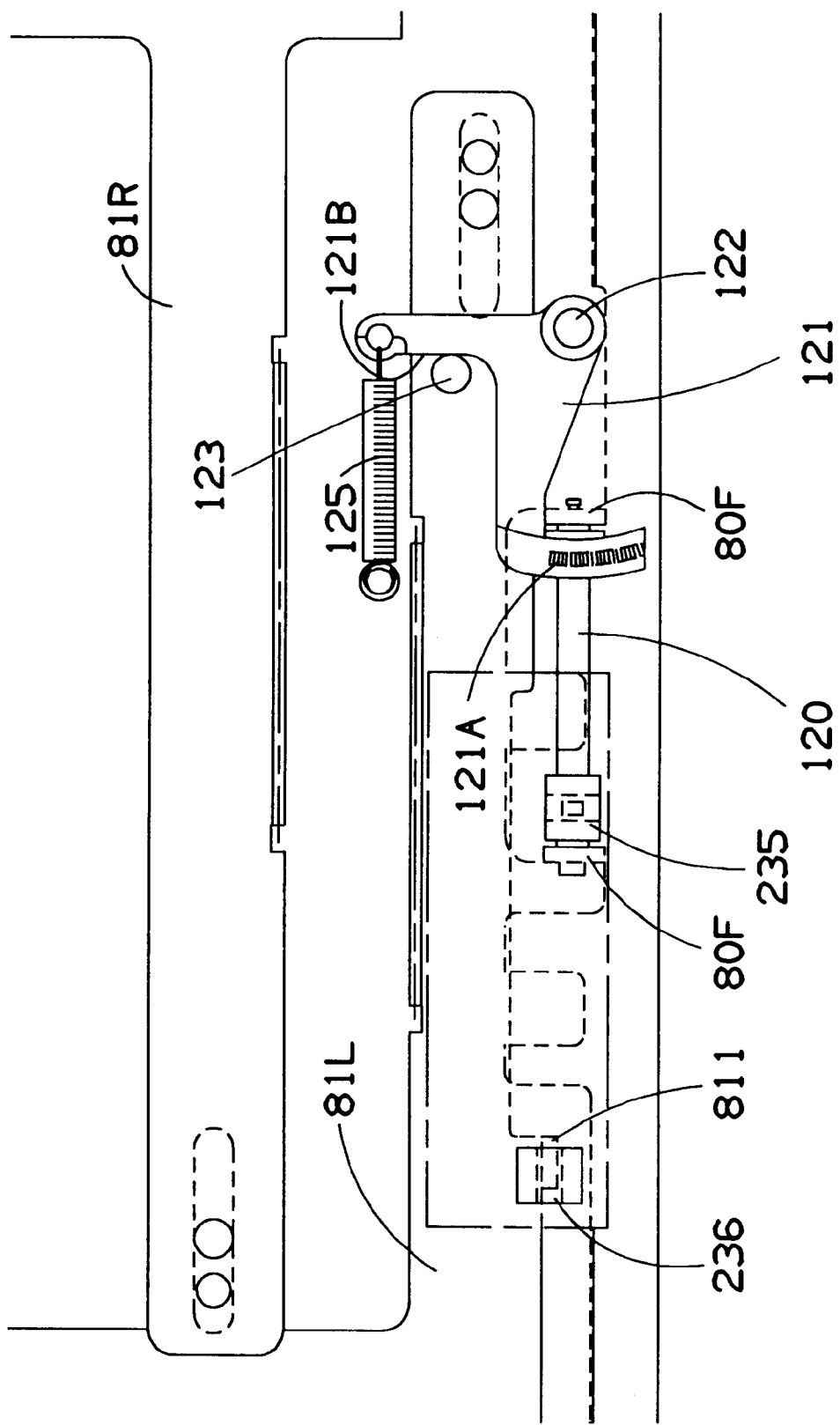

DISK TRANSFERRING DEVICE

BACKGROUND OF TE INVENTION

The present invention relates to a disk transferring device for transferring a disk by supporting the edge of the disk.

Known disk transferring devices that transfer a disk supported at its edge are described in Japanese utility model laid-open publication number 60-106250, Japanese laid-open publication number 2-7263, Japanese laid-open publication number 61-210556 (U.S. Pat. No. 4,682,320), and other references. The disk transfer devices proposed in Japanese utility model laid-open publication number 60-106250 and Japanese laid-open publication number 2-7263, have a pair of belts that support the edge of a disk. The disk is inserted through an aperture into the gap between the belts. The belts are revolved to transfer the disk from the aperture to a playback position. The disk transfer device proposed in Japanese laid-open publication number 61-210556 has a guide wall along a direction of disk transfer which supports one side of the disk at its edge and a roller on the other side. When the roller is rotated, the disk edge is rolled along the guide wall to transfer the disk from an insertion opening to a desired point inside the device.

The device described in Japanese utility model laid-open publication number 60-106250 uses belts that have a V-shaped cross-section. The disk edge fits into a channel defined by the V-shaped cross-section so that the disk is held in a defined position and orientation with respect to rotation about an axis parallel to the length of the belts (that is, "roll," from the standpoint of movement from the insertion aperture toward the inside of the device). The belts, however, do not provide sturdy support to prevent tilting of the disk about an axis in the plane of the disk and perpendicular to the length of the belts (ie, "pitch," from the standpoint of movement from the insertion aperture toward the inside of the device). In particular, external vibration during disk transfer can cause the front and the rear of the disk to be displaced (or shake) significantly as the disk moves This could cause the disk to catch on edges of other mechanisms inside the device, for example, the turntable or clamper. This could, in turn, damage the disk or cause the device to malfunction.

Other devices described in the publications do not restrict up/down movements at the front and the rear of the disk either, so these devices have the same shortcoming.

OBJECT AND SUMMARY OF THE INVENTION

The object of the present invention is to overcome the shortcomings of prior art belt-drive disk transfer devices.

Another object of the invention is to provide a disk transfer guide that provides for pitch stability.

Briefly, a disk changer employs two disk guides to support a recorded disk at opposite points along its edge. One of the disk guides has a belt that revolves around two pulleys. A surface of the belt frictionally engages an edge surface of the disk. The other disk guide has two surfaces, a low-friction guide surface parallel to the recorded surface of the disk and a resilient sloped surface that forms an angle with both the recorded surface of the disk and the perpendicular to the recorded surface of the disk. Both guides are urged together, and, as a result, the sloped surface is urged against the disk edge. Because of the slope of the surface, the sloped surface meets a corner where the recorded surface of the disk meets the edge surface of the disk and urges the disk's recorded surface toward the guide surface. This stabilizes the disk against pitching motion.

According to an embodiment of the present invention, there is provided, a disk transfer device for transporting a recorded disk with a recorded surface, a back surface opposite the recorded surface, and an edge surface running around a perimeter of the disk, comprising: a first longitudinal guide having a first surface oriented to engage the edge surface at a first portion of the edge surface, a second longitudinal guide having a second surface oriented to engage the edge surface at a second portion of the edge surface opposite the first portion of the edges surface, the first longitudinal guide having a guide surface parallel to a direction of travel of the disk, the guide surface also being parallel to the recorded surface and a resilient element attached to the first longitudinal guide positioned to urge one of the recorded surface and the back surface against the guide surface.

According to another embodiment of the present invention, there is provided, a disk transfer device for transporting a recorded disk with a recorded surface, a back surface opposite the recorded surface, and an edge surface running around a perimeter of the disk, comprising: a longitudinal guide having a first surface oriented to engage the edge surface, an urging mechanism and a second surface, both being oriented to engage the disk and urge the edge surface against the first surface, the longitudinal guide having a guide surface parallel to a direction of travel of the disk, the guide surface also being parallel to the recorded surface and the first surface being nonparallel with the edge surface of the disk.

According to still another embodiment of the present invention, there is provided, a disk transporting device for transporting a disk, with an edge, a recorded surface, and a back surface opposite the recorded surface, from an insertion position to a first position of the device, comprising: first and second disk transfer guides movably supported in the disk reader, the first disk transfer guide including first means for engaging a first portion of the edge, the second disk transfer guide including second means for engaging a second portion of the edge, means for urging the first and second disk transfer guides together distance apart so that the disk can be supported therebetween, at least one of the first and second disk transfer guides including drive means for moving the disk along the first and second disk transfer guides responsively to the separating, one of the first and second disk guides having an urging surface and a guiding surface and the urging surface having a sloped portion positioned to engage the edge at a corner thereof, the sloped portion being oriented to urge the disk toward the other of the first and second disk guides and also urge one of the recorded and back surfaces against the guide surface.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 55 is a top-view of the disk insertion error preventing mechanism while the loading plates are opening.

DETAILED DESCRIPTION OF THE PREFERRED EMBODIMENTS

In a preferred embodiment of the invention, four CD-ROMs are stored within a main chassis which also houses a CD-ROM changer for selective playback of the stored disks. The entire device conforms to standard dimensions for computer peripherals with a 5¼ inch half-height form factor.

Figure 1:
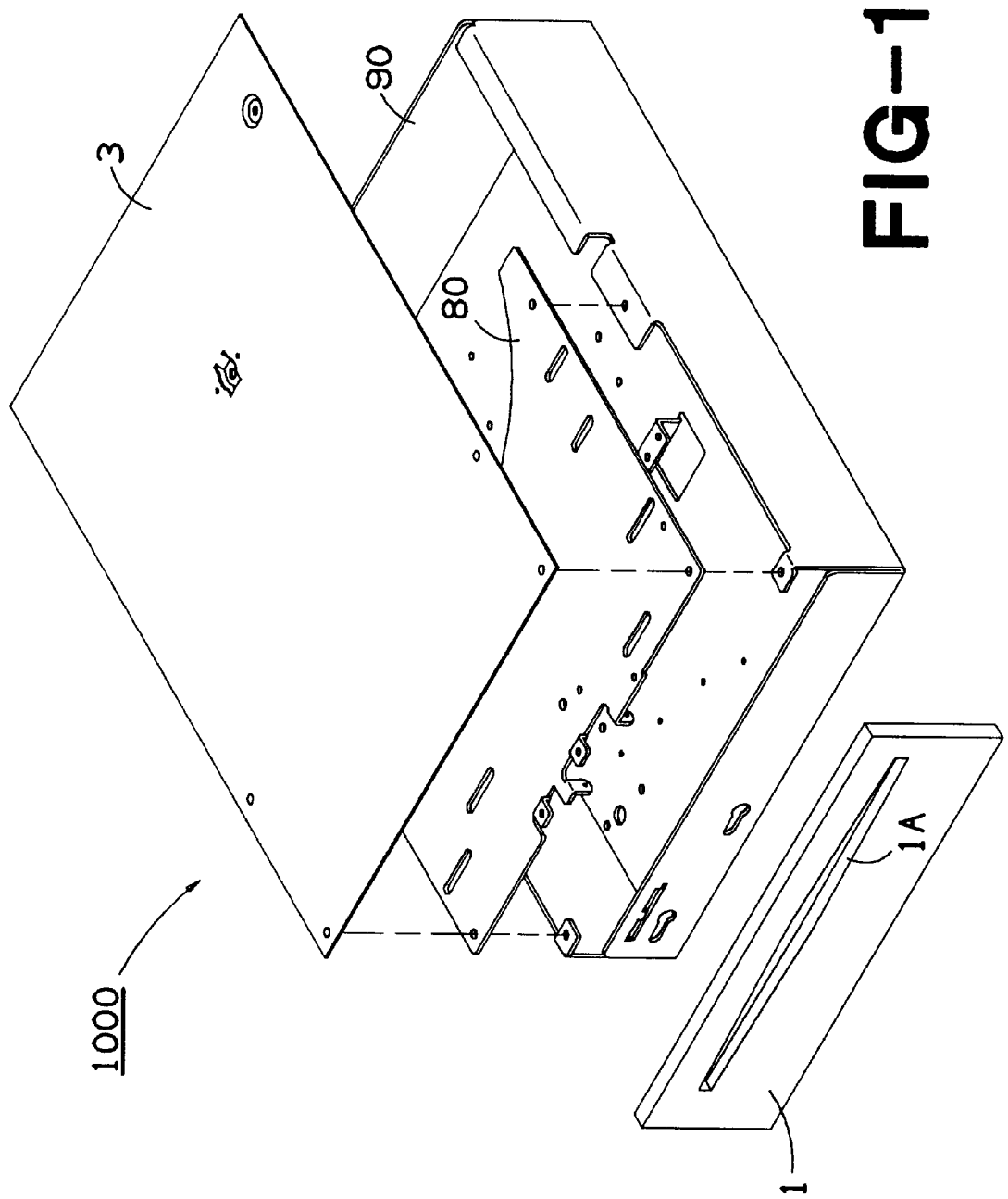
FIG. 1 is an exploded view of a chassis of a disk playback device according to an embodiment of the present invention.

Referring to FIG. 1, a housing 1000 of a disk player conforms to standard dimensions for computer peripherals having a 5¼ inch half-height form factor. Housing 1000 has outer dimensions, 41.5 mm height×146 mm width×209 mm depth. The disk player includes a disk changer that stores four Cds for selective playback. Housing 1000 is generally box-shaped with four sides, a lower panel, and a top cover 3. A loading chassis 80 is attached to integral mounting brackets of two sides of main chassis 90 between top cover 3 and the lower panel of main chassis 90. Top cover 3 may be omitted when the disk player is mounted on a front panel of a computer (not shown in the drawings).

A front panel 1 is attached to a front one of the four sides of main chassis 90. Front panel 1 has an insertion aperture 1A for receiving and ejecting disks. Insertion aperture 1A is wider toward its center than at its ends. The shape of insertion aperture 1A insures that only the edges of disks contact front panel 1 when disks are inserted and removed. Therefore, recording surfaces of disks are prevented from contacting front panel 1, eliminating a potential cause of damage to disks during insertion and removal.

Figure 2:
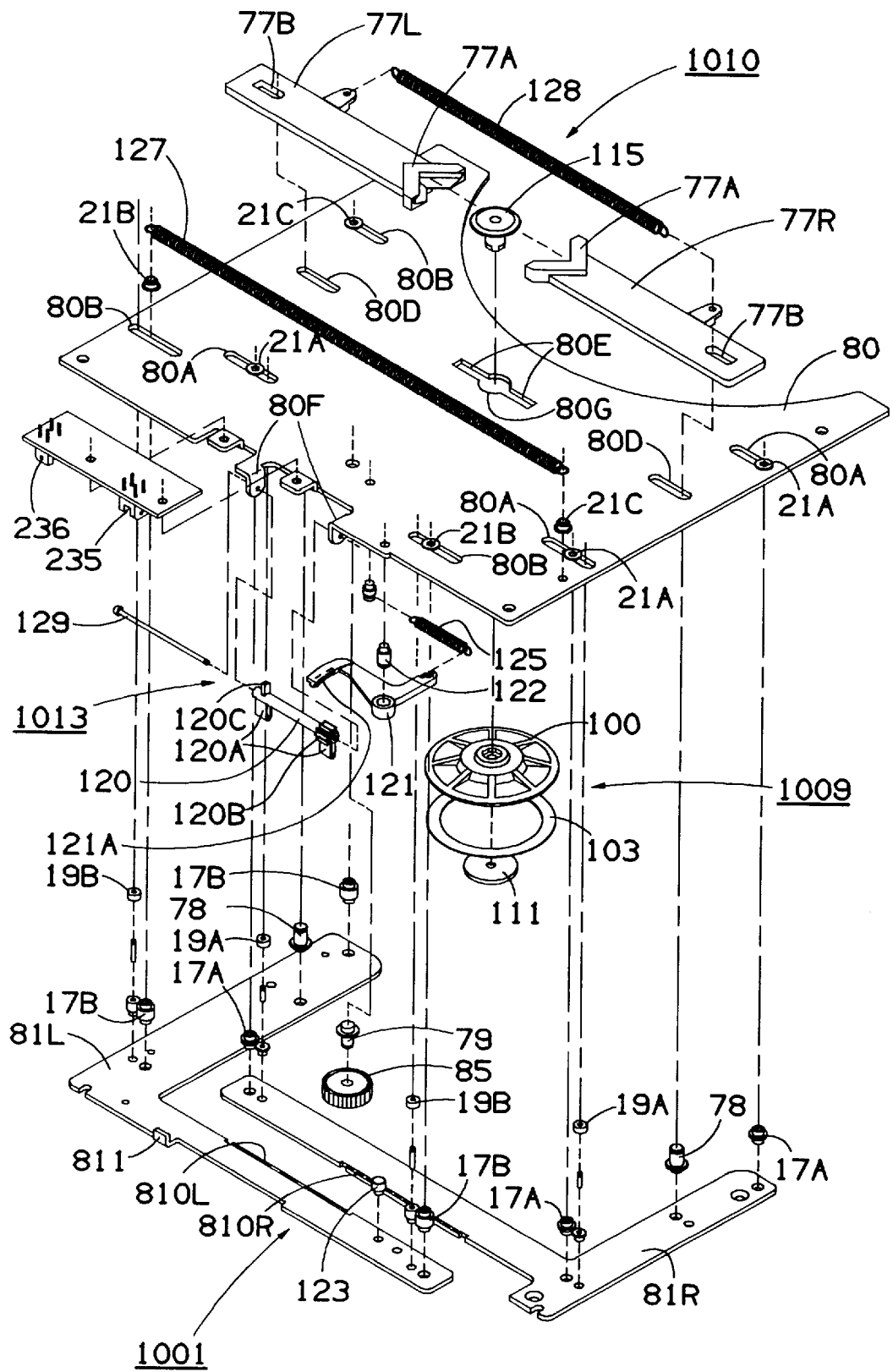
FIG. 2 is an exploded view of mechanisms attached to a loading chassis according to an embodiment of the present invention.
Figure 3:
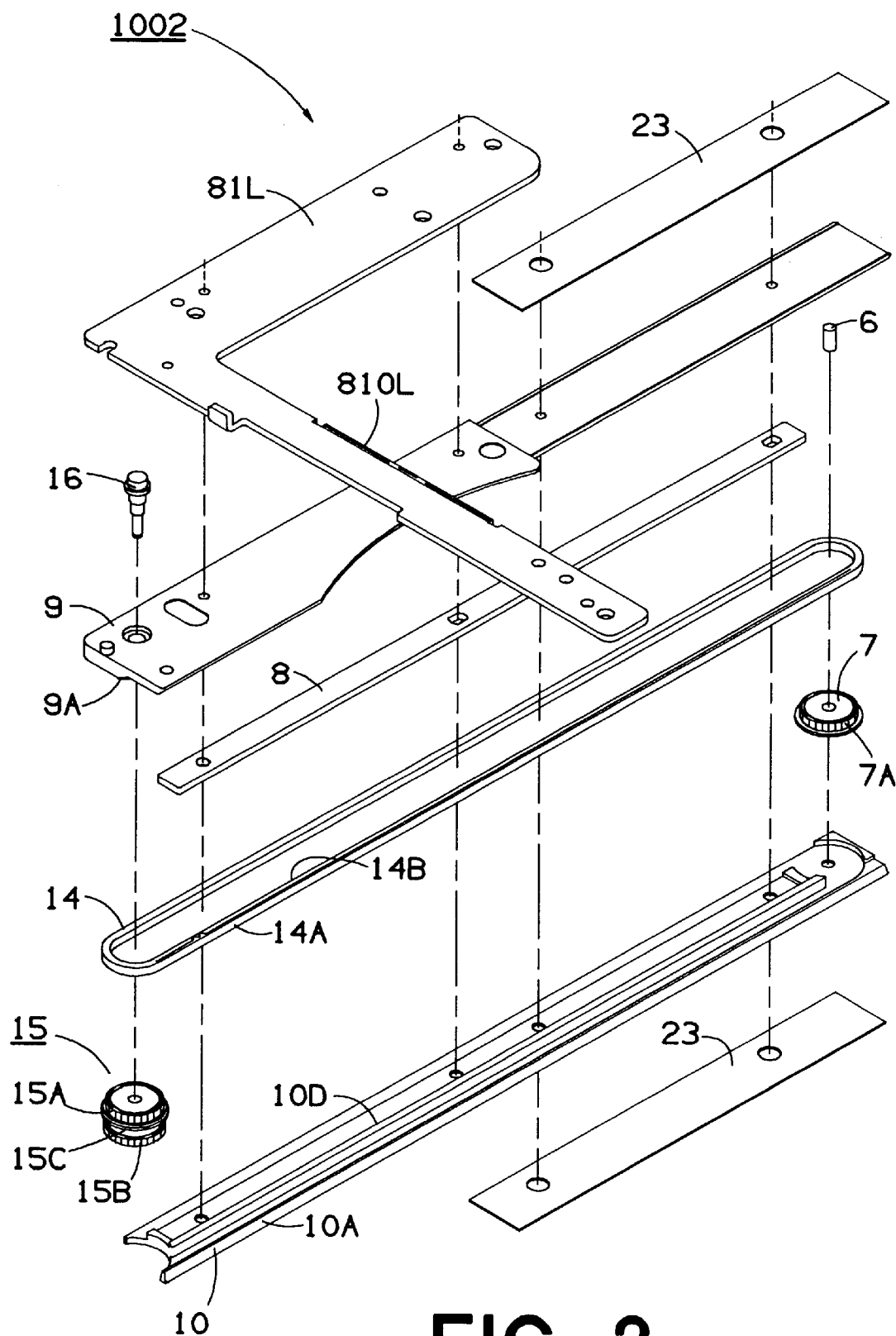
FIG. 3 is an exploded view of a drive-side disk guide according to an embodiment of the present invention.
Figure 4:
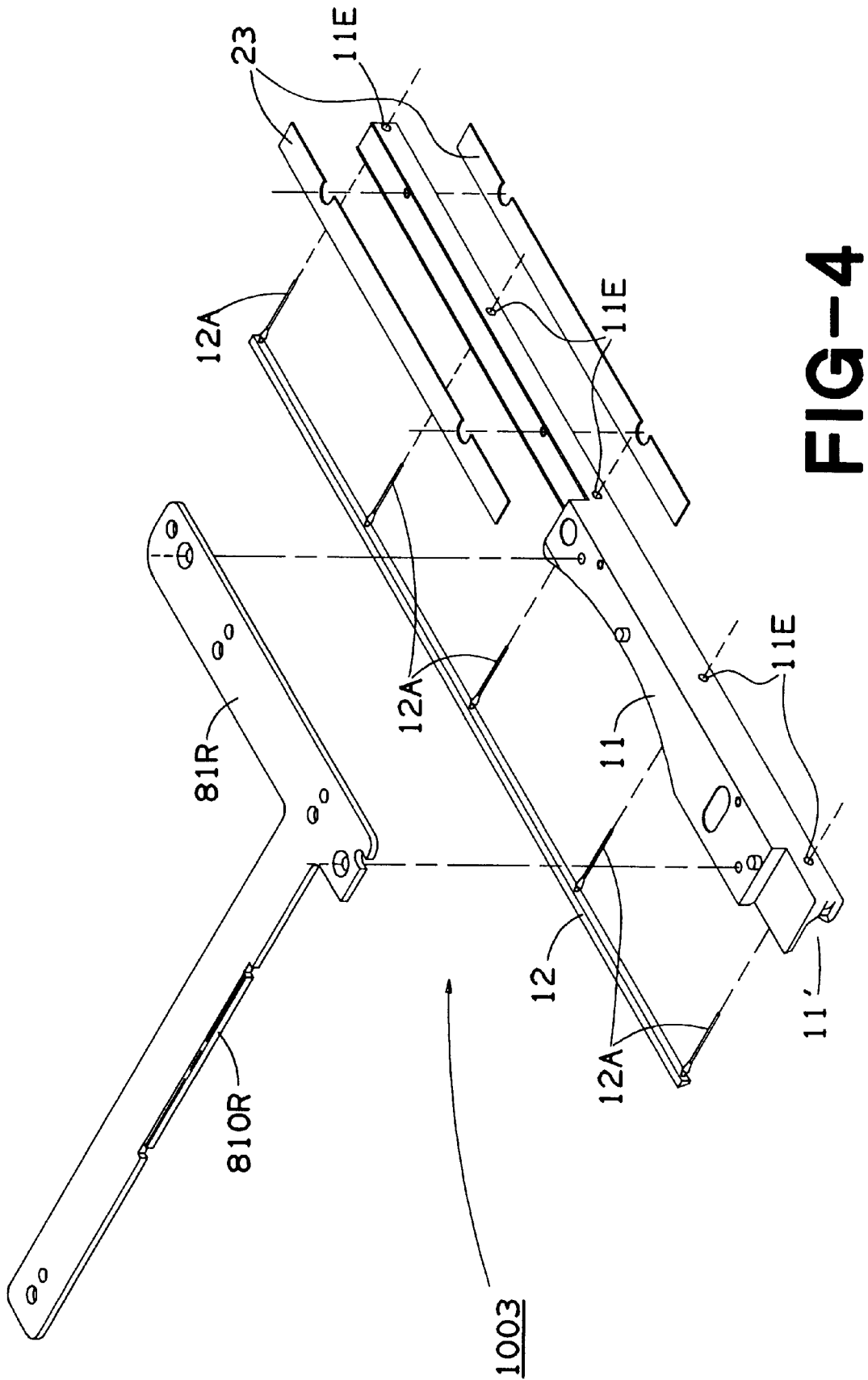
FIG. 4 is an exploded view of a fixed disk guide according to an embodiment of the present invention.

Referring to FIGS. 2–4, a disk transfer mechanism 1001 includes a drive-side disk guide 1002, slidably mounted on a lower side of loading chassis 80 on a left side of housing 1000. A fixed-side disk guide 1003 is slidably mounted on the lower side of loading chassis 80 toward a right side of housing 1000. L-shaped loading plates 81L and 81R hang on support pins 17A and 17B attached to their upper surfaces, respectively. Support pins 17A and 17B pass through respective transverse guide grooves 80A and 80B in loading chassis 80. Rings 21A and 21B, at ends of support pins 17A and 17B, respectively, prevent support pins 17A and 17B from slipping out of guide grooves 80A and 80B. Fixed and drive-side disk guides 1003 and 1002 attach to L-shaped loading plates 81R and 81L, respectively, thereby permitting fixed and drive-side disk guides 1003 and 1002, move transversely on the bottom of loading chassis 80.

Guide rollers 19A and 19B, rotatably mounted on upper surfaces of loading plates 81L and 81R, travel in guide grooves 80A, 80B in loading chassis 80. Guide rollers 19A, 19B fit closely within guide grooves 80A, 80B. Thus, guide rollers 19A and 19B insure accurate alignment of loading plates 81L and 81R throughout their respective ranges of movement. Support pins 17A are shorter than support pins 17B so that loading plate 81R is guided at a position closer to loading chassis 80 than loading plate 81L, permitting loading plates 81L and 81R to overlap.

Respective opposing sides of loading plates 81L and 81R have integral racks 810L and 810R A pinion gear 85, which rotates on the bottom surface of loading chassis 80, engages with racks 810L and 810R. When loading plate 81L moves laterally, pinion gear 85 rotates in a direction that forces loading plate 81R to move an equal distance in the opposite direction of loading plate 81L. A spring 127 strung between a ring 21B on an upper portion of support pin 17B of loading plate 81L and pin 21C on an upper surface of loading chassis 80, urges loading plates 81L and 81R toward each other.

Figure 58:
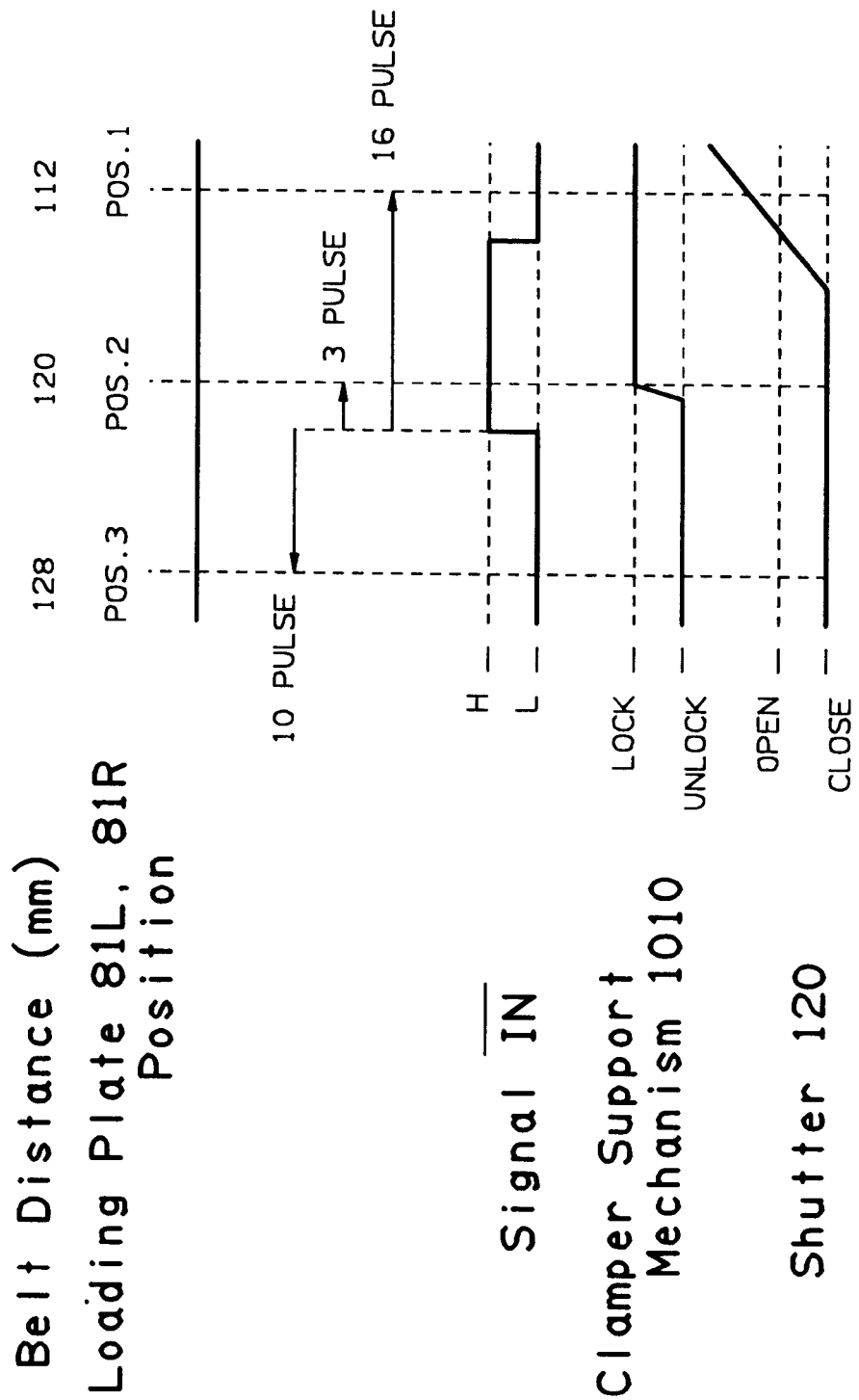
FIG. 58 is a timing chart showing the states of the other mechanisms that operate in conjunction with loading plates 81L, 81R.

A bent portion of loading plate 81L forms an integral shutter piece 811 in loading plate 81L toward the front of housing 1000. Shutter piece 811 interrupts a light beam generated, and detected, by an optical sensor 236 on the front end of loading chassis 80. Disks are supported between fixed and drive-side disk guides 1003 and 1002. Thus the mutual spacing of fixed and drive-side disk guides 1003 and 1002 indicates whether there is a disk supported between them. Optical sensor 236 is positioned so that the light beam is broken when a disk is supported between timing and friction belts 14 and 12. Referring also to FIG. 58, a signal $\overline{IN}$, which is output by optical sensor 236, goes high (H) when a 120 mm disk is inserted separating between timing and friction belts 14 and 12 causing them to separate a distance in the range 114 mm–122 mm. Thus, signal $\overline{IN}$ indicates the presence of a disk.

Figure 5:
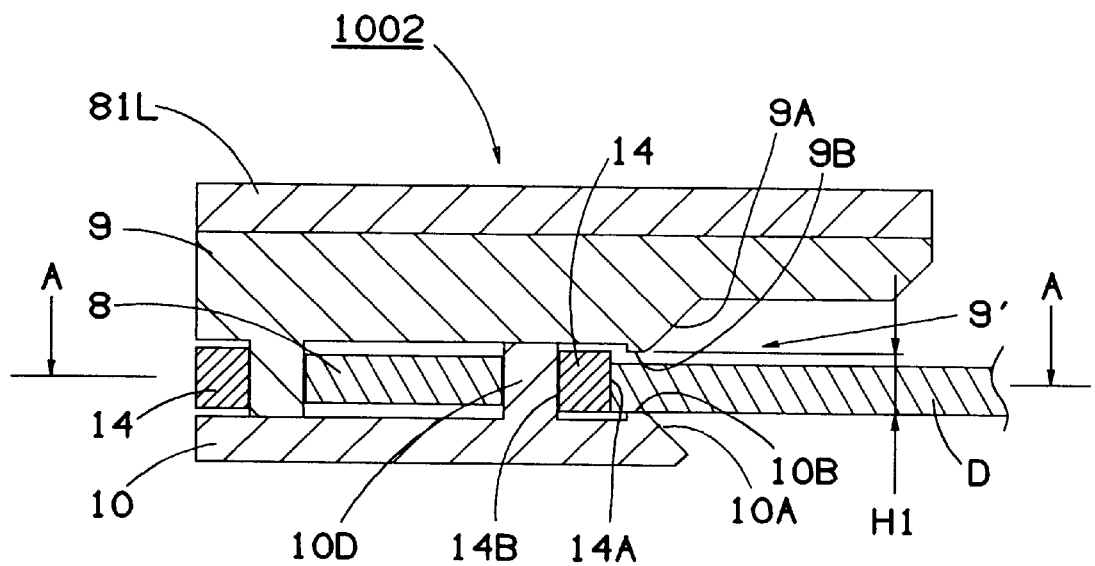
FIG. 5 is a schematic side-view of a drive-side disk guide according to an embodiment of the present invention.
Figure 72:
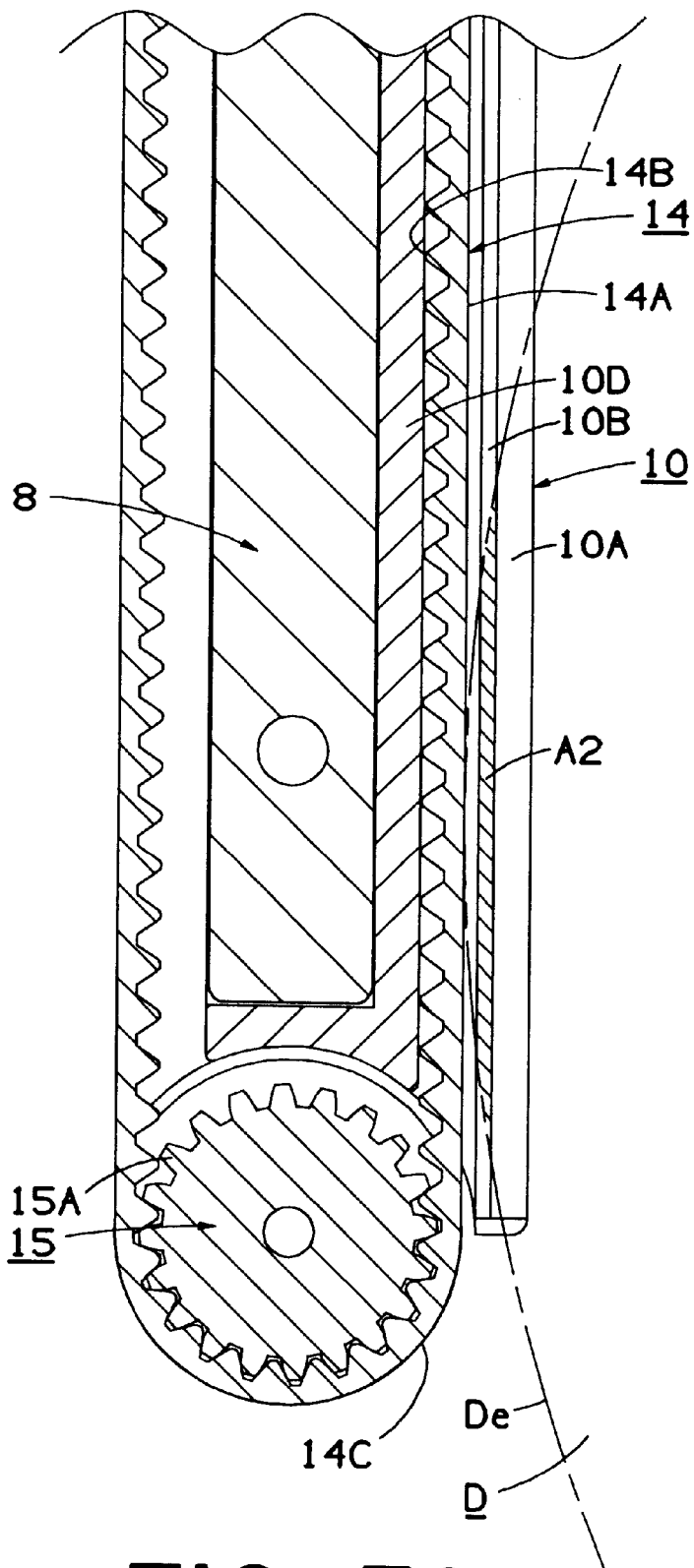
FIG. 72 is a side-view of the drive-side disk guide.

Referring to FIGS. 3 and 5, drive-side disk guide 1002 includes an upper disk guide 9 of a resin having a low friction coefficient such as Duracon. A lower surface of upper disk guide 9 forms an upper half of a guide groove 9', which guides the edge of the inserted disk on the left side of housing 1000. A sloped surface 9A, with a slope of 45 degrees, runs longitudinally on a lower surface of upper disk guide 9. A projection 9B, on a bottom end of sloped surface 9A, engages the upper surface of the disk edge. A sloped surface 10A, running longitudinally on a lower disk guide 10, slopes at a 45-degree angle in a direction opposite that of sloped surface 9A. A projection 10B on an upper end of sloped surface 10A engages a lower surface of the disk edge. A gap of 1.5 mm width (H1), between projection 9B and projection 10B, is slightly wider than the thickness of a disk (1.2 mm) so that the disk edge is guided precisely. Referring no also to FIG. 72, projections 9B and 10B engage with upper and lower sides Du, Dl of the disk at a portion A2 (indicated by hatching), which is outside of the data recording radius of the disk. This prevents read errors even if there is appreciable abrasion of this region of the disk caused by rubbing against projections 9B and 10B.

A timing pulley 15 rotates on a shaft 16 on a forward end of upper disk guide 9. Shaft 16 projects through the lower surface of upper disk guide 9. Another shaft 6 projects upwardly from the tipper surface of lower disk guide 10 at its rear end. Another timing pulley 7 rotates on shaft 6. A timing belt 14 is stretched between timing pulleys 15 and 7 to form a loop with a long axis of the loop being parallel to a direction of transport of disk D. An inside surface of timing belt 14 has teeth or serrations. Outside surfaces of timing pulleys 15 and 7, adjacent corresponding portions of the inside surface of timing belt 14, also have teeth or serrations to engage the teeth or serrations of timing belt 14, thereby preventing slippage of timing belt 14 with respect to timing pulleys 15 and 7.

Timing belt 12, which engages the right-side of the disk edge urges the left side of the disk edge against a surface 14A of timing belt 14. This would ordinarily tend to cause flexible timing belt 14 to bow, forcing it to one side. If timing belt 14 bowed under this lateral force, this would tend to cause disk D to follow a non-straight course toward the rear of the device since friction belt 12 is supported flat. Disk transfer distance is determined based on the displacement of timing pulley 15, flexure in belt 12 so this effect can lead to errors or, at least, complicate displacement measurement.

Referring momentarily to FIG. 72, lower disk guide 10 has a regulating wall 10D that slides against tooth surface 14B of timing belt 14. This prevents timing belt 14 from flexing inward when disk D is supported by it. A metal plate 8 is positioned between disk guide 9 and disk guide 10 to reinforce disk guides 9 and 10, which are of resin. Disk protection sheets 23 are attached to the top and bottom surfaces of the rear side of disk guides 9, 10 in order to prevent damage to disks within a stocker 1011 which are close to disk guides 9, 10.

Figure 7:
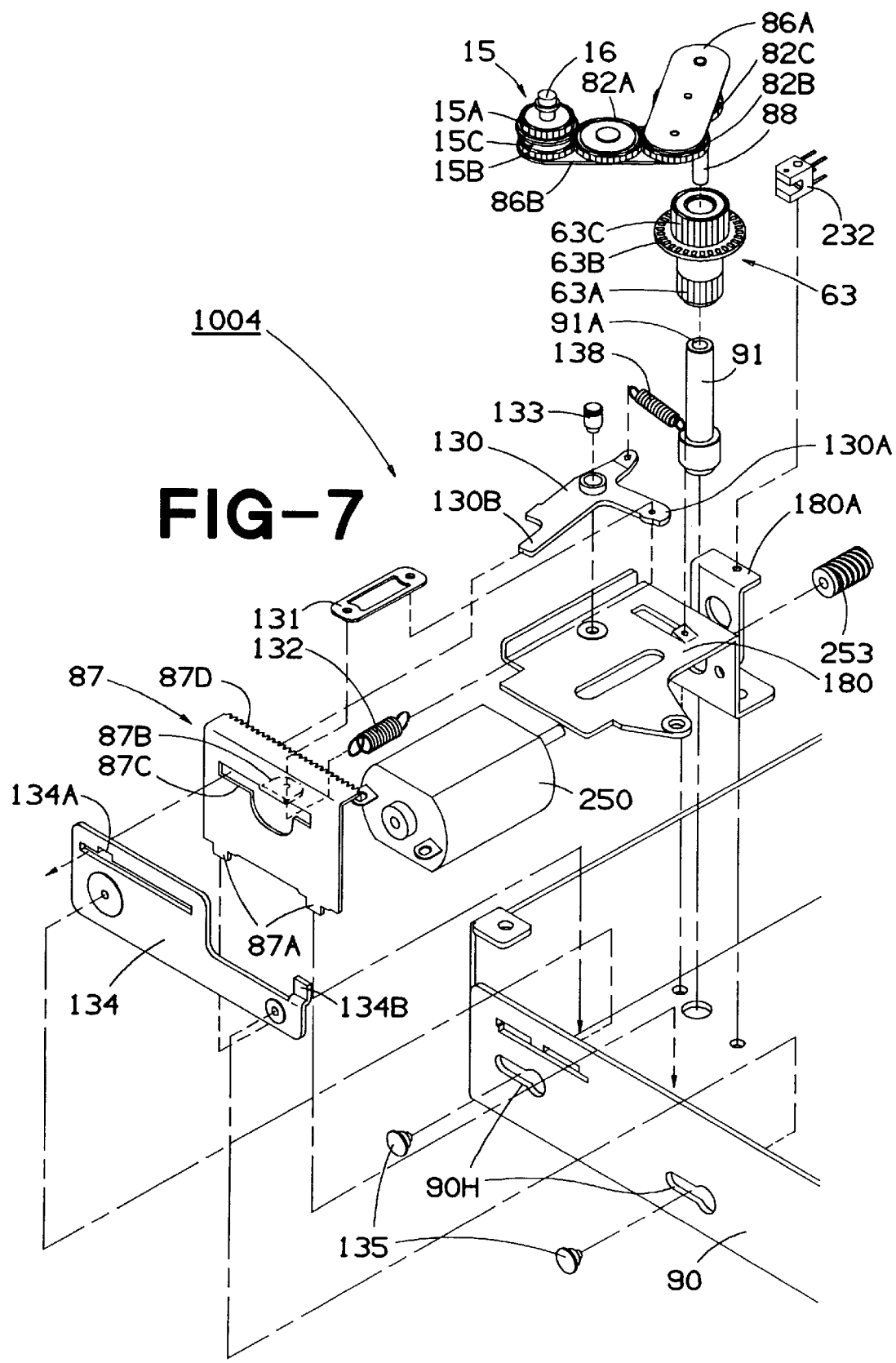
FIG. 7 is an exploded view of the configuration of an open/close mechanism for loading plates according to an embodiment of the present invention.

Referring now to FIG. 7, a loading plate open/close mechanism 1004, includes a motor 250 fixedly attached to main chassis 90 on a bracket 180. A worm gear 253 is press-fitted to a rotating shaft of drive motor 250. A gear member 63 rotates on shaft 91 attached to main chassis 90. Gear 63A on a lower portion of gear member 63, engages worm gear 253. Plate 86A is fixed to a shaft 88 which fits in a center hole 91A of shaft 91, allowing plate 86A to swing freely. A gear 82B rotates on a shaft hingeably interconnecting plates 86A and 86B. Timing pulley 15 rotates on shaft 16 protruding from a distal end of plate 86B. An intermediate gear 82C, rotating at a middle of plate 86A, meshes with both gear 63C, on an upper portion of gear member 63, and gear 82B, thereby transmitting rotation of the shaft of motor 250 to gear 82B. Rotation of gear 82B is further transmitted to timing pulley 15 by a gear 82A that rotates on a middle of plate 86B. Gear 82A meshes with gear 82B and a gear 15B on a lower portion of timing pulley 15.

Referring momentarily to FIGS. 19–23, plates 86A, 86B pivot responsively the position of timing pulley 15 as timing pulley 15 moves transversely with drive-side disk guide 1002. Thus, the rotation of motor 250 is transmitted to timing pulley 15 by an extensible transmission without moving motor 250. With such an extensible transmission, there is no need for space for movement of a bulky motor. In addition, by having an extensible transmission instead of a movable motor and transmission, the mass and weight of the drive mechanism travelling with loading plate 81L is minimized, making it possible to use a weaker spring 127 to urge loading plates 81L and 81R medially together. Disk insertion is thereby made easier and more responsive. In addition, the pressure load on timing belt 14 and friction belt 12 is reduced.

Optical sensor 232 is attached to a bend in a bracket 180A attached to bracket 180. A shutter wheel 63B on the upper portion of gear member 63 periodically interrupts a light beam detected by optical sensor 232 as gear member 63 rotates. Optical sensor 232 generates a loading pulse signal, signal $\overline{\text{L. PULSE}}$. Because bowing of the timing belt 14 is prevented as discussed above, rotation of shutter wheel 63B is correlated in a predetermined way with movement of disk D. Therefore, signal $\overline{\text{L. PULSE}}$ can serve as an indication of disk movement During disk transfer, one pulse in signal $\overline{\text{L. PULSE}}$ indicates a movement of 0.5 mm of the disk in the present embodiment. The same signal $\overline{\text{L. PULSE}}$ also indicates the distance moved by loading plate 81L during an operation that is described below. In this operation, one pulse indicates that loading plate 81L has moved 0.314 mm.

Figure 6:
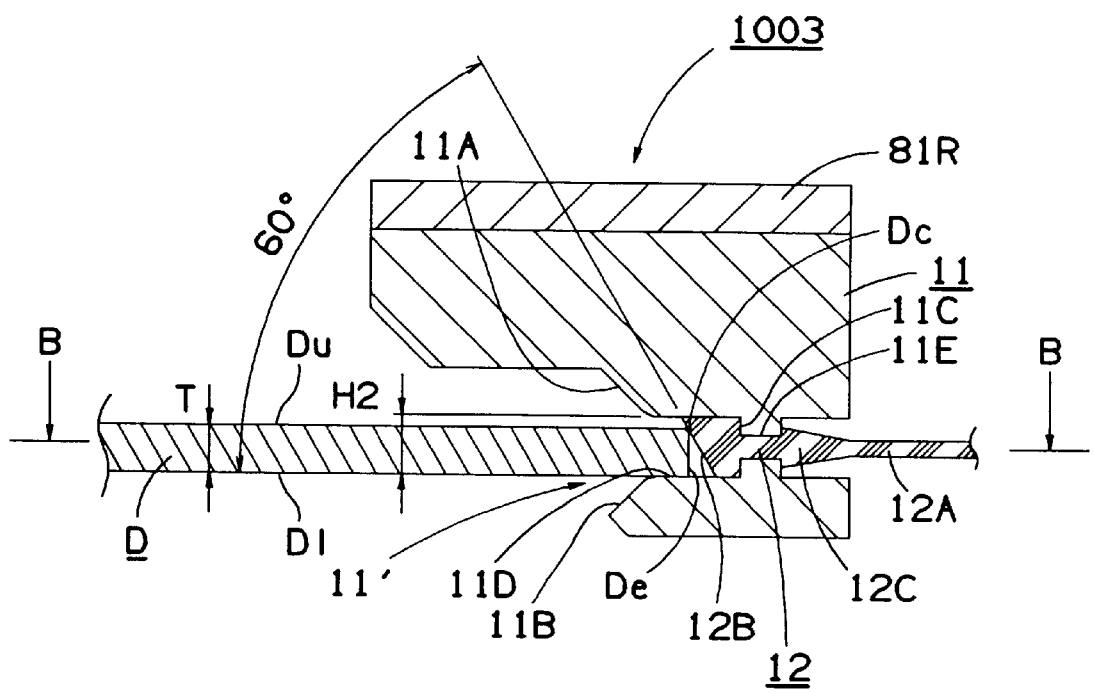
FIG. 6 is a schematic side-view of a drive-side disk guide according to an embodiment of the present invention.
Figure 8:
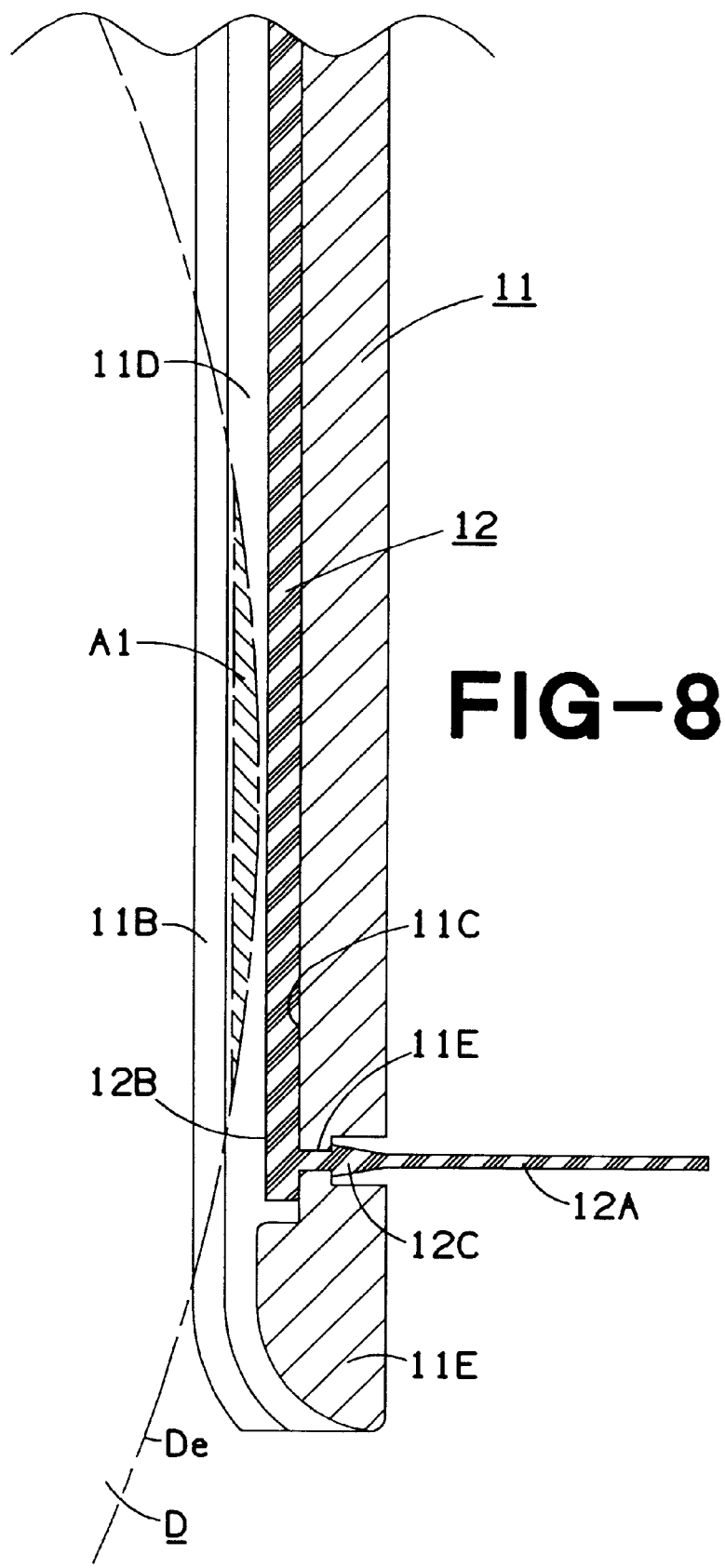
FIG. 8 is a schematic side-view of the fixed-side disk guide of FIG. 4.

Referring to FIGS. 4, 6 and 8, a fixed-side disk guide 1003, mainly of resin with a low coefficient of friction as for disk guides 9 and 10. A guide groove 11' runs lengthwise along disk guide 11. The right-side edge of disk D is held in and supported in guide groove 11'. Guide groove 11' has sloped surfaces 11A and 11B that run into a square-shaped groove 11C, into which disk D fits. A tapered disk guide 11E is held in groove 11C. The gap defined by groove 11C is 1.5 mm wide, which is substantially wider than the thickness of the disk, as is the case for guide groove 9'.

Friction belt 12, is of a material with a high coefficient of friction, such as resilient plastic or rubber. Friction belt 12 is fixedly attached to disk guide 11 to prevent any slippage of the friction belt 12. In the present embodiment, a plurality of integral whiskers 12A with stoppers 12C project from the right side of friction belt 12. Whiskers 12A insert into holes 11E on disk guide 11 and are passed through to the right side of guide 11. After friction belt 12 is attached, portions of whiskers 12A that project well beyond hole 11E are trimmed off.

The left side 12B of friction belt 12 forms a 60-degree angle with the horizontal. Sloped surface 12B engages with the coiner of disk D where disk D's upper surface Du and edge De meet. The force of a spring 127 (FIG. 2) presses disk D toward lower surface 11D of guide groove 11C. The smaller the incline angle of sloped surface 12B is, the stronger will be the pressure pushing the disk toward lower surface 11L). However, if the angle is too small, the force of spring 127 will cause the disk to become wedged between sloped surface 12B and lower surface 11D, interfering with smooth disk transfer. Tests performed by the applicant indicated that an incline angle of 45 degrees to 75 degrees are most desirable for sloped surface 12B, with an angle of approximately 60 degrees being optimal. The pressure from sloped surface 12B results in disk D coming into flat contact with lower surface 11D of groove 11C in the zone Al indicated by hatching, which extends along the front/rear direction of the disk. Because the disk is in firm contact with surface 11D along an extended portion of the side of its edge, a substantial degree of pitch stability of disk D is obtained ("pitch" being defined relative to the direction of disk transport from the insertion aperture toward the rear of the device). Pitch shaking/vibration/tilting are thus substantially eliminated so the disk D remains in a horizontal alignment regardless of external vibration.

Figure 13:
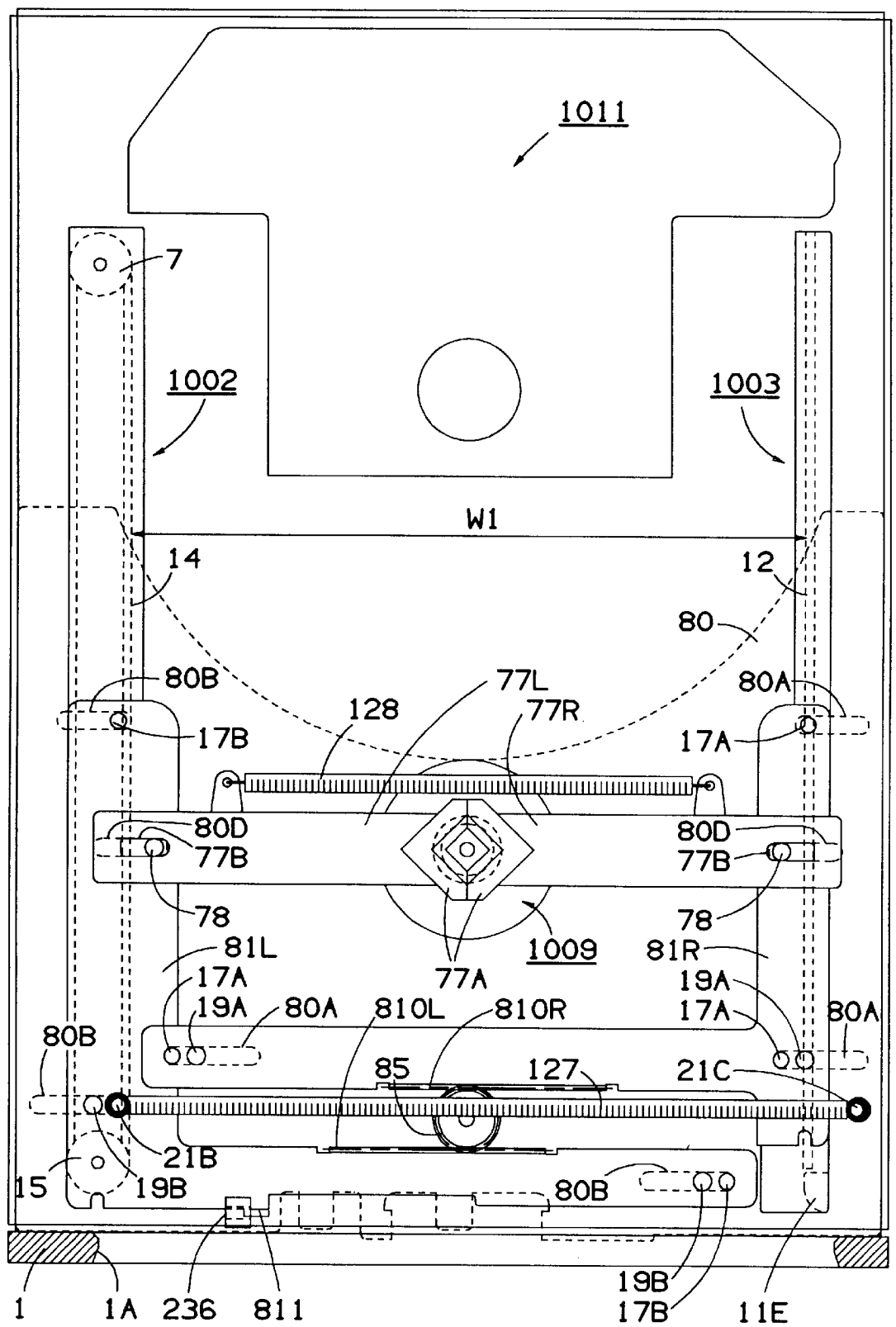
FIG. 13 is a top-view of disk transfer mechanism after a disk has been inserted according to an embodiment of the present invention.
Figure 18:
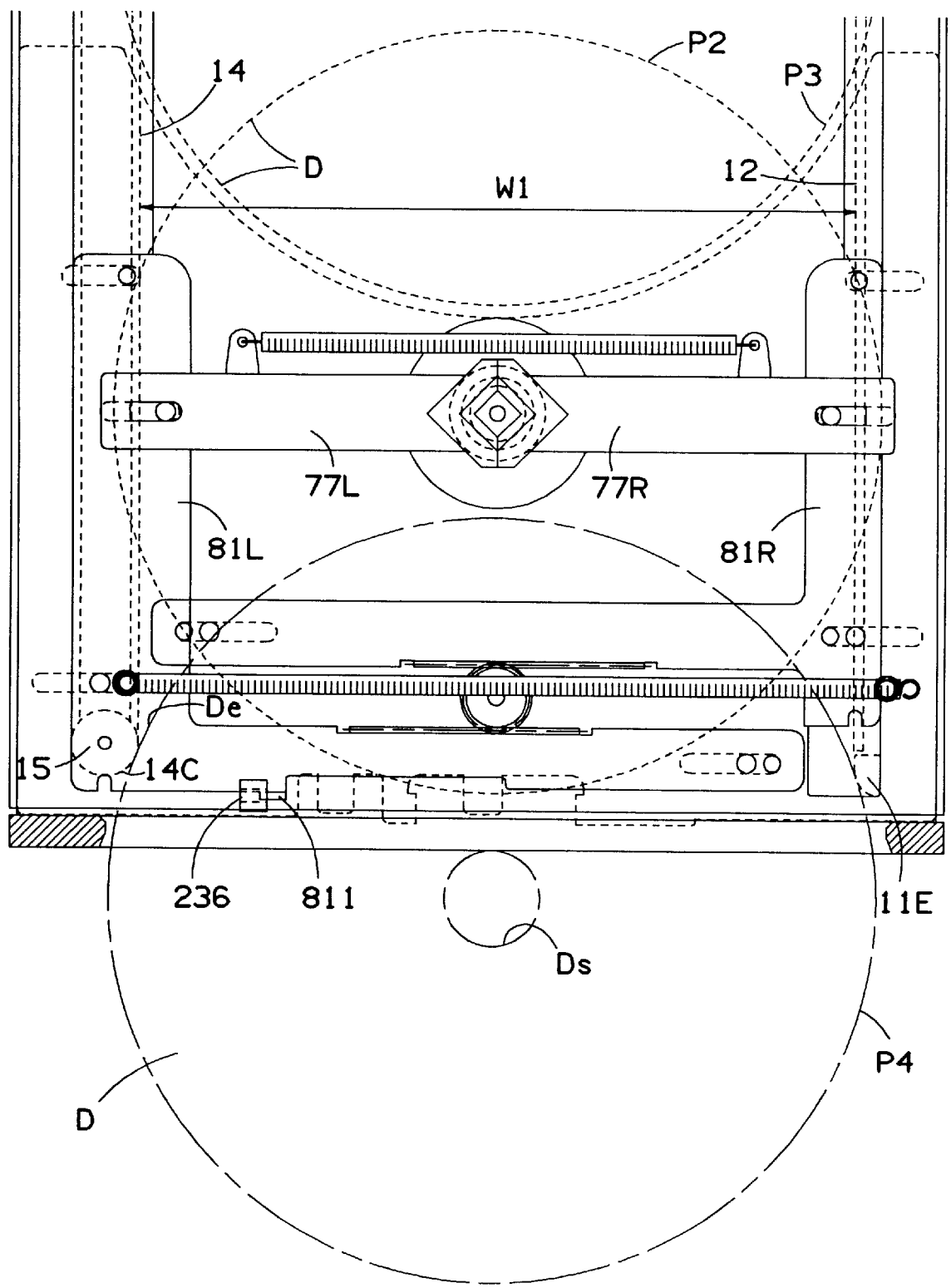
FIG. 18 is a top-view of the disk transfer mechanism in disk eject position E4.

Referring now to FIG. 13, when no disk is supported between drive-side and fixed-side disk guide 1002 and 1003, the force of spring 127 pulls support pins 17A and 17B together until they rest against the ends of guide grooves 80A and 80B, respectively. This places disk transfer mechanism 1001 in a disk receiving position (POS. 1). In the disk receiving position, loading plates 81L and 81R, attached to support pins 17A and 17B, respectively, are located at specified positions. The specified positions are such that the distance W1 between timing belt 14 and friction belt 12, which are supported by loading plates 81L and 81R, is 112 mm, which is narrower than a disk with a diameter of 120 nm. In disk transfer mechanism 1001, the position to which the disk can be transferred in the eject direction is determined by this minimum distance. The narrower the minimum distance, the further out the disk can be ejected from the disk insertion opening. However, if the minimum distance is made too narrow than necessary, disk insertion requires excessive force to be applied so that disk insertion is difficult or at least imparts an unnatural feel to the user. Referring to FIG. 18, this embodiment sets minimum distance W1 to 112 mm, which is precisely what is required to cause disk D to move far enough out that spindle hole Ds of disk D projects beyond front plate 1. This allows the user to grasp disk D by placing a finger in the spindle hole Ds and the thumb at edge De of disk D.

Figure 14:
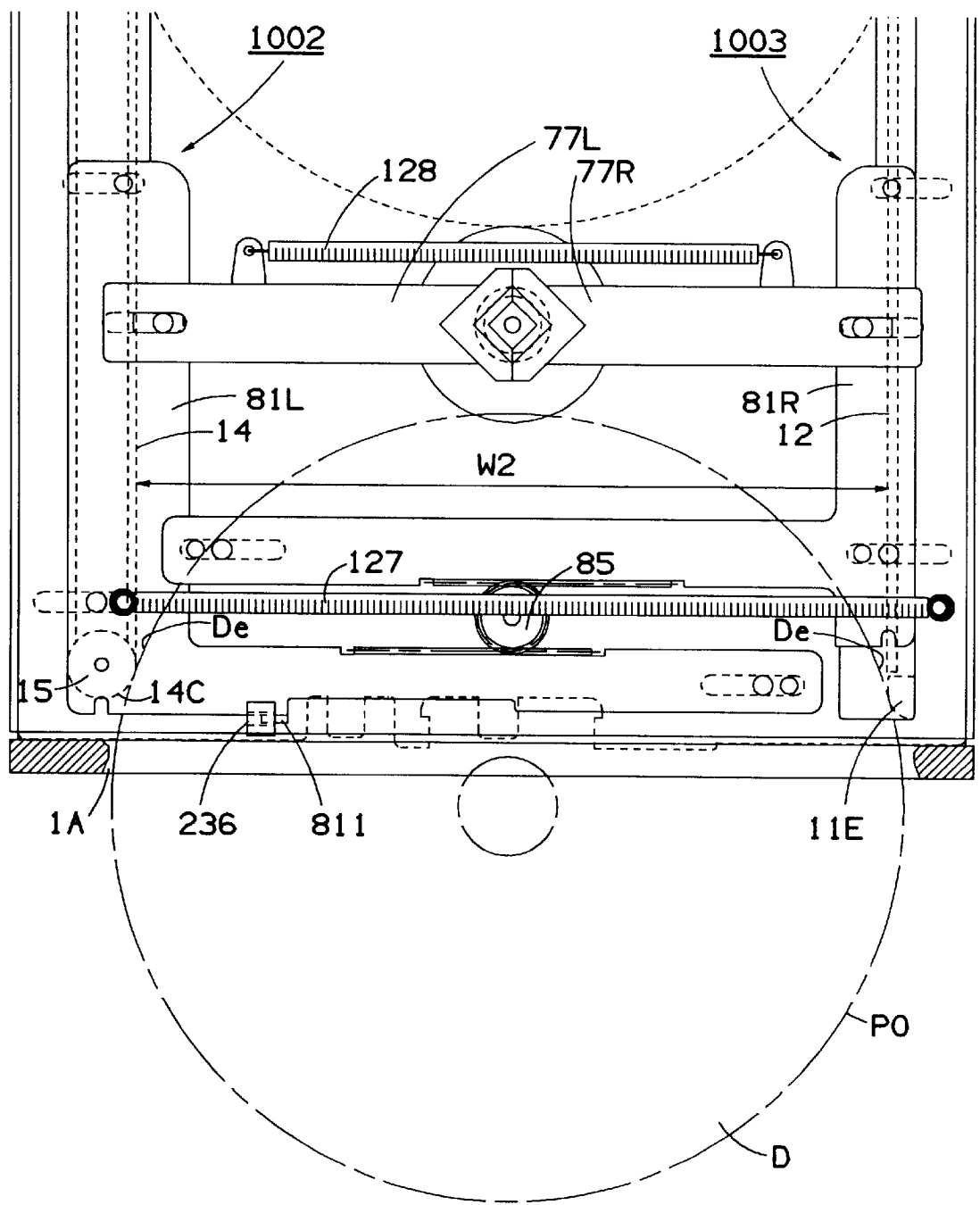
FIG. 14 is a top-view showing the disk transfer mechanism according to an embodiment of the present invention in a loading start position P0.

When disk D is inserted into the device via disk insertion opening 1a, edge De of the disk first engages with pulley wrap portion 14C of timing belt 14 and guide 11E. As described above, guide 11E is of a resin material having a low friction coefficient. Thus, disk edge De slides against it when the disk D is inserted, providing for smooth movement The presence of guide 11E prevents friction with timing belt 14 when a disk is inserted, thus preventing damage to the timing belt 14. When a disk is at the insertion position, loading plates 81L, 81R are forced apart against the force of spring 127. Referring to FIG. 14, when disk D reaches the position indicated by P0, a distance W2 between the belts is 114 mm, disk loading is begun.

To pull disk D inside the device, disk transfer mechanism 1001 revolves timing belt 14 counterclockwise. Unless disk D is inserted a sufficient distance, however, disk edge De will slip and disk D will not be drawn in. This would require the user to push the disk in. In general, the user will insert disk D into the device by supporting disk spindle hole Ds and disk edge De with the forefinger and the thumb of the right hand The right hand holding disk D naturally tends to turn clockwise as the forefinger releases disk D and the thumb follows the left side edge De of disk De into the disk player, pushing gently with the thumb. Once disk transfer mechanism 1001 begins active transport, the sensation felt by a right handed user is quite natural as the disk is pulled away from the thumb, because the disk D rotates in a clockwise direction as it is transported in.

Figure 15:
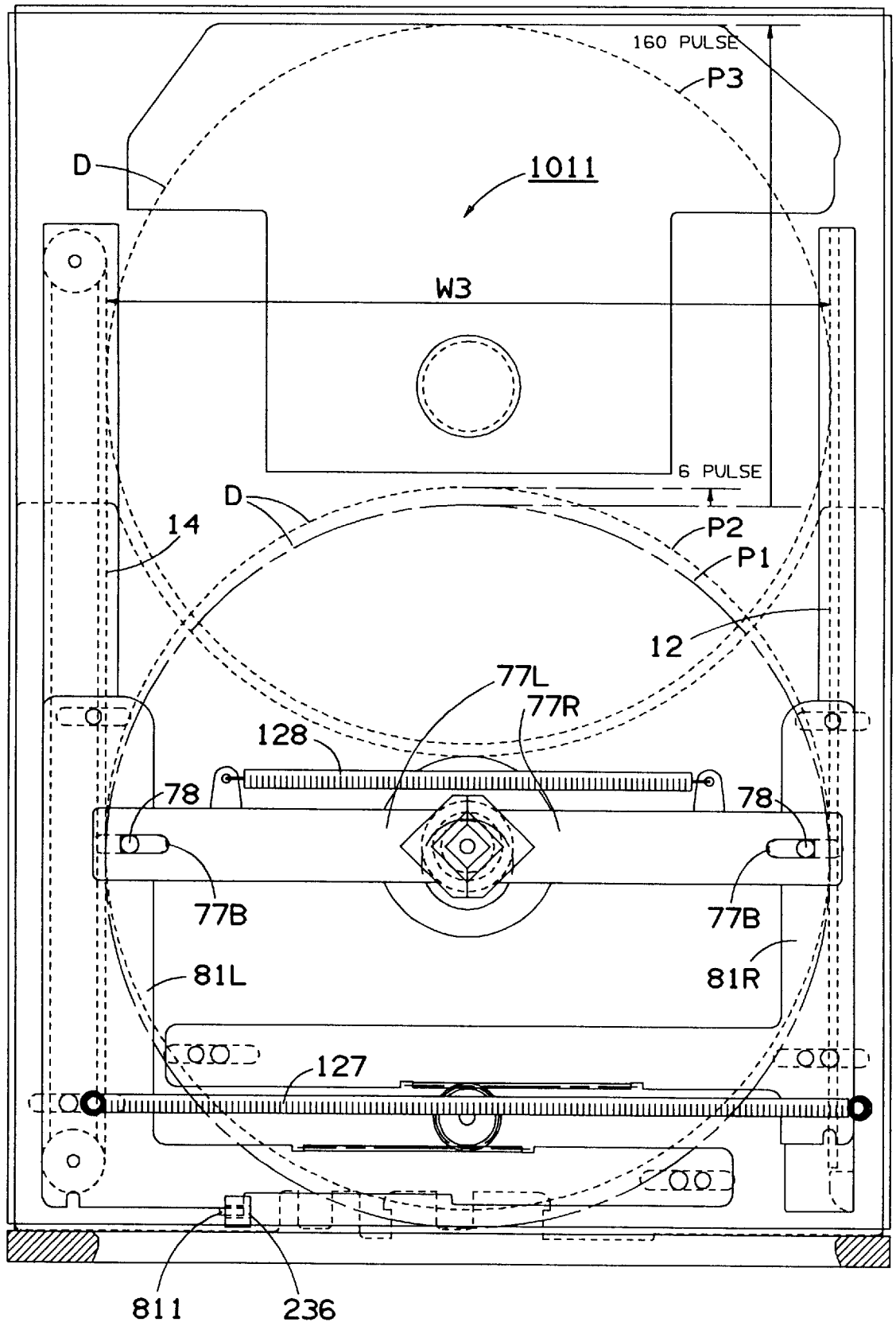
FIG. 15 is a top-view indicating pulse train start position P1, disk playback position P2, and disk stock position P3 of the disk transfer mechanism.

Once disk transfer mechanism 1001 has moved disk D sufficiently inside to support disk D between timing belt 14 and friction belt 12, disk D is thereafter reliably moved within the device of the invention independently of the user. can be transferred in a stable manner. Referring to FIG. 15, by driving timing belt 14 in a counter-clockwise direction, disk D is moved to a stock position (P3) in stocker 1011 after passing a playback position (P2). Referring to FIG. 18, by driving timing belt 14 clockwise, disk transfer mechanism 1001 brings disk D from stock position (P3), past the playback position (P2), to an eject position (P4) at which disk D can be removed by the user. As the eject position (P4) is approached, disk transfer mechanism 1001 is not halted until spindle hole Ds of the disk is beyond front panel 1, allowing the user to insert a forefinger into spindle hole Ds to remove disk D. At the eject position, (P4) the distance W1 between belt 14 and belt 12 is the same distance (112 mm) as the disk receiving state described above.

Loading Plate Opening/Closing Mechanism

Referring again to FIG. 7, drive motor 250 of loading plate opening/closing mechanism 1004 is also used to drive timing pulley 15, which drives timing belt 12 to move disk D. A rack release plate 134 is slidably connected to chassis 90, so that it can move to the left and right of main chassis 90, guided on pins 135 inserted in grooves 90H in the front of main chassis 90. A bend 134B on the right end of rack release plate 134, is engageable with a bend 7SE in a sliding plate 75 (described later). A T-shaped rack release lever 130 rotates on a shaft 133 projecting from an upper surface of a motor bracket 180. A spring 138 urges rack release lever 140 in a clockwise direction. An arm 130B of lever 130 passes through an opening 87C in a rack member 87 to insert in a groove 134A of plate 134. Lever 130 rotates counterclockwise in response to a movement of plate 134 the right of the device.

Projections 87A, on the lower end of rack member 87, insert into a hole (hidden in the drawing) in main chassis 90 such that rack member 87 is permitted to tilt about its lower end. A rack 87D on the upper end of rack member 87 is engageable with a gear 15C (see FIG. 23), in timing pulley 15 between two other gears 15A and 15B formed in timing pulley 15. A bend 87B projecting from rack member 87 is pivotably connected to arm 130A of lever 130 by a plate 131 and spring 132 connected in series between bend 87B and arm 130A. When lever 130 rotates in a counterclockwise direction, rack member 87 tilts toward the rear of the device causing rack 87D to approach and engage gear 15C.

Figure 59:
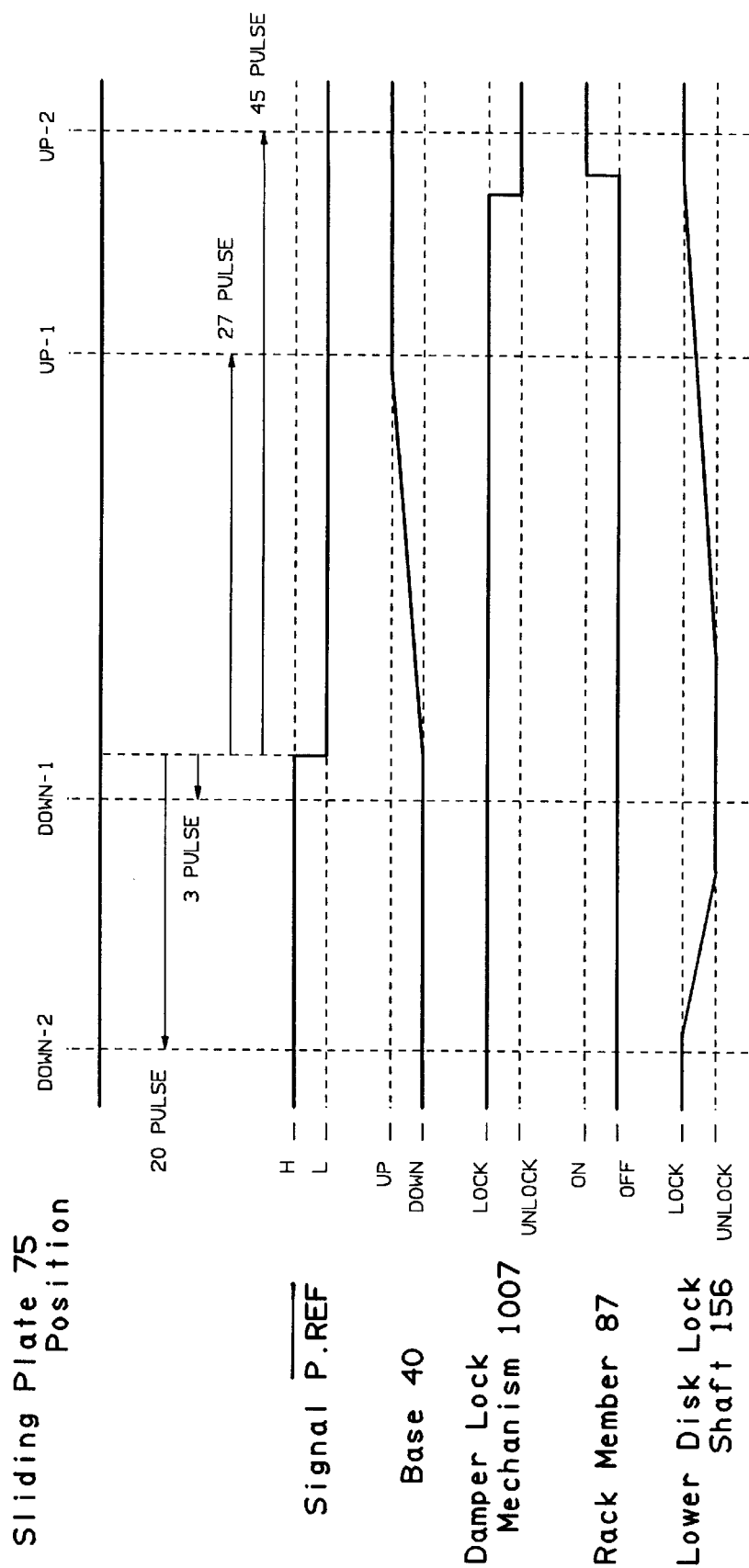
FIG. 59 is a timing chart showing the states of the other mechanisms that operate in conjunction with sliding plate 75.

Referring momentarily to FIG. 59, loading plate opening/closing mechanism 1005, rack member 87 are controlled so that rack 87D engages (ON) and disengages (OFF) gear 15C in response to the position of sliding plate 75 (to be described later). That is, rack member 87 is controlled as a function of the position of sliding plate 75, and engages timing pulley 15 only when sliding plate 75 reaches a position intermediate between position UP-1 and position UP-2 as shown in FIG. 59.

Figure 22:
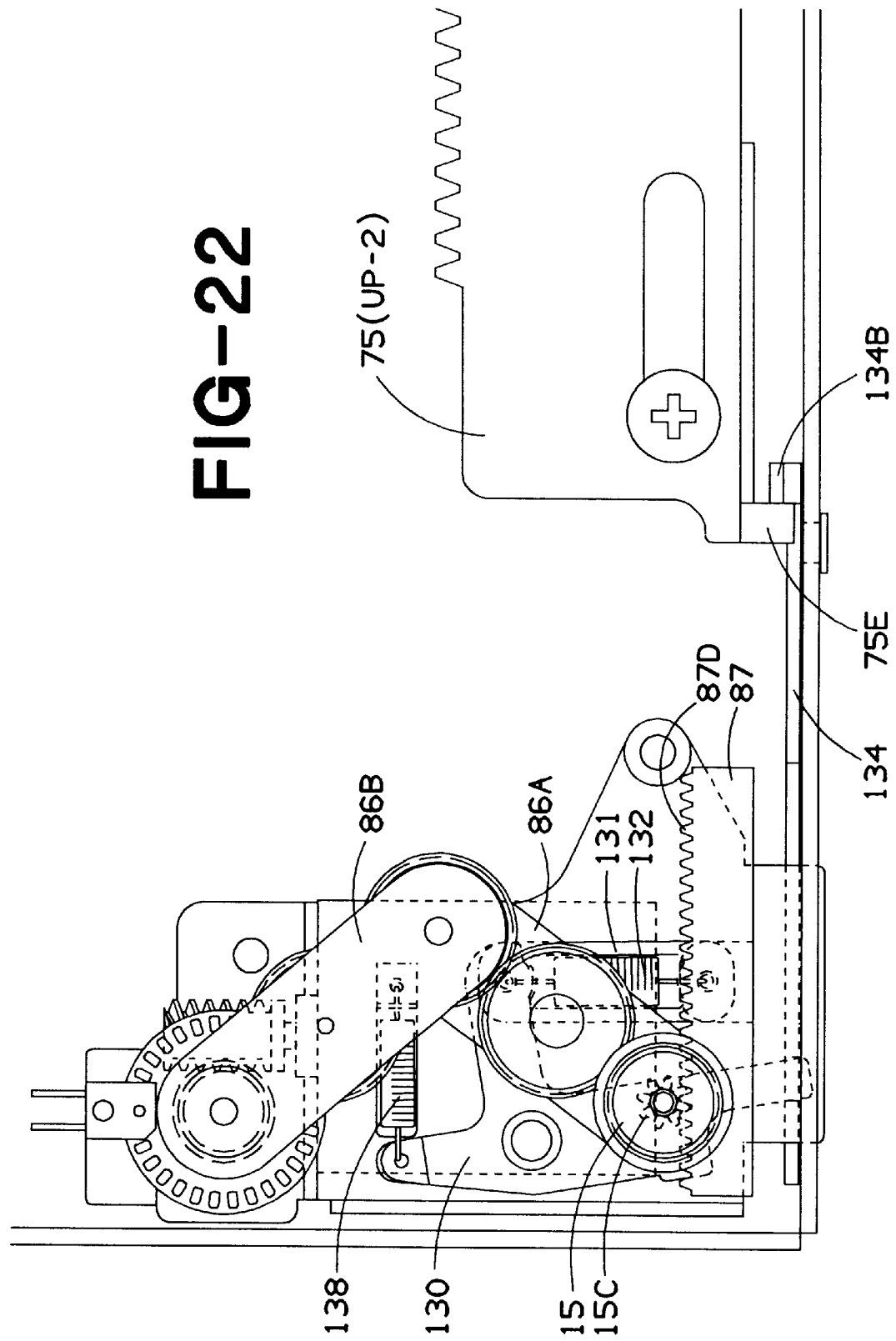
FIG. 22 is a top view of the loading plate open/close mechanism with sliding plate 75 in position UP-2.

Referring now also to FIGS. 19–22, as sliding plate 75 moves from position DOWN-2 and position UP-1, bend 75E of plate 75 approaches, but does not yet engage bend 134B of plate 134. Therefore, during this time, the pressure from spring 138 keeps plate 134 positioned to the left of chassis 90, held there by lever 130. Thus, plate 134 rests in position with pins 135 resting at the left-most ends of guide grooves 90H. With plate 134 in this position, rack member 87 is disengaged from gear 15C because, rack release plate 130 is rotated to its clockwise position so that it pushes rack member 87 away from gear 15C via plate 131 and spring 132. Once sliding plate 75 moves beyond position UP-1 to position UP-2, bend 75E engages bend 134B, moving and plate 134 to the right of the device. This pushes arm 13 OB, rotating rack release plate 130 counter-clockwise in opposition to the force of spring 138, pulling on plate 131 and spring 132 tilting rack member 87 to bring rack 87D toward, and into engagement with, gear 15C as shown in FIG. 22.

Figure 17:
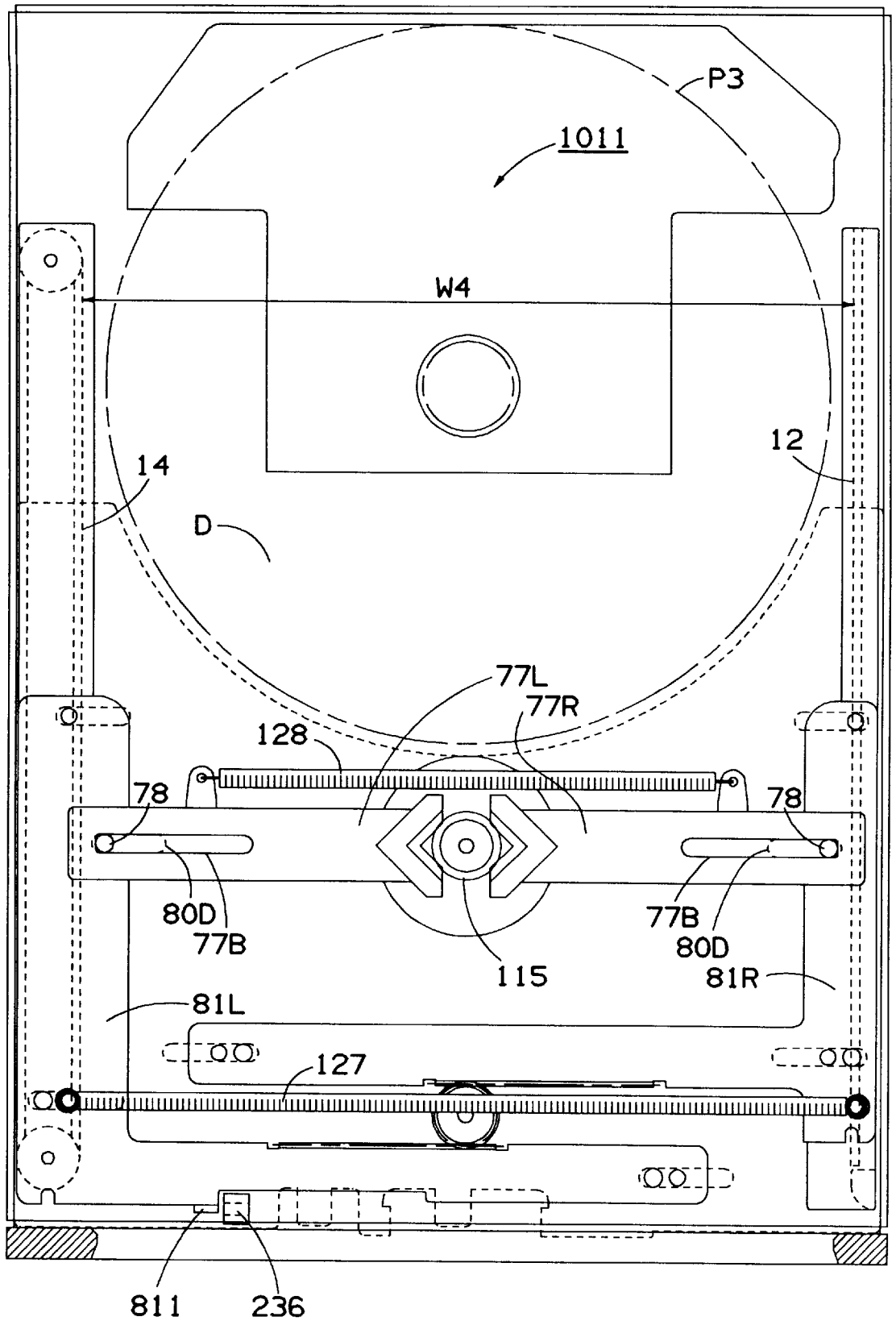
FIG. 17 is a top-view of the disk transfer mechanism during vertical movement of the stocker.
Figure 23:
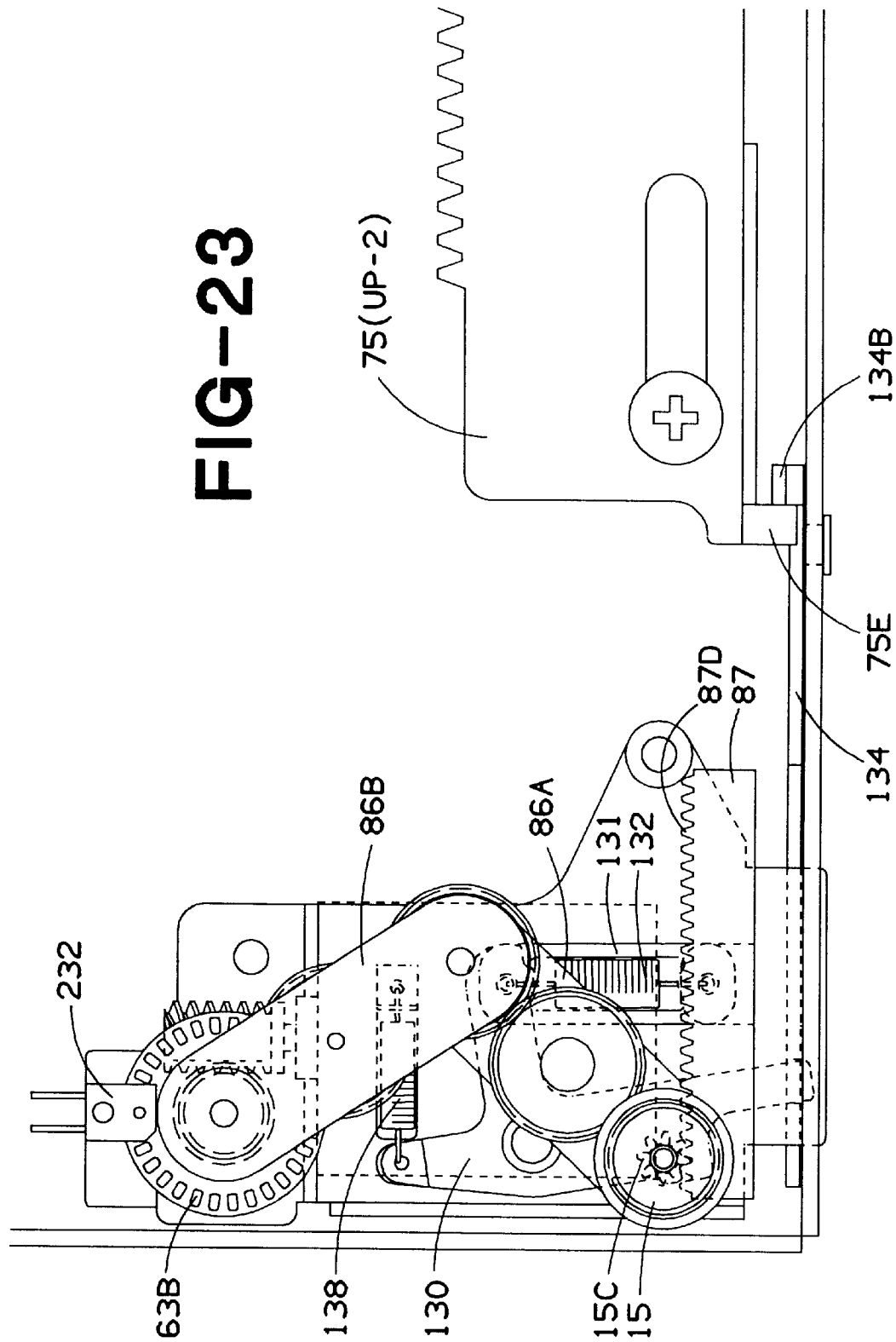
FIG. 23 is a top-view of the loading plate open/close mechanism with the loading plates in an open position POS.3.

Referring also to FIG. 23, when sliding plate 75 is in position UP-2 and timing pulley 15 is rotated, gear 15C, in engagement with rack 87D, moves along rack 87D moving timing gear 15 to the left. This causes loading plates 81L, 81R to move between an open position POS. 3 as shown in FIG. 17, and disk receiving position POS. 1, shown in FIG. 13.

The positions of loading plates 81L, 81R are detected using the changes in the state of signal $\overline{\text{IN}}$ and by counting and cumulating pulses in signal $\overline{\text{L. PULSE}}$. Referring to FIG. 58, open position POS. 3 is detected by counting 10 pulses of signal $\overline{\text{L. PULSE}}$ after signal $\overline{\text{IN}}$ changes to "L" when loading plates 81L, 81R are separated. Position POS. 2 corresponds to the separation distance at which disk D is supported and is detected by counting 3 pulses of signal $\overline{\text{L. PULSE}}$ after signal $\overline{\text{IN}}$ changes to "H", beginning from POS.3. Disk receiving position POS 1 is detected by counting 16 pulses of signal $\overline{\text{L. PULSE}}$ following a change of signal $\overline{\text{IN}}$ from "L" to "H", as loading plates 81L. 81R converge.

Optical Mechanism

Figure 9:
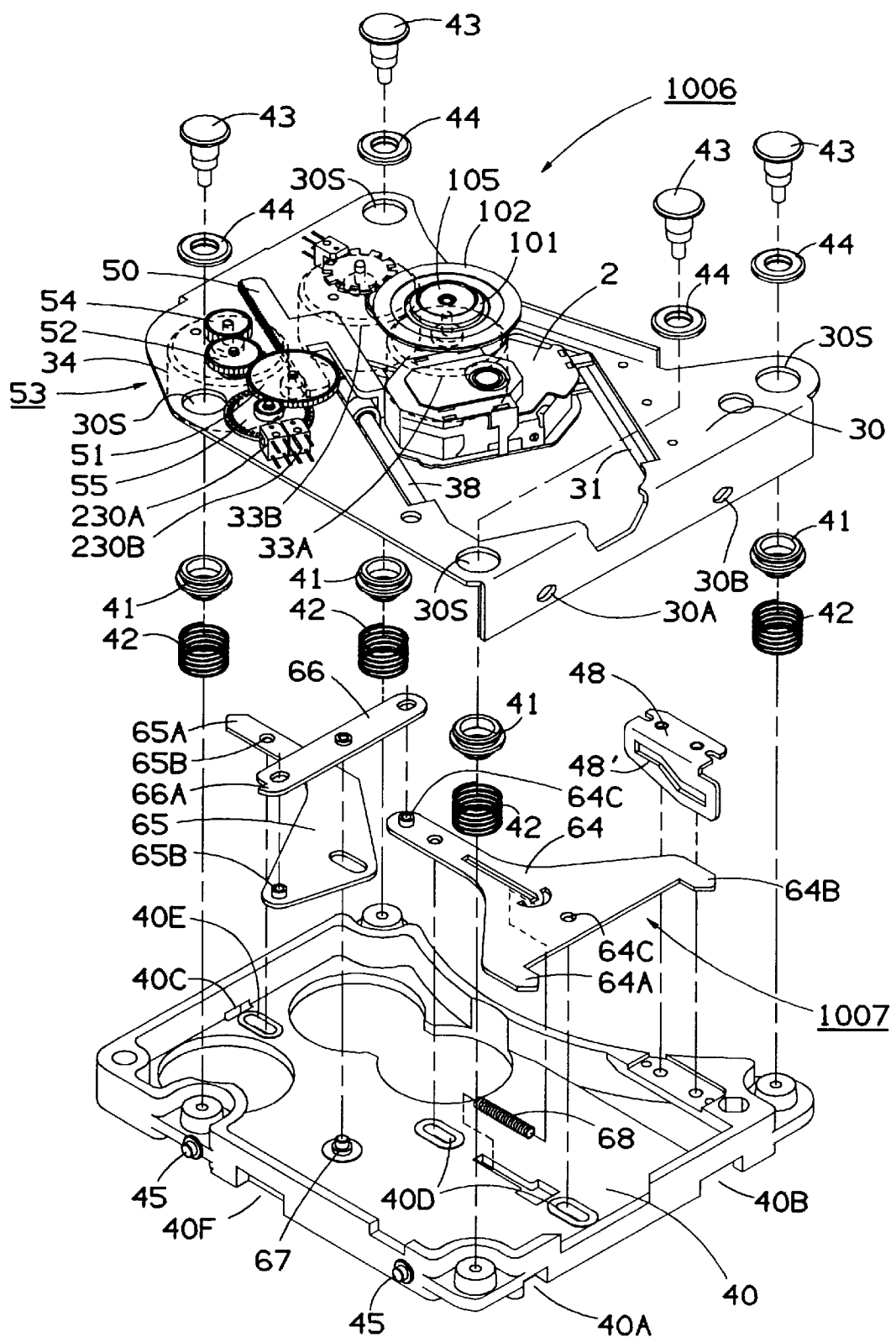
FIG. 9 is an exploded view of an optical mechanism and damper lock mechanism.
Figure 37:
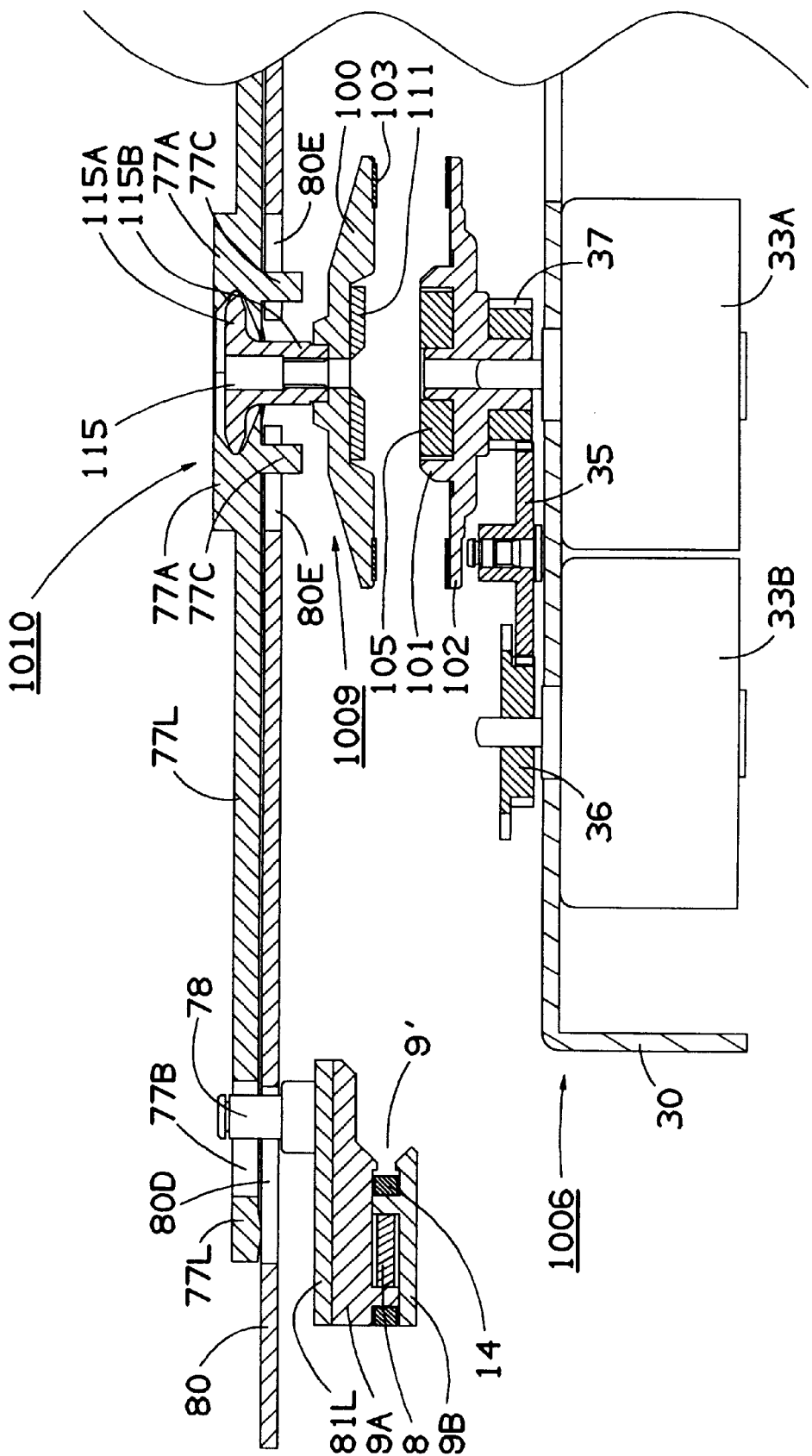
FIG. 37 is a schematic side-view of the clamper support mechanism in the disk receiving state.
Figure 38:
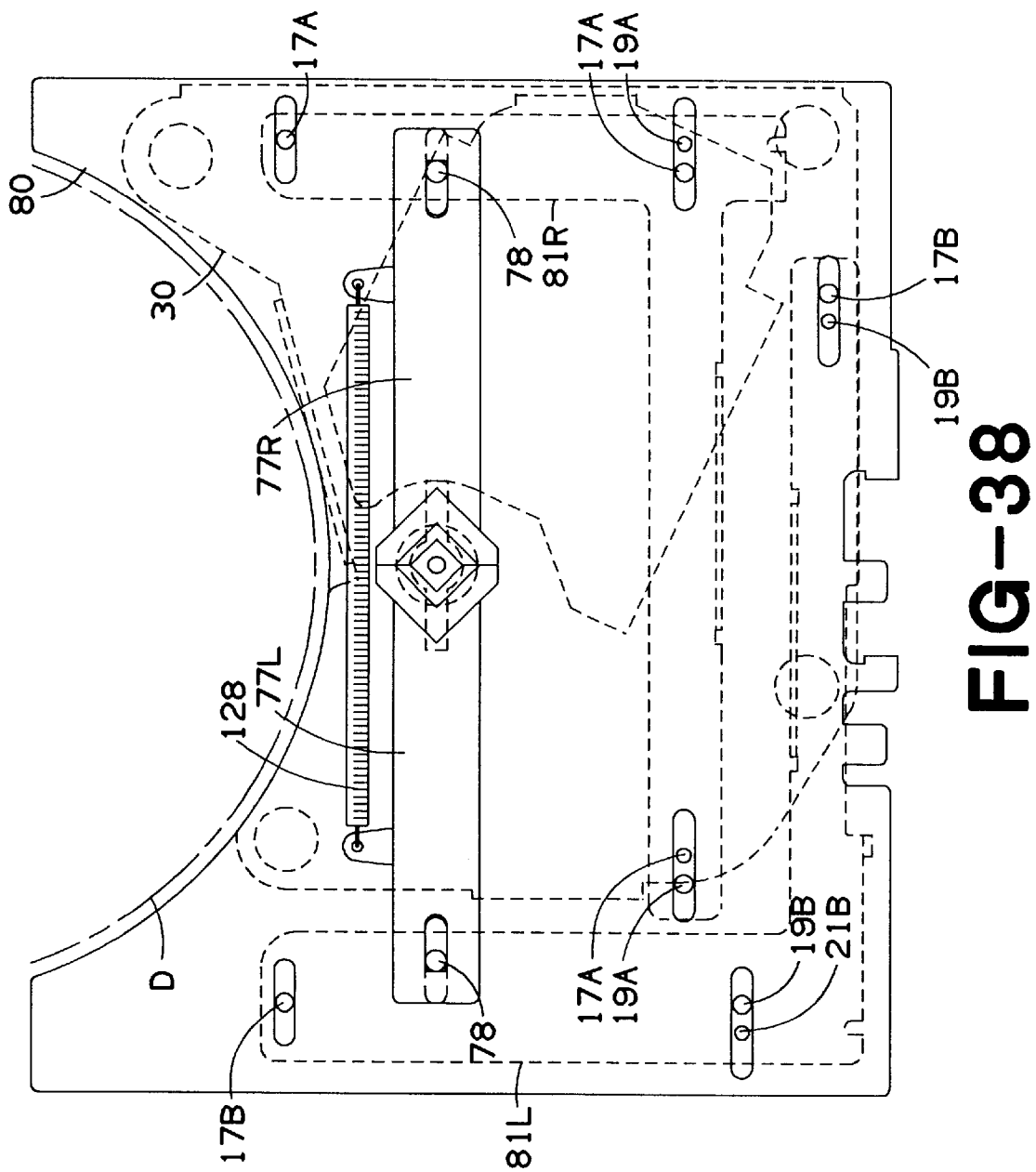
FIG. 38 is a top-view of the damper support mechanism in the disk transfer state.

Referring to FIG. 9, an optical mechanism 1006 includes a chassis 30, a turntable 102, an optical pickup 2, an optical pickup transfer mechanism 53. Disk D is mounted on turntable 102 and rotated as optical playback of disk D is performed. In optical mechanism 1006, turntable 102 is affixed to a rotating shaft of main motor 33A. Referring to FIG. 37, its lower surface is affixed to gear 37. Gear 37 is connected to gear 36 of sub-motor 33B via gear 35, which is rotatably supported on chassis 30. As a result, turntable 102 is rotated by motors 33A and 33B operating together.

Main motor 33A and auxiliary motor 33B are both employed to drive turntable 102 during playback and to drive optical pickup 2 and turntable 102 during accessing and start-up operations described further below. Two motors are used because their operational combination provides certain benefits. During disk playback, motor 33A and auxiliary motor 33B are supplied with drive voltage at a ratio of approximately 7:3 so that auxiliary motor 33B acts as a load on main motor 33A. The load of auxiliary motor 33B eliminates backlash between meshed gears 35–37, minimizing vibration of turntable 102. Advantageously, because auxiliary motor 33B is partially driven by main motor 33A, a back-emf generated auxiliary motor 33B reduces the total current flow to the two motors. Therefore, the load of auxiliary motor 33B is, to a first-order approximation, non-dissipative. Further details of the motor drive circuit can be found in the present applicant's Japanese Patent Application Serial Number 6-340510 (filed Dec. 28, 1994).

A centering spindle 101 projects from a top surface of turntable 102 to align and center disk D with turntable 102. A magnet 105 is affixed inside centering spindle 101. Magnet 105 attract a damper 1009 to clamp disk D as described below. Guide rods 31, 38, which affixed to chassis 30, movably guide optical pickup 2 along a path inclined at angle of 25 degrees relative to the front end of main chassis 90. Optical pickup 2 is moved along a radius of disk D by transfer mechanism 53 which includes a feed motor 34, deceleration gears 51, 52, 54, and a rack 50. Optical sensors 230A, 230B detect rotation of a shutter 55, connected to gear 51. This allows the displacement of optical pickup to be detected.

Support of the optical mechanism

Referring to FIGS. 9, and 24–27 lower dampers 41, fitted into attachment holes 30S on chassis 30, vibrationally isolate chassis 30 with optical mechanism 1006, from a base 40. A respective spring 42, between each lower damper 41 and base 40, supports the weight of chassis 30. Fasteners 43 insert through upper dampers 44 on the upper surface of damper 41 passing through lower dampers 41 to connect to base 40.

Damper Lock Mechanism

Still referring to FIGS. 9, and 24–27, a damper lock mechanism 1007, selectively locks optical mechanism 1006 on chassis 30 to a base 40 from which optical mechanism 1006 is otherwise vibrationally isolated. Damper lock mechanism 1007 includes a Y-shaped lock plate 64 with pins 64C projecting from its lower surface. Pins 64C fit into guide grooves 40D on base 40, permitting lock plate 64 to move over a limited range and direction defined by guide grooves 40D. A J-shaped lock plate 65 also has a pin 65B, projecting from its lower surface, that fits into a guide groove 40E on base 40, permitting lock plate 65 to move along a limited path defined by guide groove 40E. Engagement tips 64A and 64B of lock plate 64 pass through holes 40A and 40B, located on a right side of base 40, and insert into holes 30A and 30B, respectively, located on a right side of chassis 30. Engagement tip 65A of lock plate 65 passes through a hole 40C located on a left side of base 40, and inserts into hole 30C (Hole 30C is not visible in FIG. 9 but is visible in FIGS. 24–27.), which is similar to holes 30A and 30B, located on a left side of chassis 30. Lock plates 64 and 65 are interconnected by connecting plate 66, which rotates on a shaft 67 projecting upwardly from base 40. A compression spring 68 is inserted between base 40 and lock plate 64, urging lock plate 64 toward the right side of base 40. Thus, lock plates 64 and 65 move in opposite directions against, and with, the force of compression spring 68. A notch 66A on an end of connecting plate 66 passes though an opening 40F in base 40. A sliding plate 75 (described later) has an edge 75B" on a bend 75B (See FIG. 10) which is engaged by notch 66A to control the angular position of connecting plate 66.

As visible in FIG. 9, holes 30A–30C are have curved upper and lower edges. Also apparent from FIG. 9 is that engagement tips 64A, 64B and 65A are pointed with a portion at the base of each point that is larger than holes 30A–30C. If, when engagement tips 64A, 64B, and 65A of lock plate 64 and lock plate 65 pass through holes 40A, 40B, and 40C and insert into holes 30A, 30B, and 30C engagement tips 64A, 64B, and 65A are positioned slightly out of alignment with holes 30A–30C, the shape of holes 30A–30C will tend to force engagement tips 64A, 64B, 65A to the center. In addition, by arranging for an upper horizontal edge of each hole 40A, 40B, 40C to be vertically aligned with respect to a respective one of engagement tips 64A, 64B, and 65A and a respective one of holes 30A, 30B, and 30C such that the flat of the base of each of engagement tips 64A, 64B, and 65A is pressed against the horizontal edge of the respective one of each hole 40A, 40B, and 40C base 40 is also firmly aligned with respect to chassis 30. Not only does this arrangement secure a positive vertical position of the tips with respect to chassis 30, because of the curved shape of the edge of the corresponding one of holes 30A–30C, each tip is also horizontally aligned within the corresponding one of holes 30A–30C. The horizontal alignment of engagement tips 64A, 64B, and 65A serves to horizontally align chassis 30 and base 40 because the horizontal width of holes 40A, 40B, 40C is nearly the same as the width of the base of the respective one of engagement tips 64A, 64B, and 65A which insures they are precisely aligned in the holes 40A, 40B, 40C.

Referring now also to FIG. 59, damper lock mechanism 1007 is locked and unlocked in response to the position of sliding plate 75. An edge 75B" of sliding plate 75 is at a substantial distance from a notch 66A of connecting plate 66 when sliding plate 75 is between position DOWN-2 and position UP-1. Thus, while sliding plate 75 is between position DOWN-2 and UP-1, lock plates 64 and 65 are urged toward the right side of housing 1000 by the force of compression spring 68 forcing engagement tips 64A, 64B, and 65A into holes 30A–30C of chassis 30. This causes optical mechanism 1006, on chassis 30, to be locked to base 40. When sliding plate 75 is moved from position UP-1 to position UP-2, edge 75B" engages notch 66A turning connecting plate 66 counterclockwise against the force of compression spring 68. Lock plate 64 is thereby moved toward the left side of housing 1000, and lock plate 65 toward the right side of housing 1000, causing engagement tips 64A, 64B, and 65A to disengage from holes 40A–40C of base 40 and holes 30A–30C of chassis 30, respectively. Thus freed, in position UP-2, optical mechanism 1006 is elastically supported by lower dampers 41 and upper dampers 44.

Lift Mechanism for Optical Mechanism

Figure 10:
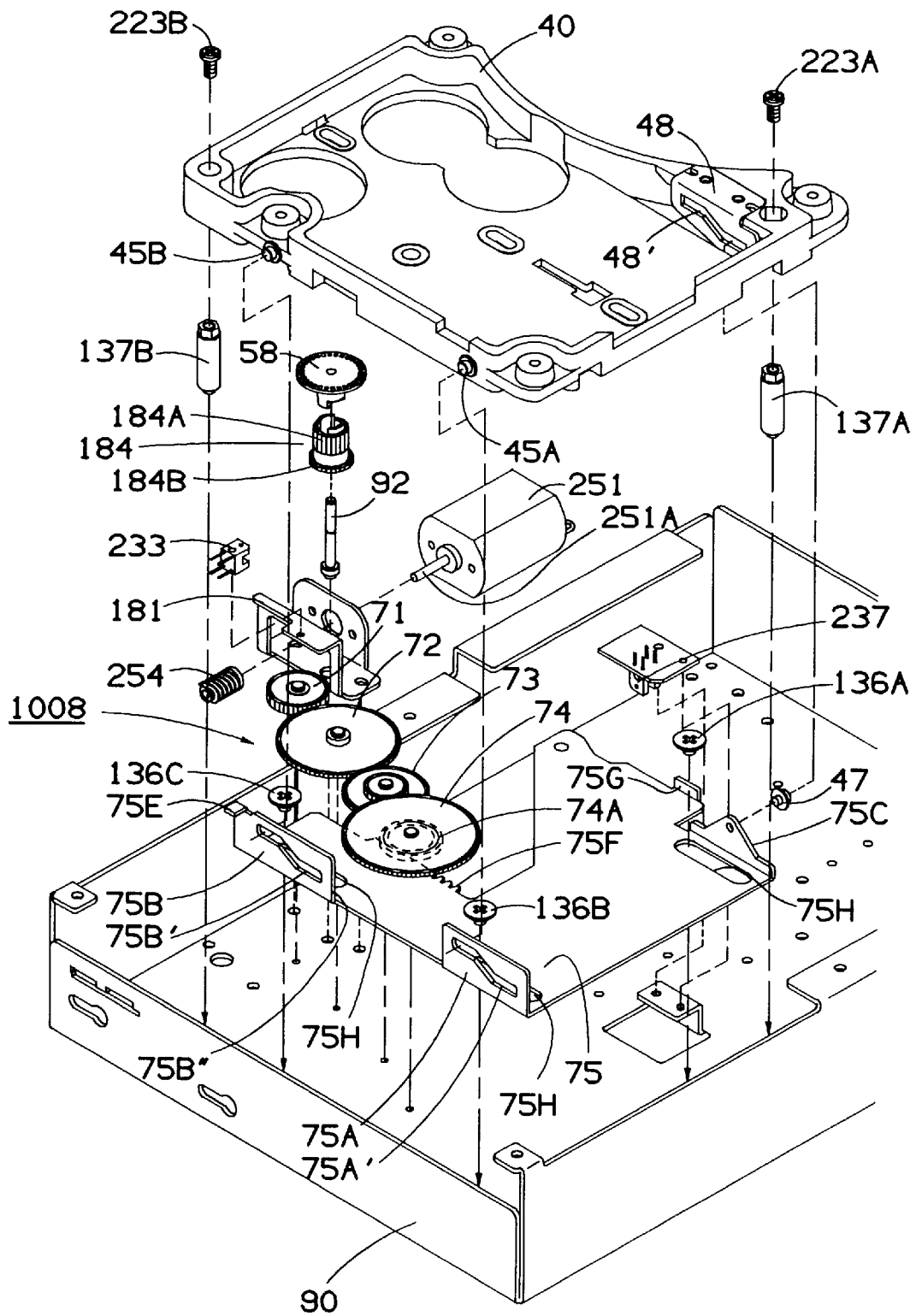
FIG. 10 is an exploded view of an optical mechanism vertical transfer mechanism of the optical mechanism of FIG. 9.
Figure 39:
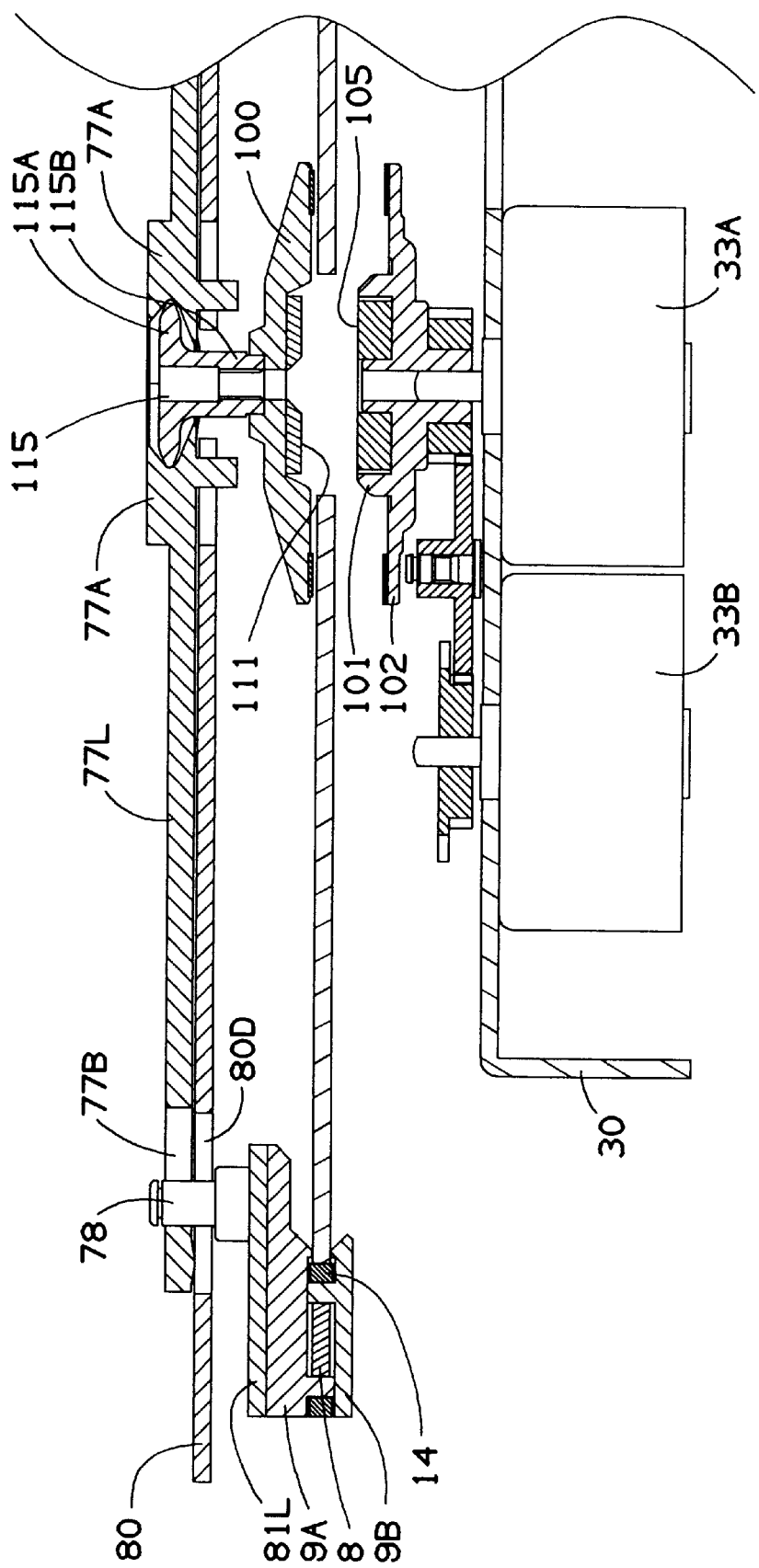
FIG. 39 is a schematic side-view of the damper support mechanism 1010 in the disk transfer state.
Figure 40:
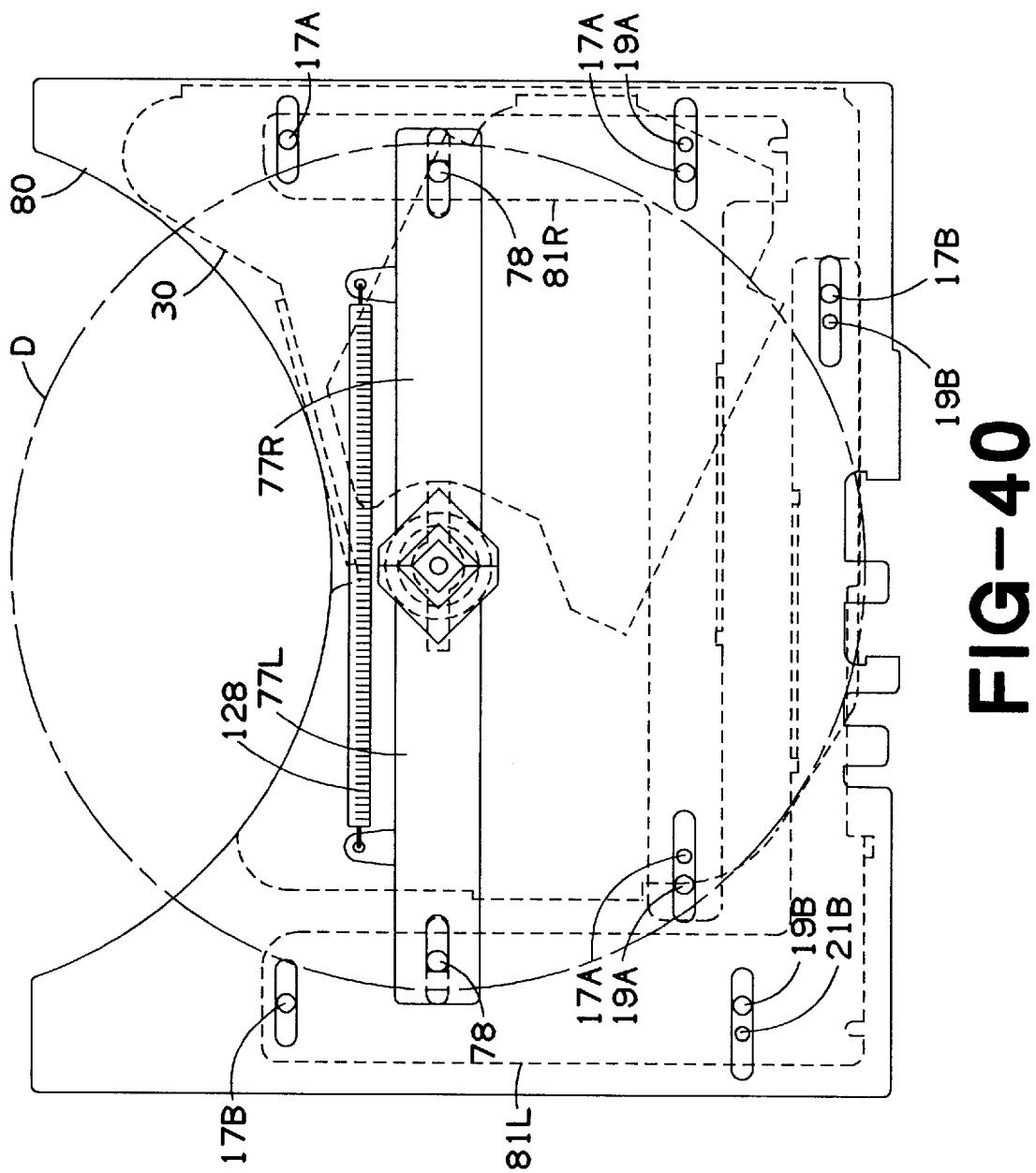
FIG. 40 is a top-view of the damper support mechanism when optical mechanism in the up position.

Referring to FIG. 10, a lift mechanism 1008 for optical mechanism 1006, raises and lowers optical mechanism 1006 between an up position for playing back a disk D (see FIG. 41) and a down position where the S optical mechanism is recessed below the disk when the disk D in the playback position (see FIG. 39). Lift mechanism 1008 moves sliding plate 75, which is slidably connected to main chassis 90, in left and right directions. Sliding plate 75 is guided in its movement by slots 75H on the bottom of sliding plate 75 which are located by shafts 136A–136C threaded into chassis 90. Drive motor 251 is affixed chassis 90 with a bracket 181. A worm gear 254 is press-fitted to rotating shaft 251A of drive motor 251. Gear member 184 is rotatably supported by shaft 92, and a gear 184A on the upper portion of gear member 184 engages with worm gear 254. A gear 184B on the lower portion of gear member 184 drives gears 71–74, rotatably supported by chassis 90. Gear 74A, on the lower surface of gear 74, engages with rack 75F of the sliding plate causing sliding plate 75 to move horizontally.

Base 40, which elastically supports optical mechanism 1006, is guided, so that it can move up and down, by guide shafts 137A, 137B, affixed to chassis 90. Base 40 is supported on pins 45A and 45B, projecting horizontally from base 40, and 47, projecting horizontally from a bend 75C in sliding plate 75, which ride in guide grooves 75A', 75B' (cut into bends 75A and 75B on sliding plate 75) and 48' in a steel guide plate 48 attached to base 40.

Guide grooves 75A', 75B', and 48' have two plateaus and a ramp in their shapes such that when sliding plate 75 moves horizontally from the left toward the right, base 40 initially stays in a lowered position until a certain point in the movement of sliding plate 75 where it begins to be lifted and then remains at an upper position for a further interval of movement of sliding plate 75. Guide plate 48 is disposed toward base 40.

Figure 41:
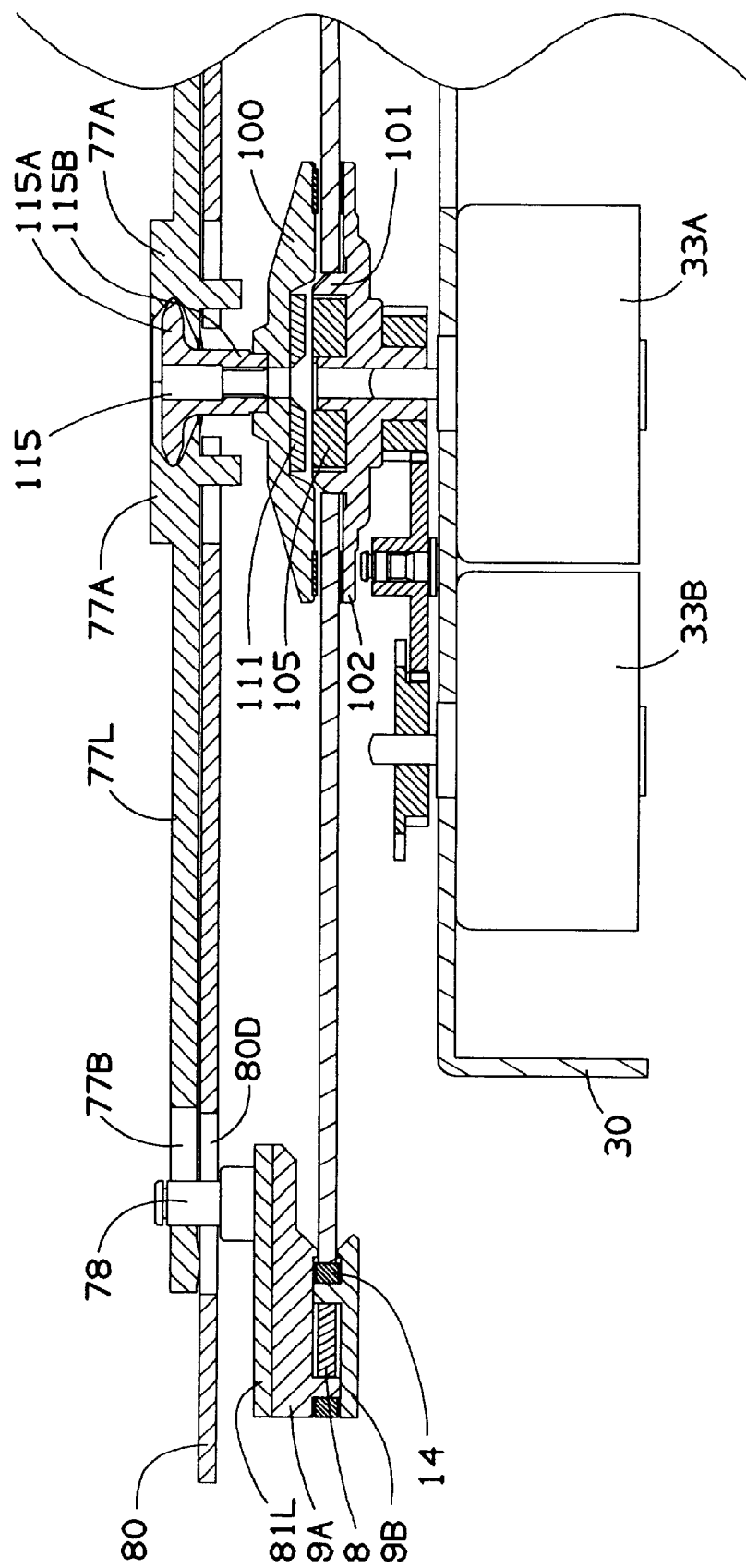
FIG. 41 is a schematic side-view drawing of damper support mechanism when optical mechanism in the up position.

Referring to FIGS. 28–35 the lifting of base 40 by sliding plate 75 is explained in further detail below. The raising and lowering of base 40 is described with reference to the raising and lowering of pins 45A and 45B by way of guide grooves 75A' and 75B'. However, the discussion also applies to pin 47 and guide groove 48' although guide groove 48' is lifted by pin 47 rather than the other way around as with pins 45A and 45B and guide grooves 75A' and 75B'. Pins 45A and 45B of base 40 are guided by horizontal portions G1 of lower guide grooves 75A' and 75B' during the movement of sliding plate 75 between position DOWN-2 (see FIG. 28, FIG. 29) and position DOWN-1 (see FIG. 30, FIG. 31). Base 40, i.e. optical mechanism 1006, remains in the down position (see FIG. 39), where it is recessed below disk D in the playback position. When sliding plate 75 moves between position DOWN-1 and position UP-1 (see FIG. 32, FIG. 33), a sloping portion G2 of the guide groove guides pins 45A and 45B, and serves to move optical mechanism 1006 vertically. When the sliding plate moves between position UP-1 and position UP-2 (FIG. 34, FIG. 35), horizontal portion G3 of the upper guide groove guides pins 45A and 45B, and the optical mechanism remain in the up position (FIG. 41) for disk playback. Referring to FIG. 41, in the up position optical mechanism 1006 is at the same height as the lower surface of disk D in the playback position on the upper surface of turntable 102. Thus, the disk does not have to be lifted up as in a tray-type disk player. In order to detect the position of sliding plate 75, a shutter member 58 is affixed to the upper surface of gear member 184. Rotational displacement is detected by optical sensor 233 fixed on bracket 181. Optical sensor 233 generates a sliding plate motion pulse signal ($\overline{\text{P. PULSE}}$). In this embodiment, $\overline{\text{P. PULSE}}$ is set so that one pulse indicates approximately 0.231 mm of motion by sliding plate 75. A shutter piece 75G is formed by a bend on sliding plate 75, and optical sensor 237 on chassis 90 detects the shutter piece 75G is to indicate a reference point. Sensor 237 generates a sliding plate reference position signal ($\overline{\text{P. REF}}$). Referring to FIG. 59, when sliding plate 75 moves slightly upward from position DOWN-1, the signal changes to "L".

Thus the positions of sliding plate 75 are detected by counting the number of pulses in signal $\overline{\text{P. PULSE}}$ after the change in state of signal $\overline{\text{P. REF}}$. Referring to FIG. 59, position DOWN-1 is detected by moving sliding plate 75 in the DOWN direction, until signal $\overline{\text{P. REF}}$ changes to "H", then counting three pulses in signal $\overline{\text{P. PULSE}}$. Position DOWN-2 is detected in a similar fashion, except that 20 pulses are counted. Position UP-1 is detected by moving sliding plate 75 in the UP direction, changing signal $\overline{\text{P. REF}}$ to "L" then counting 27 pulses from signal $\overline{\text{P. PULSE}}$. Position UP-2 is detected in a similar fashion, except that 45 pulses are counted.

Clamper

Referring again to FIG. 2 and also to FIG. 37, a damper 1009 clamps disk D to a turntable 102. Clamper 1009 includes a damper base 100, a magnetic plate 111, a clamp top 115, and a clamp sheet 103. A magnetic plate 111 (eg., of iron) is attached to a bottom surface of damper base 100 opposite a magnet 105 on turntable 102. Clamp sheet 103 of compressed urethane is adhesively attached to a disk engagement surface of damper to prevent damage to the top surface of disk D.

Clamper Support Mechanism

Referring to FIGS. 2 and 36–44, a clamp support 115 has a flange 115A top and a shaft 115B which passes through an opening 80G in loading chassis 80. Flange 115A tapers at its perimeter. Shaft 11SB is insertably fixed to damper base 100. A clamping sheet of compressed urethane is adhesively bonded to the outer perimeter of the bottom surface of damper base 100 to protect disk surfaces from damage. Turntable 102 has a magnet 105 which is positioned to attract ferromagnetic plate 111.

A damper support mechanism 1010 holds damper 1009 slightly (0.3 mm) above disk D when disk D is in the playback position. Respective pins 78, 78, projecting upwardly from the upper surface of loading plates 81L and 81R, pass through guide groove 80D of loading chassis 80 and insert into guide grooves 77B and 77B of damper holder 77L, 77R. Respective projections 77C, 77C, projecting downwardly from damper holders 77L, 77R, pass through, and are guided by, respective guide grooves 80E, 80E of loading chassis 80. Thus, clamper holders 77L, 77R are free to move left and right with respect to loading chassis 80. Clamper holders 77L, 77R have respective supports 77A, 77A on respective ends which face each other. Supports 77A, 77A are shaped to clamp and support flange 115A of damper 1009 when supports 77A, 77A are brought together. Support 77A has a V-shaped cross section. A spring 128 urges damper holders 77L and 77R together to snugly embrace flange 115A. Flange 115A fits precisely in supports 77A, 77A in a definite position when supports 77A, 77A are brought together. Thus, supports 77A, 77A hold flange 115A at a precise vertical position keeping damper 1009 at 0.3 mm above disk D.

Clamper support mechanism 1010 supports clamper 1009 above disk D responsively to movement of loading plates 81L and 81R as follows. When loading plates 81L and 81R are moved between a disk receiving position (shown in FIGS. 36 and 37) and disk support position in which disk D is supported between timing belt 12 and friction belt 14 (shown in FIGS. 38, 39 and 40, 41—FIGS. 38, 39 and 40, 41 differ only in that position of the disk in the horizontal direction.), pins 78, 78, on loading plates 81L and 81R, travel in guide grooves 77B, 77B of damper holders 77L, 77R without affecting camper holders 77L and 77R. The force of spring 128 brings damper holders 77L, 77R together causing supports 77A, 77A to hold damper 1009 0.3 mm above disk D when disk D is in the playback position.

Figure 42:
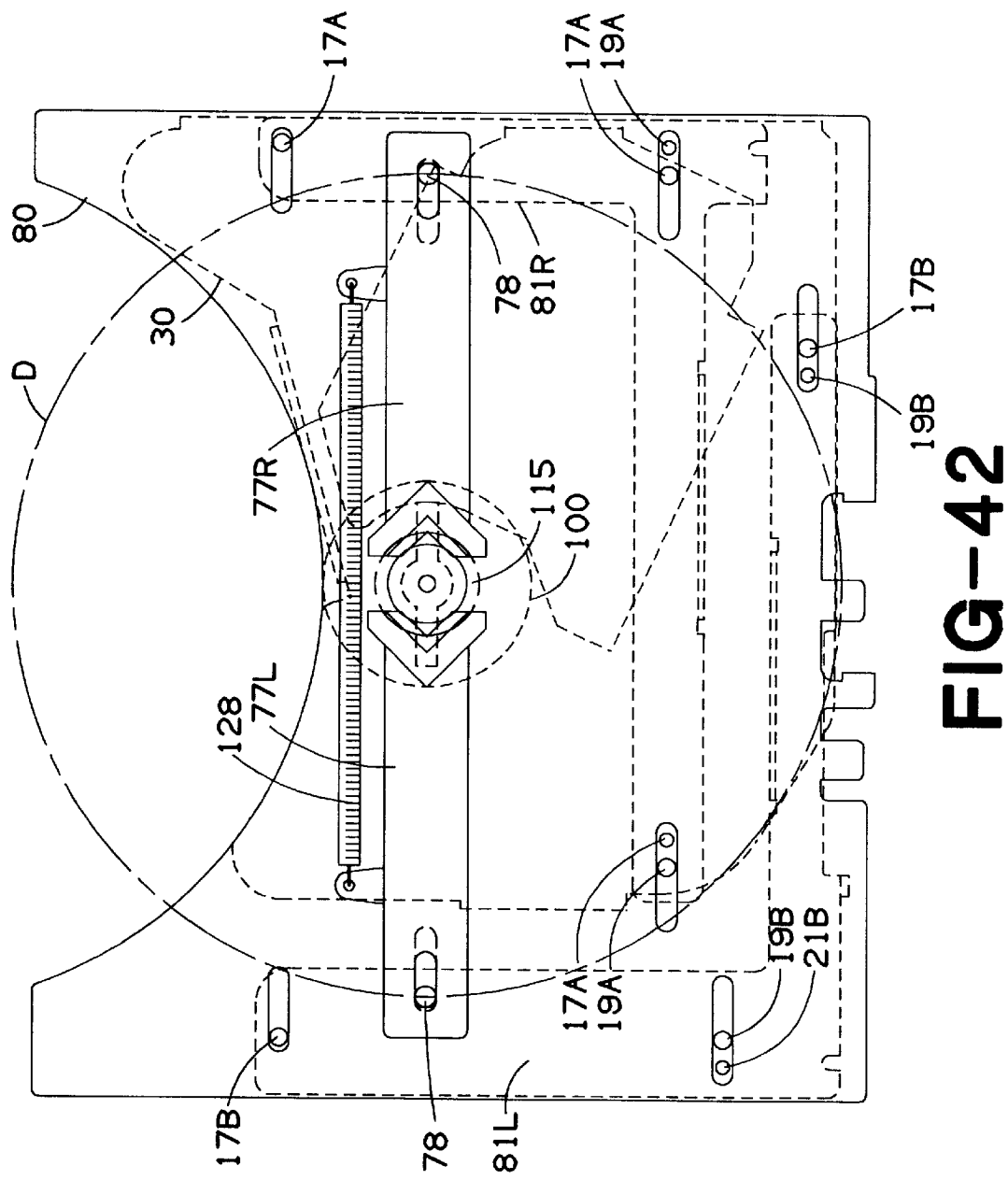
FIG. 42 is a top-view of the damper support mechanism in the stand-by state.
Figure 43:
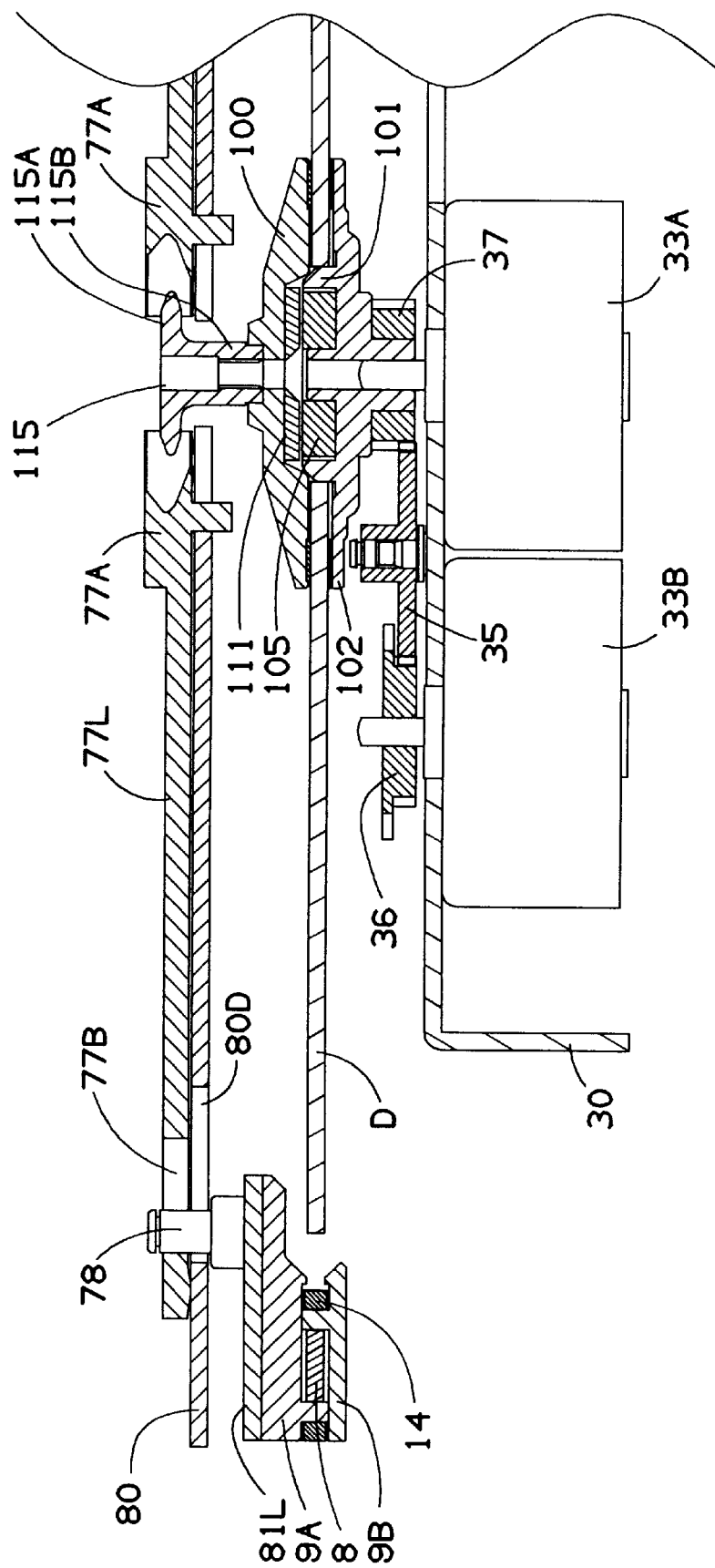
FIG. 43 is a schematic side-view of the damper support mechanism in the stand-by state.
Figure 44:
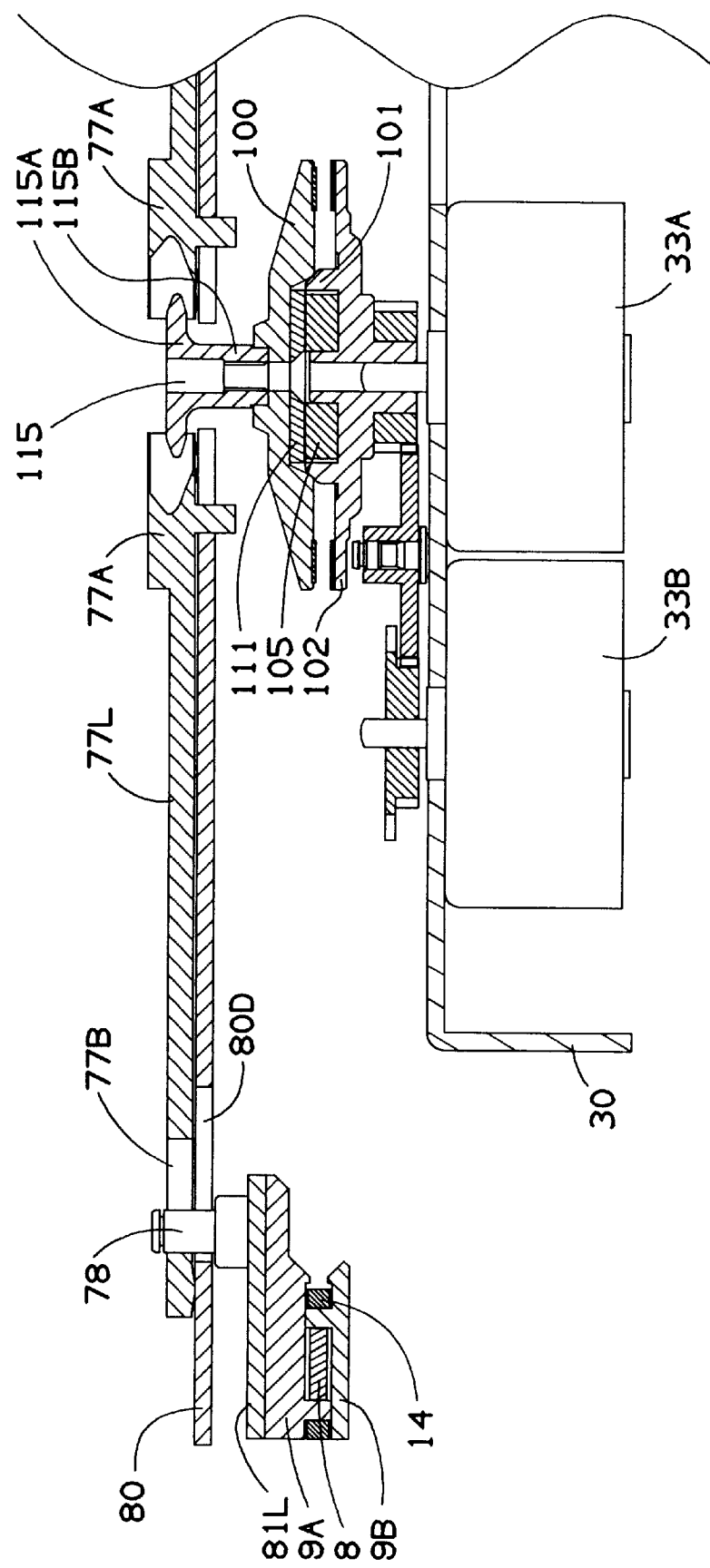
FIG. 44 is a schematic side-view of the damper support mechanism during vertical transfer of the stocker.

Referring now also to FIGS. 42–43, optical mechanism 1006 is raised to the up position. Next, loading plates 81L and 81R are separated (an open position, shown in FIGS. 42 and 43). In the open position, respective pins 78, 78 on loading plates 81L and 81R press against respective ends of guide grooves 77B, 77B spreading damper holders 77L and 77R apart against the force of spring 128. This causes supports 77A, 77A to release flange 115A. Clamper 1009 is then attracted to magnet 105 of turntable 102 clamping disk D between turntable 102 and damper 1009. Loading plates 81L and 81R are brought to the open position (POS.4) even after disk D has been moved to the stock position so that the stocker can be moved up and down. When this happens, since no disk D is present on turntable 102 in the up position, damper 1009 is attracted to magnet 105, and rests on centering cone 101 of turntable 102, as shown in FIG. 44.

Stocker

Figure 11:
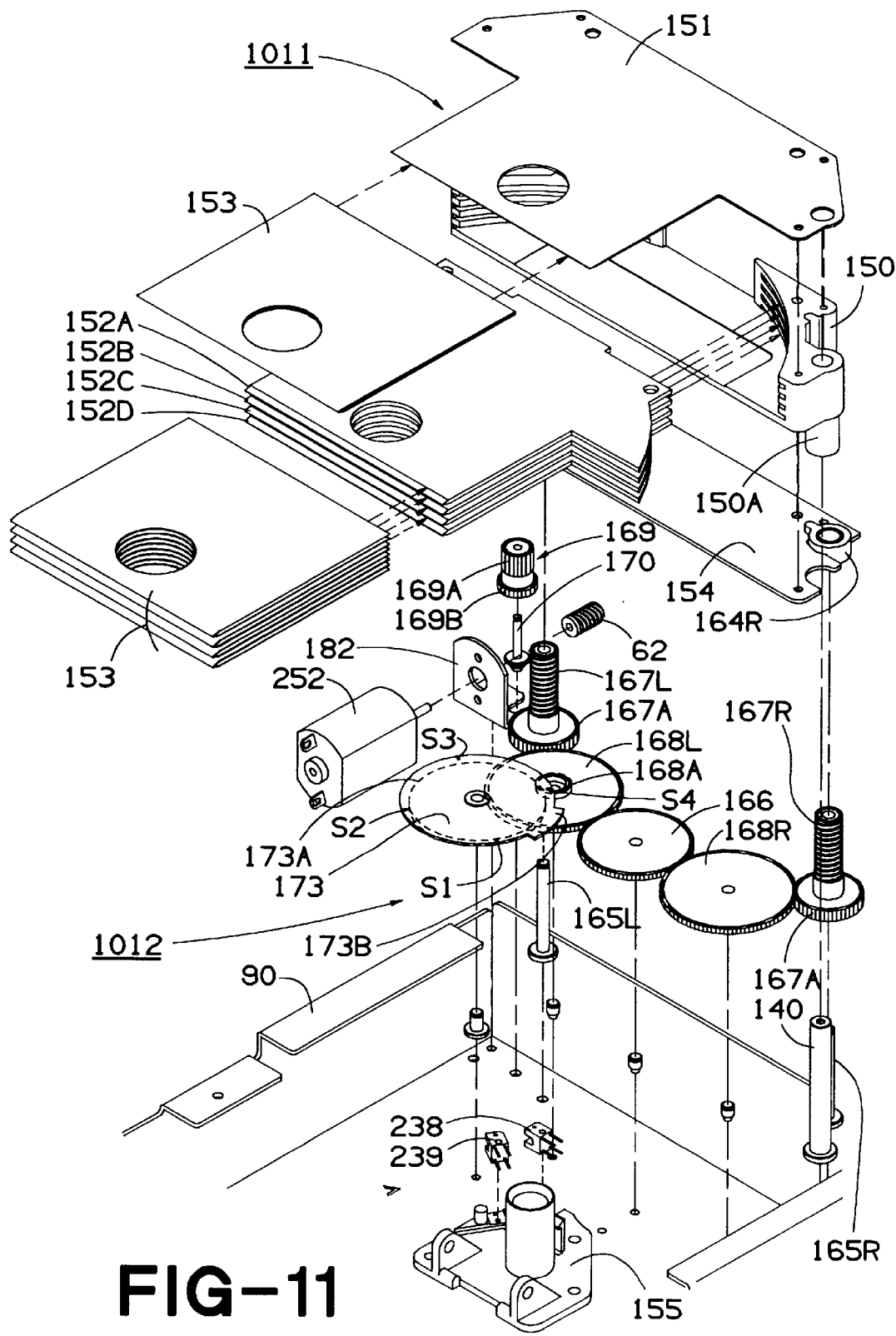
FIG. 11 is an exploded view of a stocker and stocker vertical transfer mechanism.
Figure 12:
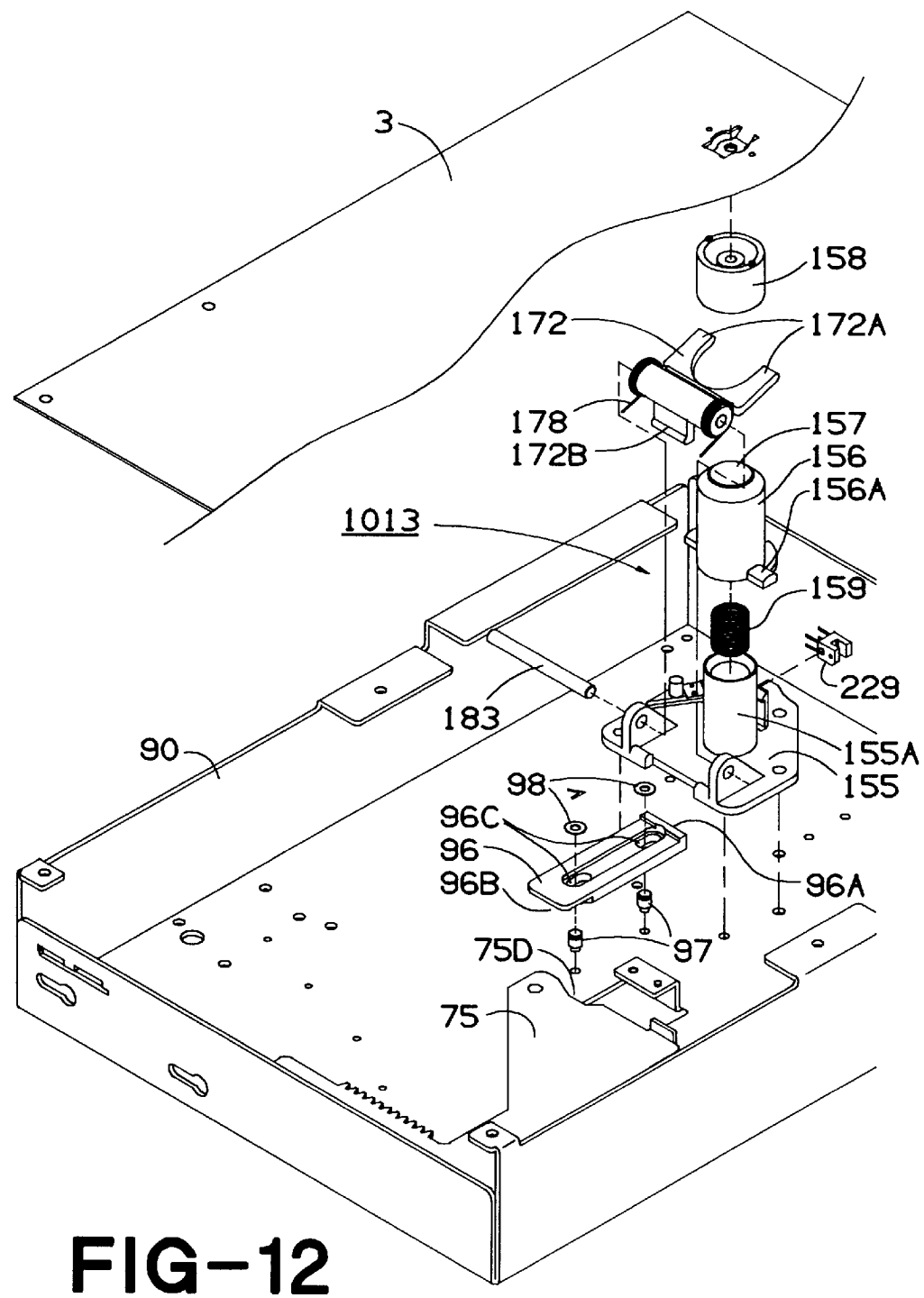
FIG. 12 is an exploded view of a disk lock mechanism according to an embodiment of the present invention.

Referring to FIG. 11, a stocker 1011 is generally defined by a top plate 151, a base plate 154, and a stocker body 150. Stocker plates 152A–152D are insertably affixed in respective slits of stocker body 150. Sheets 153, of the non-woven cloth, the same used as a case lining to protect floppy disks, are adhesively bonded to top and bottom surfaces of stocker plates 152A–152D and top plate 151. Sheets 153 are folded and wrapped around forward ends of stocker plates 152A–152D and top plate 151. Stocker 1011 removably supports a total of four disks (not shown in the drawing) at a pitch of 3 mm between top plate 151 and stocker plate 152D. A first stored disk is inserted between top plate 151 and stocker plate 152A. A second stored disk is stored between stocker plates 152A and 152B. A third stored disk is stored between stocker plates 152B and 152C. A fourth stored disk is stored between stocker plates 152C and 152D. Sheets 153 provide cushioning and low frictional drag, and thereby serve to protect disks D during insertion into the spaces between stocker plates 152A–D. The spacing between adjacent ones of stocker plates 152A–152D is slightly wider, but substantially the same size as disk D. Each of stocker plates 152A–D has a width, perpendicular to the path of insertion disk D follows moving into and out of stocker 1011, that is smaller than the diameter of disk d. This insures that timing belt 14 and friction belt 12 can engage opposite edges of disk d at all times moving into and out of the stocker 1011.

Stocker Vertical Transport Mechanism

Still referring to FIG. 11, a shaft 140, projecting upwardly from main chassis 90, is inserted in a bearing 150A to guide stocker 1011 along a vertical path of movement. Nuts 164L, 164R (nut 164L is hidden in the drawing) engage screws 167L, 167R that rotate on shafts 165L, 165R, respectively, projecting upwardly from main chassis 90. Thus, rotation of screws 167L, 167R moves stocker 1011 vertically. A stocker vertical transfer mechanism 1012, located below stocker 1011, drives screws 167R, 167L. A motor 252, supported by bracket 182 on main chassis 90, has a rotating shaft with a press-fitted worm gear 62. A gear member 169, rotatably supported by shaft 170, has a gear 169A, on an upper portion thereof, that meshes with worm gear 62. A gear 169B on a lower portion of gear member 169 meshes with a gear 167A attached to screw 167L. Gear 167A meshes with a gear 168L. Gear 168L meshes with a gear 166 which in turn meshes with a gear 168R. Gear 168R meshes with a gear 167A attached to screw 167R. Clockwise rotation of screws 167R and 167L lowers stocker 1011, and counterclockwise rotation of screws 167R and 167L raises stocker 1011.

A shutter member 173 rotates on a shaft projecting upwardly from main chassis 90. Shutter member 173 has a gear 173A on its lower surface, that meshes with a gear 168A coaxially connected to gear 168L. Rotation of shutter member 173 is detected by optical sensors 238 and 239 and used to determine the vertical movement and position of stocker 1011. A shutter piece 173B projects from an edge of shutter member 173 and slits S1–S4 in shutter member 173 divide shutter member 173 at 90 degree intervals. Shutter piece 173B and slits S1–S4 are detected by optical sensors 238 and 239, respectively, on a disk lock base 155.

Optical sensor 238 generates a stocker reference position signal ($\overline{S.\,REF}$), when shutter piece 173B interrupts a light beam generated and detected by optical sensor 238. Signal $\overline{S.\,REF}$ goes high when stocker 1011 is brought to a position above disk holding position POS(1). POS(1) of stocker 1011 corresponds to an alignment of the disk-holding space between top plate 151 and stocker plate 152A with a disk transfer position.

Optical sensor 239 generates a stocker position signal ($\overline{S.\,POS}$). Each time stocker 1011 passes one of positions POS(1)–POS(4), the signal goes low (L). Thus, position POS(1) is detected by moving the stocker downward until signal $\overline{S.\,POS}$ goes low (L) after signal $\overline{S.\,REF}$ goes high (H). The remaining positions POS(2), POS(3), and POS(4) are detected moving stocker 1011 further and counting second, third, or fourth changes in signal $\overline{S.\,POS}$, respectively.

Disk Lock Mechanism

Figure 45:
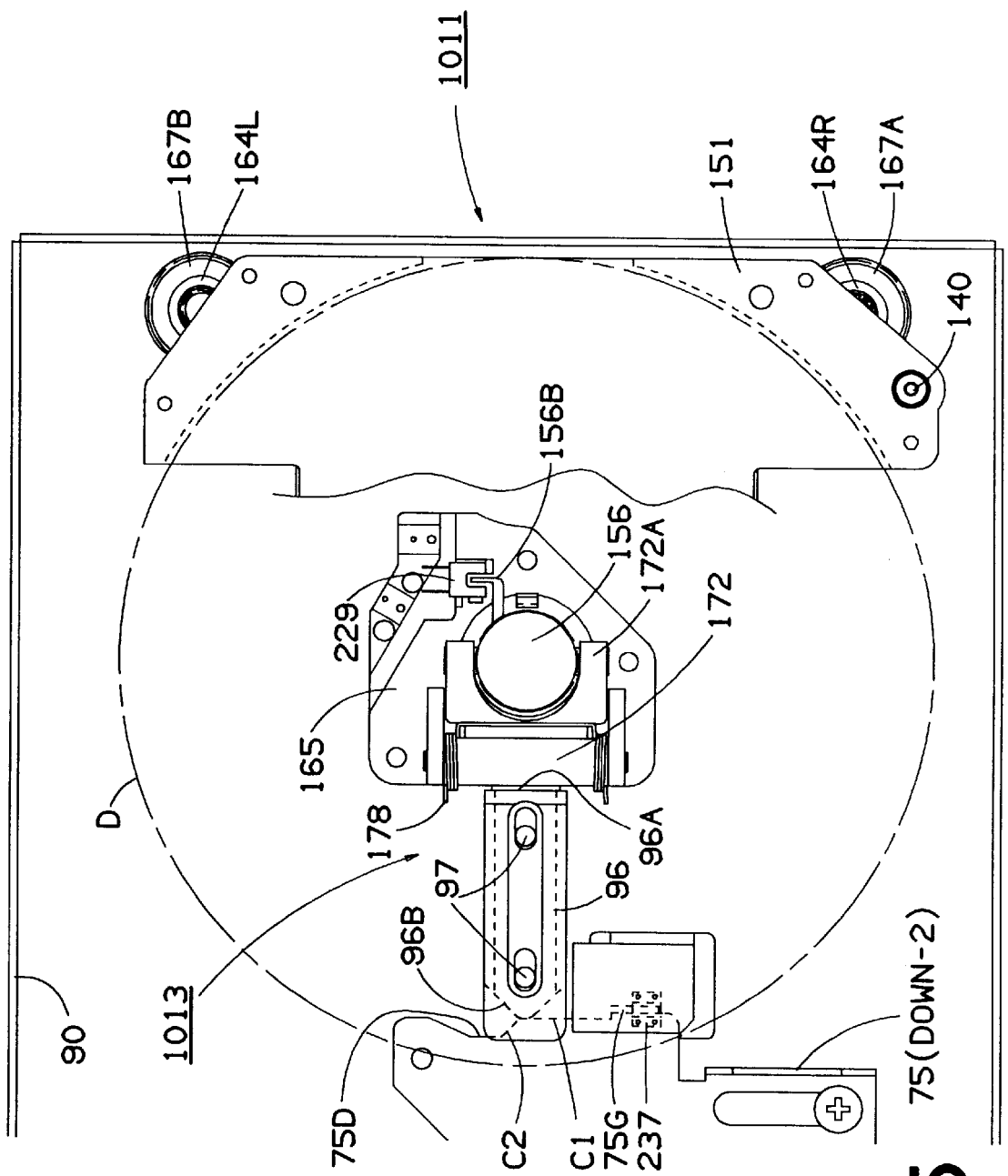
FIG. 45 is a top-view of the disk lock mechanism with sliding plate 75 in position DOWN-1.
Figure 46:
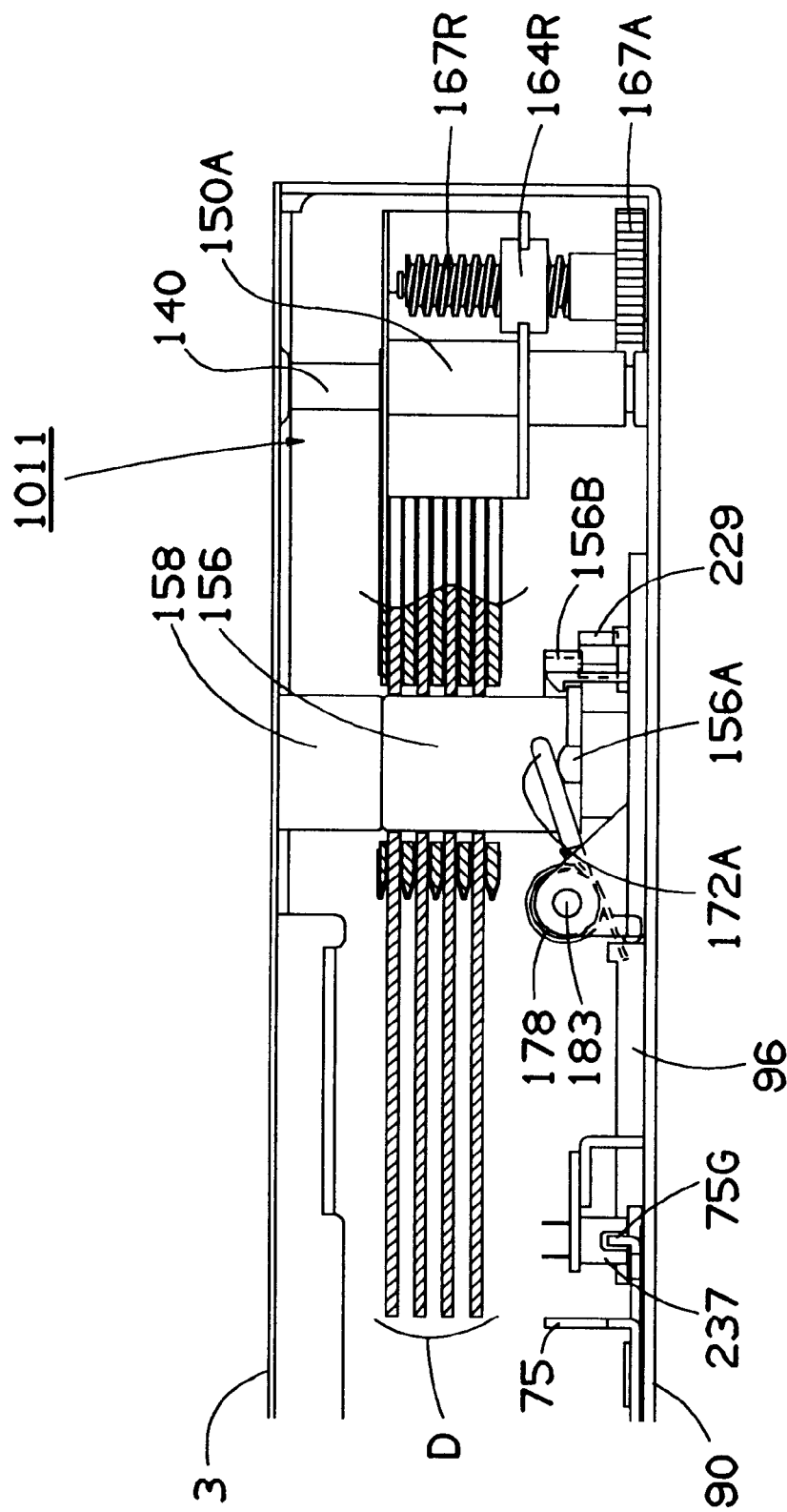
FIG. 46 is a schematic side-view of the disk lock mechanism with sliding plate 75 in position DOWN-1.
Figure 47:
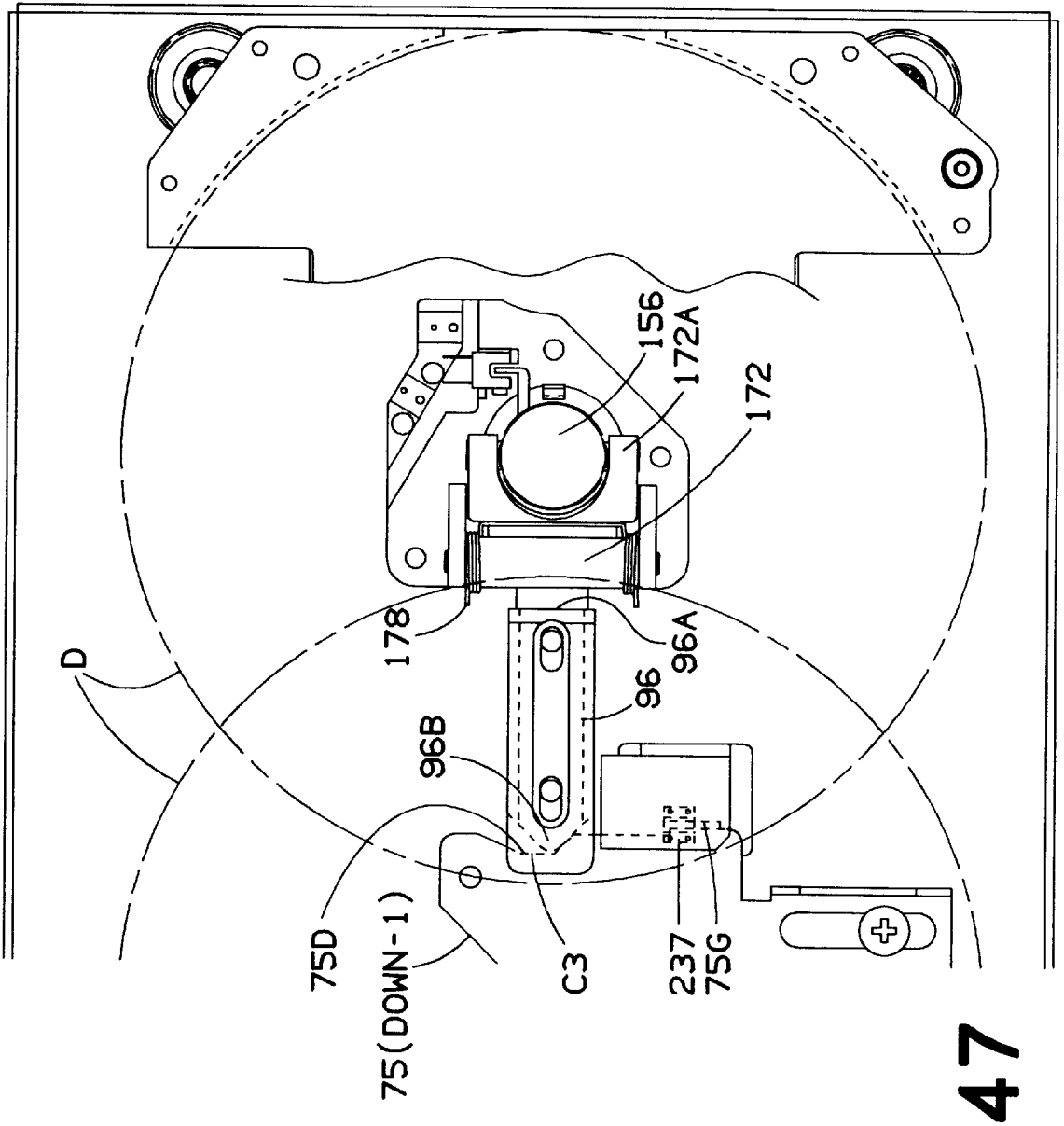
FIG. 47 is a top-view of the disk-lock mechanism with sliding plate 75 in position DOWN-2.
Figure 48:
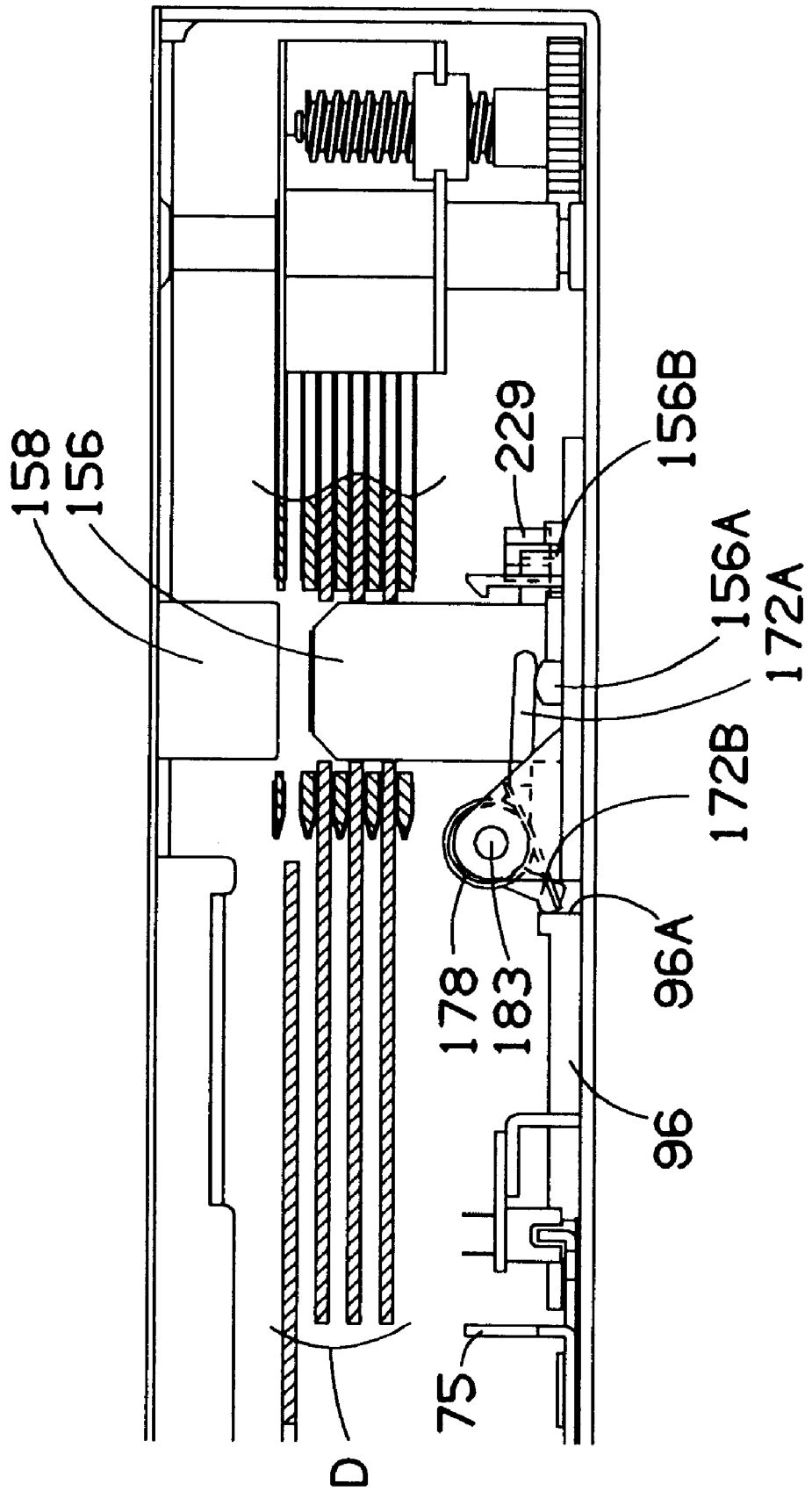
FIG. 48 is a schematic side-view of the disk-lock mechanism with sliding plate 75 in position DOWN-2.
Figure 49:
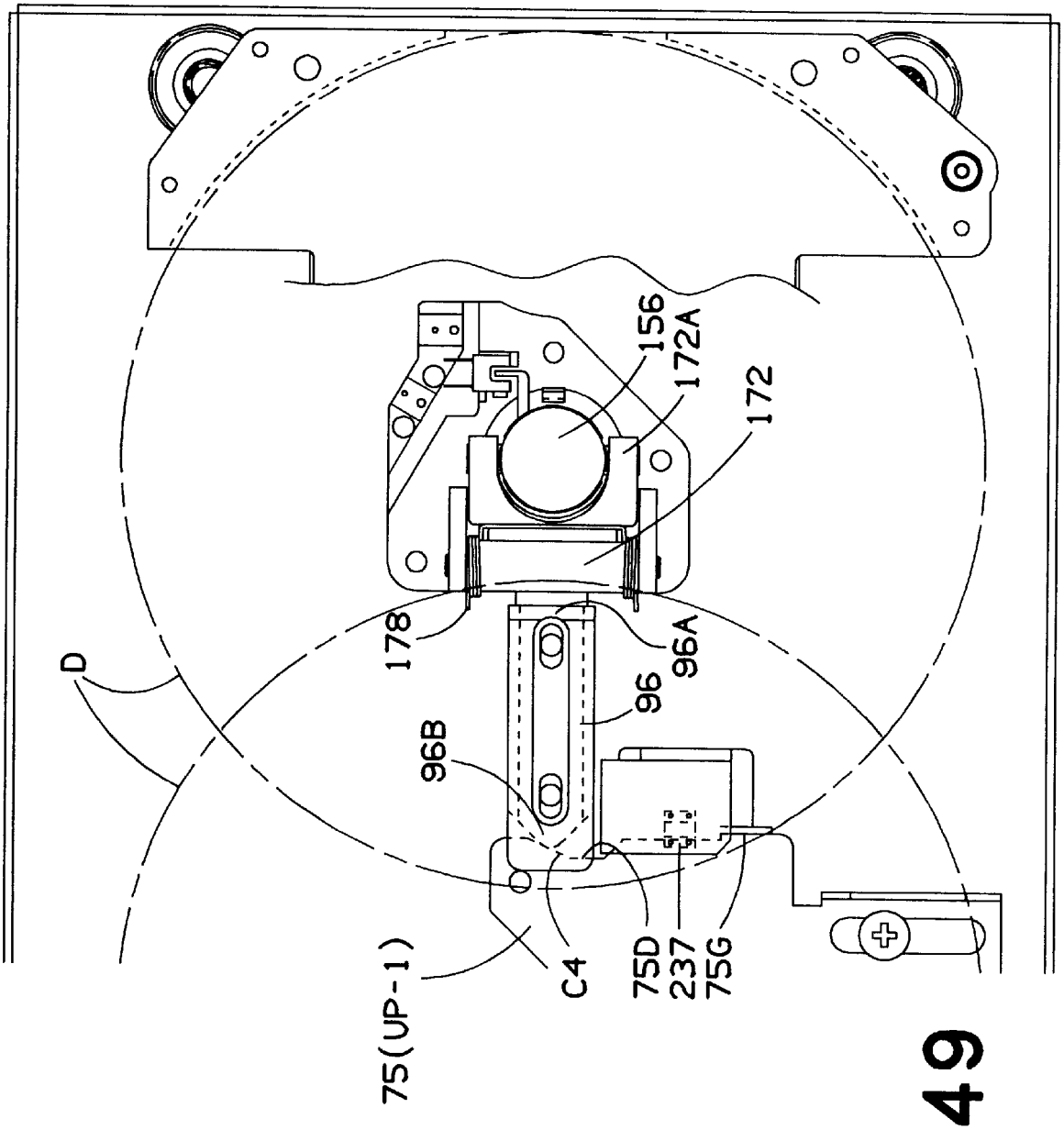
FIG. 49 is a top-view of the disk-lock mechanism with sliding plate 75 in position UP-1.
Figure 50:
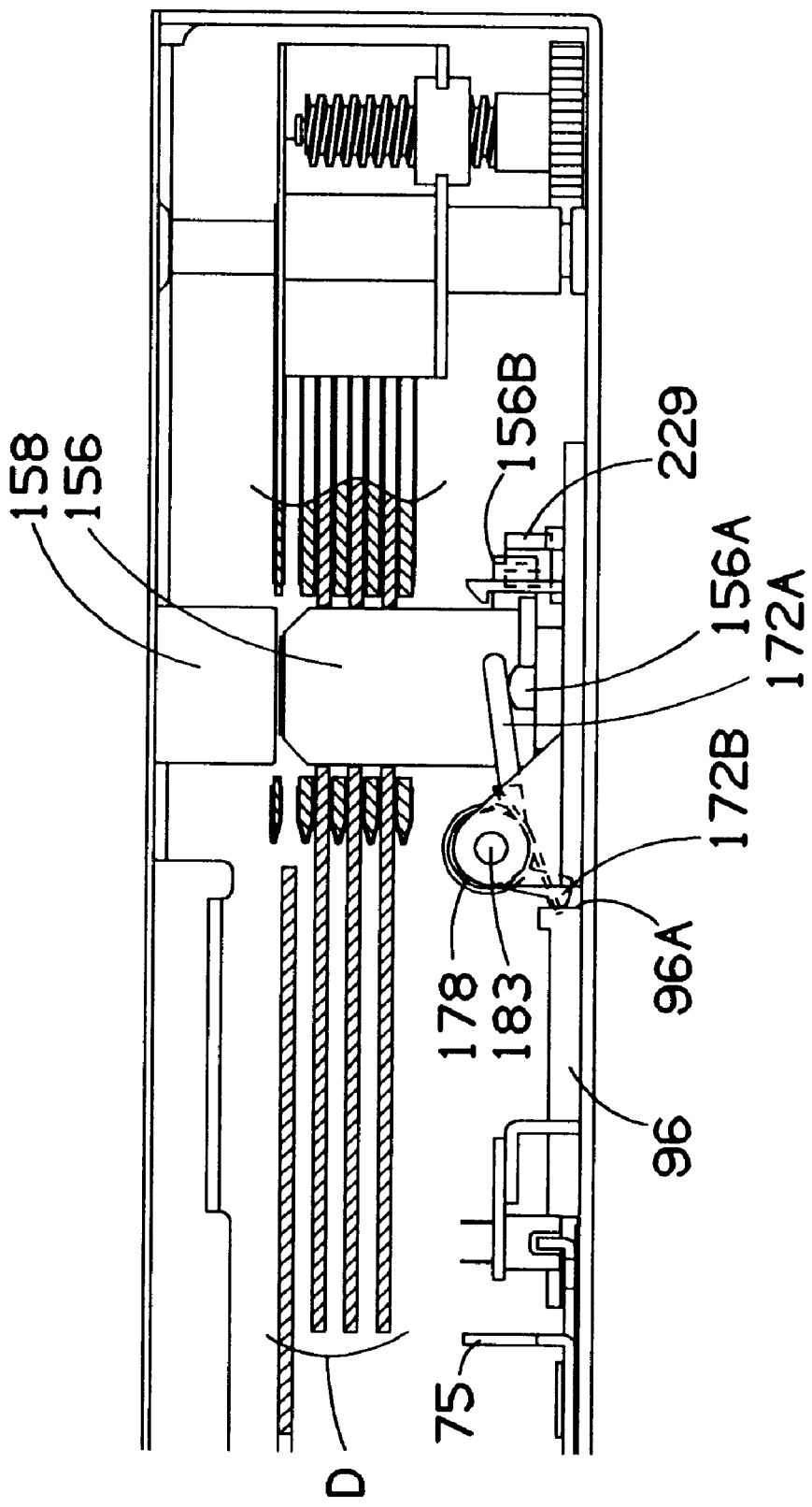
FIG. 50 is a schematic side-view of the disk-lock mechanism with sliding plate 75 in position UP-1.

Referring to FIGS. 12 and 45–48, a disk lock mechanism 1013, prevents disks, held in stocker 1011, from moving out of stocker 1011. An upper disk lock shaft 158 projects downwardly from a lower surface of top cover 3. Upper disk lock shaft 158 passes through spindle holes of disks stored in stocker 1011. A lower end of upper disk lock shaft 158 extends to a position slightly (0.8 mm) above an upper surface of a disk D being transported into stocker 1011 as shown in FIGS. 47 and 48. Upper disk lock shaft 158 prevents movement of the disks above the disk D being transported. FIGS. 46 and 48 show the stocker in position POS(1). Upper disk lock shaft 158 does not pass through any of the disk spindle holes within stocker 1011. A lower disk lock shaft 156 projecting upward from main chassis 90 is coaxially aligned with upper disk lock shaft 158.

Lower disk lock shaft 156 rides on a shaft 155A of disk lock base 155 permitting lower disk lock shaft 156 to move vertically. Lower disk lock shaft 156 moves between a lock position and an unlock position. In the lock position, a tapered upper end of lower disk lock shaft 156 fits into upper disk lock shaft 158 (see FIG. 46). In the unlock position, lower disk lock shaft 156 is lowered away from upper disk lock shaft 158, creating a gap between upper and lower disk lock shafts 158 and 156 through which a disk can pass (see FIG. 48). A spring 159 inside lock shaft 156 applies an upward force on lower disk lock shaft 156. A sheet 157, of compressed urethane, is attached to the upper surface of lower disk lock shaft 156 to help avoid possible disk damage.

To raise and lower disk lock shaft 156, disk lock mechanism 1013 includes a lock release arm 172 rotatably supported by a shaft 183 of disk lock base 155. Lock release arm 172 has a pressing portion 172A that engages upper surfaces of projections 156A at a base of lower disk lock shaft 156. Spring 178 applies a clockwise rotating force to lock release arm 172 sufficient to overcome the force of spring 159 thereby forcing lower disk lock shaft 156 to its lowermost position. A relay plate 96 moves toward the front and rear guided by integral guide grooves 96C, 96C that engage pins 97 on main chassis 90. A rear-facing surface 96A of relay plate 96 pushes against an engagement portion 172B of lock release arm 172 to rotate lock release arm 172 counterclockwise against the force of spring 178. An engagement portion 96B on a lower surface of relay plate 96 engages with a cam surface 75D, having surfaces C1–C5, on an edge of sliding plate 75 (visible in FIGS. 45, 47, 49, and 51).

Referring now to FIGS. 12 and 45–52, lower disk lock shaft 156 is positioned responsively to the position of sliding plate 75. When sliding plate 75 is in a position DOWN-2, engagement portion 96B of relay plate 96 is engaged with surface C1 of cam surface 75D. In position DOWN-2, as shown in FIG. 46, lock release arm 172 is rotated to a position in which it exerts no downward force on lower disk lock shaft 156. Thus, in position DOWN-2, lower disk lock shaft 156 is seated in upper disk lock shaft 158, the lock position, held there by the force of spring 159.

When sliding plate 75 moves toward the right side of housing 1000 (toward the up position of optical mechanism 1006), engagement portion 96B of relay plate 96 follows sloped surface C2 of cain surface 75D, moving relay plate 96 toward the front of main chassis 90. As engagement portion 96B follows sloped surface C2, lock release arm 172 rotates clockwise under the urging of spring 178, forcing lower disk lock shaft 156 gradually downward. When sliding plate 75 reaches a position DOWN-1, shown in FIG. 47, engagement portion 96B of relay plate 96 rests on surface C3. Lock release arm 172 halts at the angle shown in FIG. 48, and lower disk lock shaft 156 is held at the unlock position, permitting disk transfer.

Figure 51:
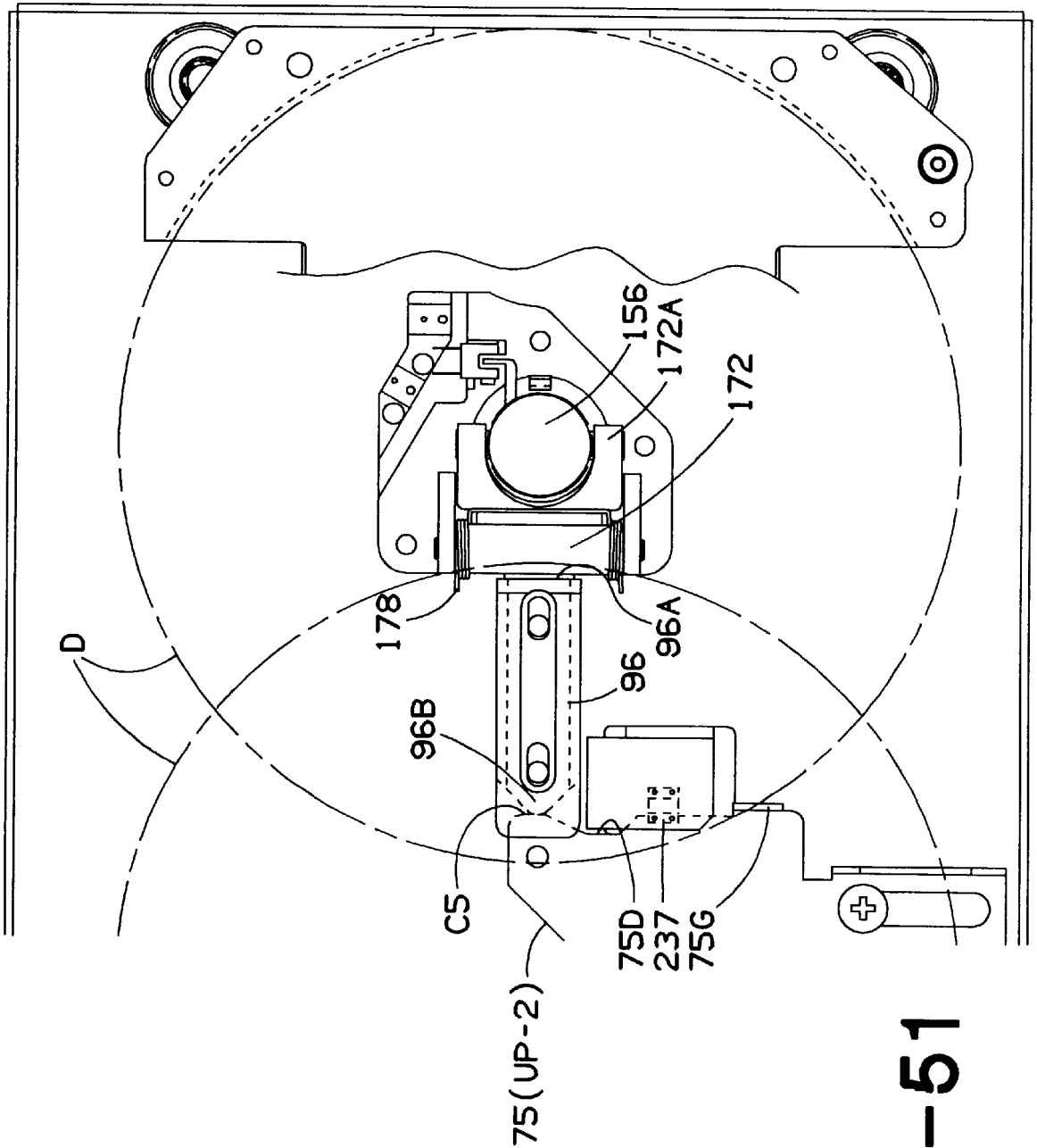
FIG. 51 is a top-view of the disk-lock mechanism with sliding plate 75 in position UP-2.

As sliding plate 75 is translated further to the right side of housing 1000, engagement portion 96B of relay plate 96 is pushed rearward by inclined surface C4. Lock release arm 172 rotates counterclockwise, and lower disk lock shaft 156 begins moving upwardly under the urging of spring 159. When sliding plate 75 reaches a position UP-1, shown in FIG. 49, engagement portion 96B is held by the approximately central area of sloped surface C4, in which lower disk lock shaft 156 moves upward to the position indicated in FIG. 50. When sliding plate 75 reaches a position UP-2, engagement portion 96B engages with surface C5, which is aligned with surface C1. At this point, as shown in FIG. 51, lower disk lock shaft 156 has reached the lock position again, where it fits into upper disk lock shaft 158.

A shutter 156B, projecting from lower disk lock shaft 156, indicates when lower disk lock shaft 156 reaches the lock position. Shutter 156B interrupts a light beam generated and detected by an optical sensor 229, attached to disk lock base 155 when lower disk lock shaft 156 is at the unlock position. Optical sensor 229 generates a disk lock signal ($\overline{\text{D. LOCK}}$), which is high when lower disk lock shaft 156 in the unlock position. When sliding plate 75 is at position UP-2 or position DOWN-2, lower disk lock shaft 156 is at the lock position, as described above. However, if disk D is not positioned with its center hole aligned with lower disk lock shaft 156, lower disk lock shaft 156 is blocked by disk D, preventing it from reaching the lock position. If disk locking is not properly achieved, vibrations can cause disks to shift out of place within stocker 1011, possibly causing damage to the disks by lower and upper disk lock shafts 156 and 158 which move vertically within stocker 1011. Signal $\overline{\text{D. LOCK}}$ is used to detect such disk-locking errors.

Disk Insertion Error Prevention Mechanism

Referring to FIGS. 2 and 53–57, a disk insertion error preventing mechanism 1014 prevents errors during insertion of disk D. A shutter 120 rotates on a shaft 129 rotatably supported at either end by bends 80F, 80F projecting from loading chassis 80. Flaps 120A, 120A, projecting radially from an axis of rotation of shutter 120, block insertion aperture IA on front panel 1. A pinion gear 120B, subtends a 180 degree arc about the axis of rotation of shutter 120. Material, such as felt or compressed urethane, is adhesively bonded to the surface of flaps 120A, 120A to prevent abrasion of the top surface of disk D, since the top surface of disk D engages flaps 120A during loading and ejecting operations.

A shutter arm 121 rotates on a shaft 122 on the lower surface of loading chassis 80. A spring 125 urges shutter arm 121 in a counterclockwise direction, as viewed from the top. A rack 121A on the bottom of shutter arm 121 meshes with pinion gear 120B. Thus, shutter 120 opens and closes responsively to the rotation of shutter arm 121. A pin 123, on the upper surface of the loading plate 81L, engages with side surface 121B of shutter arm 121 responsively to movement of plate 81L.

Referring now also to FIG. 58, the angle of shatter 120 changes responsively to the position of loading plate 81L. As loading plates 81L and 81R are converged from position POS.2 toward disk receiving position POS.1, pin 123 of loading plate 81L rotates shutter arm 121 clockwise against the urging of spring 125. The rotation of shutter arm 121 causes shutter 120 to rotate toward the outside of the device, moving it to the open position. This allows a disk to be inserted into insertion aperture 1A.

Figure 57:
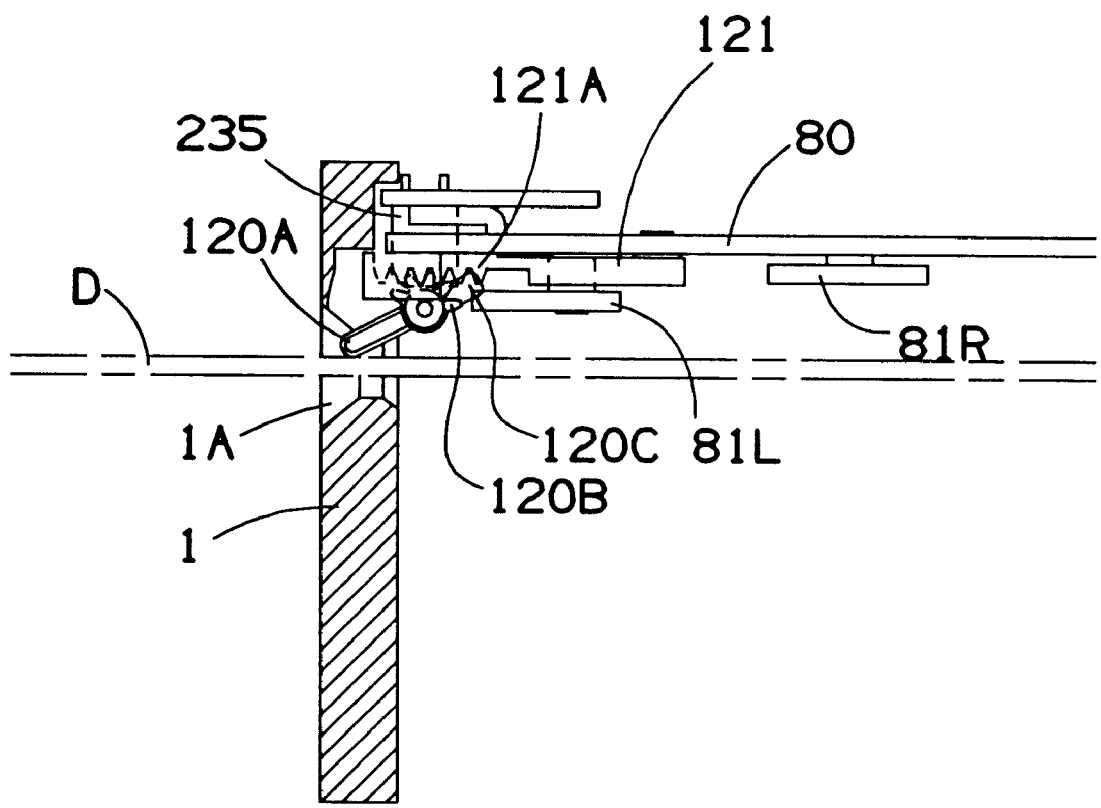
FIG. 57 is a schematic side-view of the disk insertion error preventing mechanism in the eject state.

The insertion of disk D causes loading plates 81L and 81R to separate. As loading plate 81L moves to the left side of housing 1000, pin 123 moves away from shutter arm 121 permitting spring 125 to rotate shutter arm 121 counterclockwise. As shutter arm 121 rotates, flaps 120A move downwardly until they rest on the top surface of disk D, as shown in FIG. 57. Pin 123 continues to move away from side surface 121B of shutter arm 121. Once disk D is driven by disk transfer mechanism 1001 completely inside the disk player, flap 120A is released to a close position in which shutter arm 121 is rotated counterclockwise to a position where its side surface 121B engages with bend 80F of loading chassis 80. When shutter 120 is in the close position, disk insertion through insertion aperture 1A is prevented. Shutter 120 cannot rotate past the close position in which flaps 120A point downwardly because an arm supporting rack 121A is supported by bend 80F, preventing further rotation of shutter 120. Thus, insertion of another disk is blocked.

A shutter piece 120C, on the upper part of shutter 120, interrupts a light beam generated by an optical sensor 235, on loading chassis 80, to detect the closure of shutter 120. The closure of shutter 120 is indicated by shutter close signal (S.CLOSE) generated by optical sensor 235. Signal S.CLOSE goes high when shutter 120 closes.

Referring now also to FIGS. 7, 15, and 17, the change in signal S.CLOSE to high (H) serves as a reference position for disk transport within the disk player. The disk transfer position is determined by counting the number of pulses from the output (signal $\overline{\text{L. PULSE}}$) of optical sensor 232 described above. When disk D is inserted and transported to position P1, flap 120A falls away from the upper surface of disk D, closing shutter 120. This causes signal S.CLOSE to go high. The movement of disk D to play position P2 and stock position P3 are determined by counting pulses from signal $\overline{\text{L. PULSE}}$. For play position P2, six pulses are counted (See FIG. 15). For stock position P3, 160 pulses are counted (See FIG. 17). Each of the previous two counts are begun after S.CLOSE goes high ("H").

Drive Control Circuit

Figure 60:
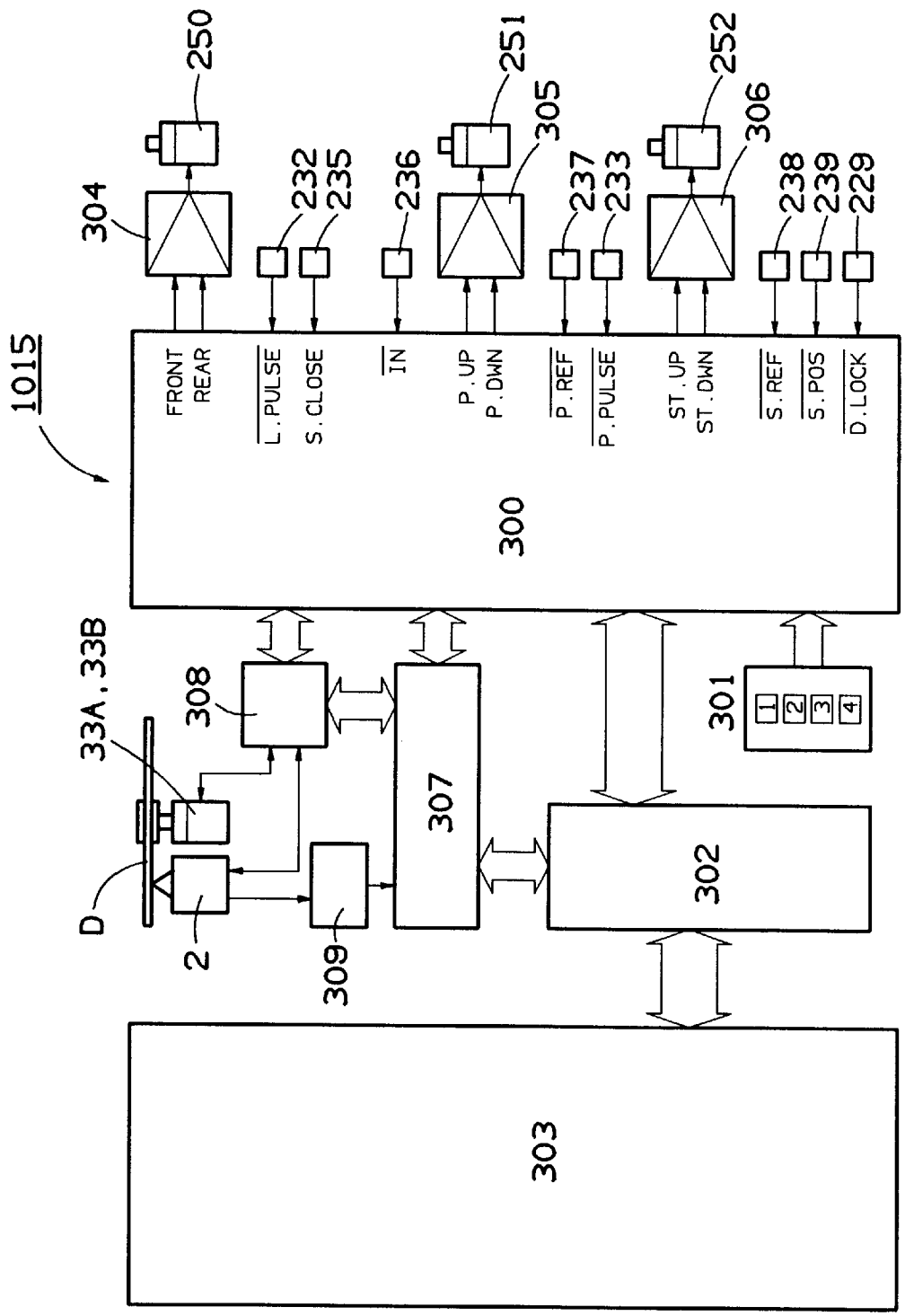
FIG. 60 is a block diagram of a drive control circuit.

Referring to FIG. 60, a drive control circuit 1015 includes a system controller 300 including ROM, RAM, an interface circuit and other elements with one or more microprocessors. Controller 300 is connected to mode keys 301, among them, a E/L key 1 through E/L key 4, which causes the device to eject and load disks D stored in positions 1–4 of the stocker, respectively. Controller 300 is also connected to a computer 303 via an interface circuit 302. Controller 300 controls mechanism operations corresponding to mode key entries and commands from computer 303 according to the flowcharts of FIGS. 61–71.

Controller 300 receives signal $\overline{\text{L.PULSE}}$, signal S.CLOSE and signal $\overline{\text{IN}}$, from optical sensors 232, 235 and 236, respectively. Based on these signals, controller 300 outputs a signal FRONT and a signal REAR to control motor drive circuit 304, thus controlling the disk transfer position and the opening and closing position of loading plates 81L and 81R. Motor drive circuit 304 is a drive circuit that generates a prescribed drive voltage for drive motor 250 in roller drive mechanism 1004 (see FIG. 7). When signal FRONT changes to "H", a drive voltage is output to rotate a timing pulley 15 clockwise. When signal REAR is "H", a drive voltage is generated to rotate motor 250 in the opposite direction. When both signals are "H", the output from motor drive circuit 304 is shorted and an electromagnetic brake is applied to motor 250. When both signals are "L", the output is placed in an open state.

Controller 300 also receives signals $\overline{\text{P. REF}}$ and $\overline{\text{P. PULSE}}$ from optical sensors 237, 233, respectively. Based on these signals, controller 300 outputs signal P.UP and signal P.DWN to control the output of motor drive circuit 305 to control the position of sliding plate 75. Motor drive circuit 305 outputs a prescribed drive voltage to drive motor 251 of lift mechanism 1008 (FIG. 10). When signal P.UP is "H", a drive voltage is output to move sliding panel 75 in the up direction (to the right of the device). When signal P.DWN is "H", a drive voltage is output to move the panel in the opposite direction. When both signals are "H", the output from motor drive circuit 305 is shorted and an electromagnetic brake is applied to motor 251. When both signals are "L", the output is placed in an open state.

Controller 300 also receives signal $\overline{\text{S. REF}}$, signal $\overline{\text{S. POS}}$ and signal $\overline{\text{D. LOCK}}$, from optical sensors 238, 239 and 229, respectively. Based on these signals, controller 300 outputs signal ST.UP and signal ST.DOWN, which control the output from motor drive circuit 306, which moves stocker 1011 vertically. Motor drive circuit 306 is a drive circuit which generates a prescribed drive voltage to drive motor 252 of stocker vertical transfer mechanism 1012 (FIG. 11). When signal ST.UP is "H", a drive voltage is output to move stocker 1011 upward. When signal ST.DOWN is "H", a drive voltage to move the stocker in the reverse direction is output. When both signals are "H", the output from motor drive circuit 306 is shorted, and an electromagnetic brake is applied to motor 252. When both signals are "L", the output is placed in an open state. When the power supply is off, controller 300 is connected to a backup power supply not shown in the drawing so that the flags in memory indicating stocker position, presence of disks.

The read signal read by optical pickup 2 is sent to a signal processing circuit 307 via an RF amp 309. After EFM demodulation, deinterleaving, error correction and other related processes are performed, the signal is sent to computer 303, which is connected externally, via an interface circuit 302. Based on a servo error signal obtained from optical pickup 2, servo circuit 308 controls the focus servo, tracking servo and feed servo of optical pickup 2, and a light beam follow s the data tracks on disk D. Signal processing circuit 307 and servo circuit 308 are connected to controller 300, and control operations are performed based on the operating mode.

Description of Control flow

Referring to the flowcharts in FIG. 61–FIG. 71, the operation of an embodiment of the invention are defined by flowchart. In the flowcharts, "n" refers to a memory indicating the number of the position (1 through 4) in the stocker, and is set according to the stocker position. D.FLAG (n) are flags that indicate the presence of disks in the holding positions POS(1)–POS(4) of the stocker. For example, if D.FLAG(1) is set to "1", this indicates that a disk is stored in holding position POS(1), the topmost level of the stocker. M.FLAG indicates the operating mode of the device. Referring to FIG. 13, M.FLAG is set to "READY" when in the disk receiving state. Referring to FIG. 18, when disk D is brought to the eject position, M.FLAG is set to "EJECT". Referring to FIG. 15, when disk D is clamped and loading plates 81L, 81R are in the open position, M.FLAG is set to "STAND-BY". Referring to FIG. 17, M.FLAG is set to "STOCK" when the disk is moved to the stock position and loading plates 81L, 81R are moved to the open position. Also, in the stand-by state, M.FLAG is set to "PLAY" when disk playback is commenced.

The following describes the operating states of the present embodiment for each of the above operating modes.

Disk Receiving State (M.FLAG=READY)

(1) Disk transfer mechanism 1001 is in the disk receiving state, and loading plates 81L, 81R are brought to disk receiving position POS.1 (see FIG. 13).

Figure 19:
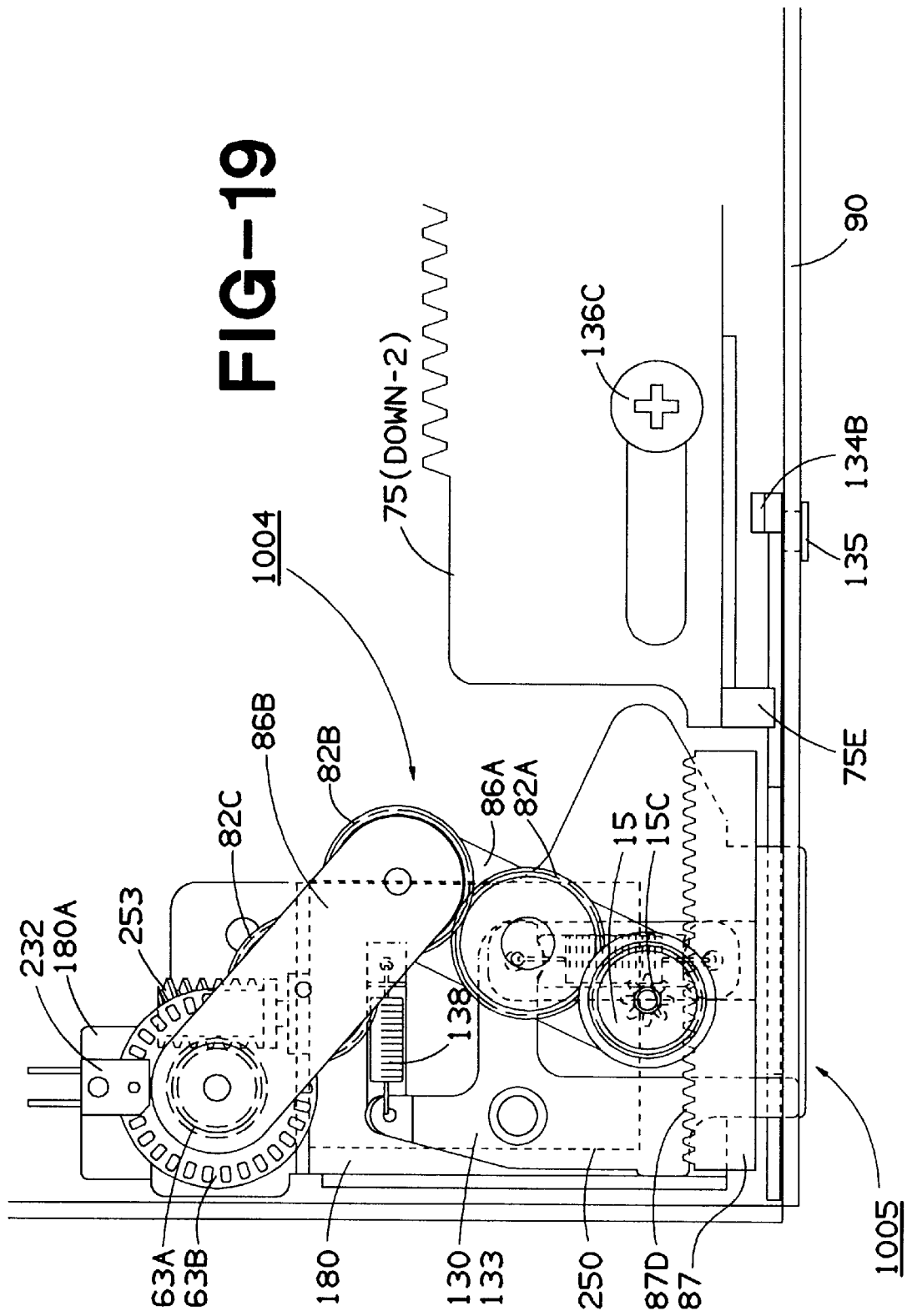
FIG. 19 is a top-view of the loading plate open/close mechanism during a disk-receiving state.
Figure 20:
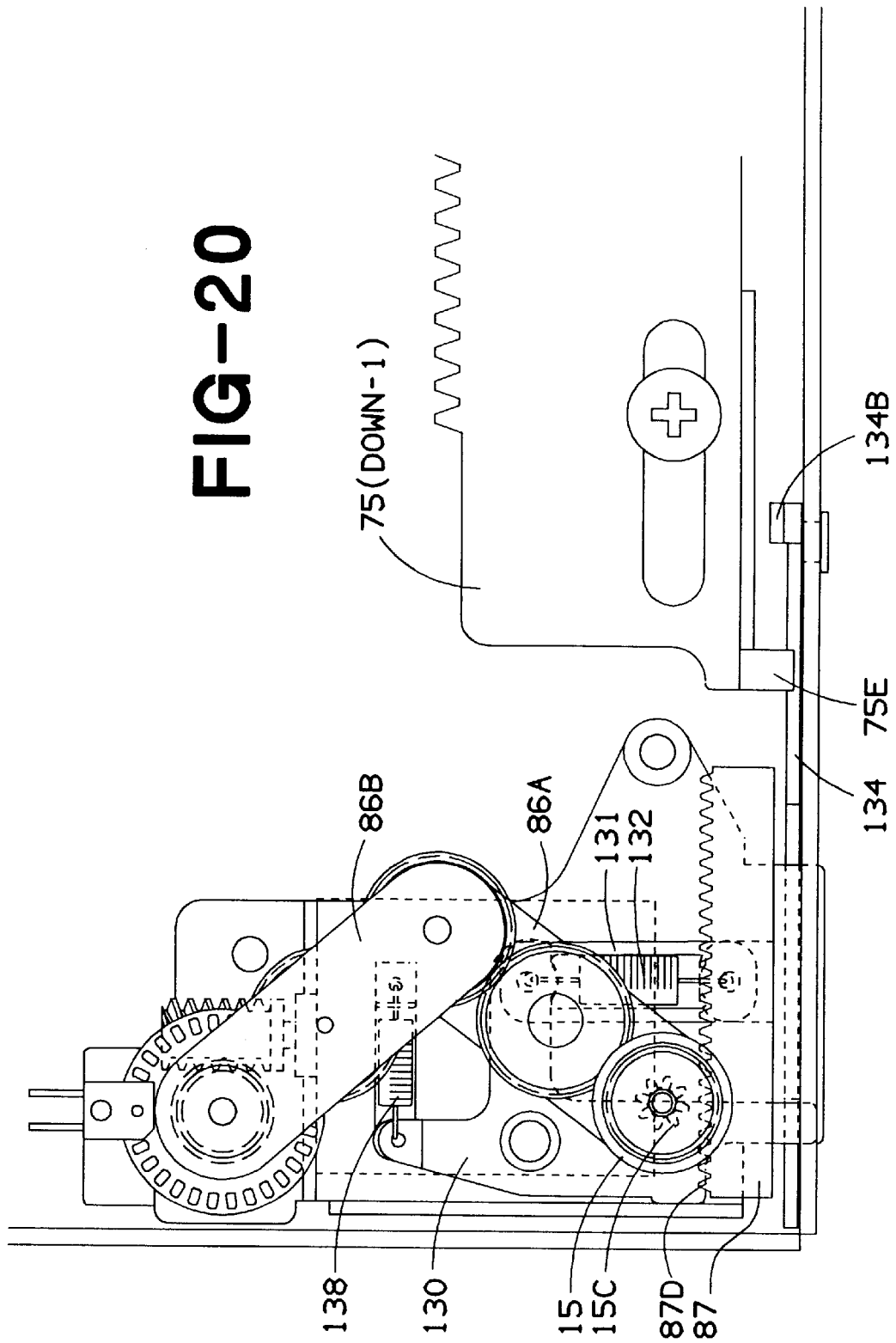
FIG. 20 is a top-view of the loading plate open/close mechanism during a disk transfer state.
Figure 21:
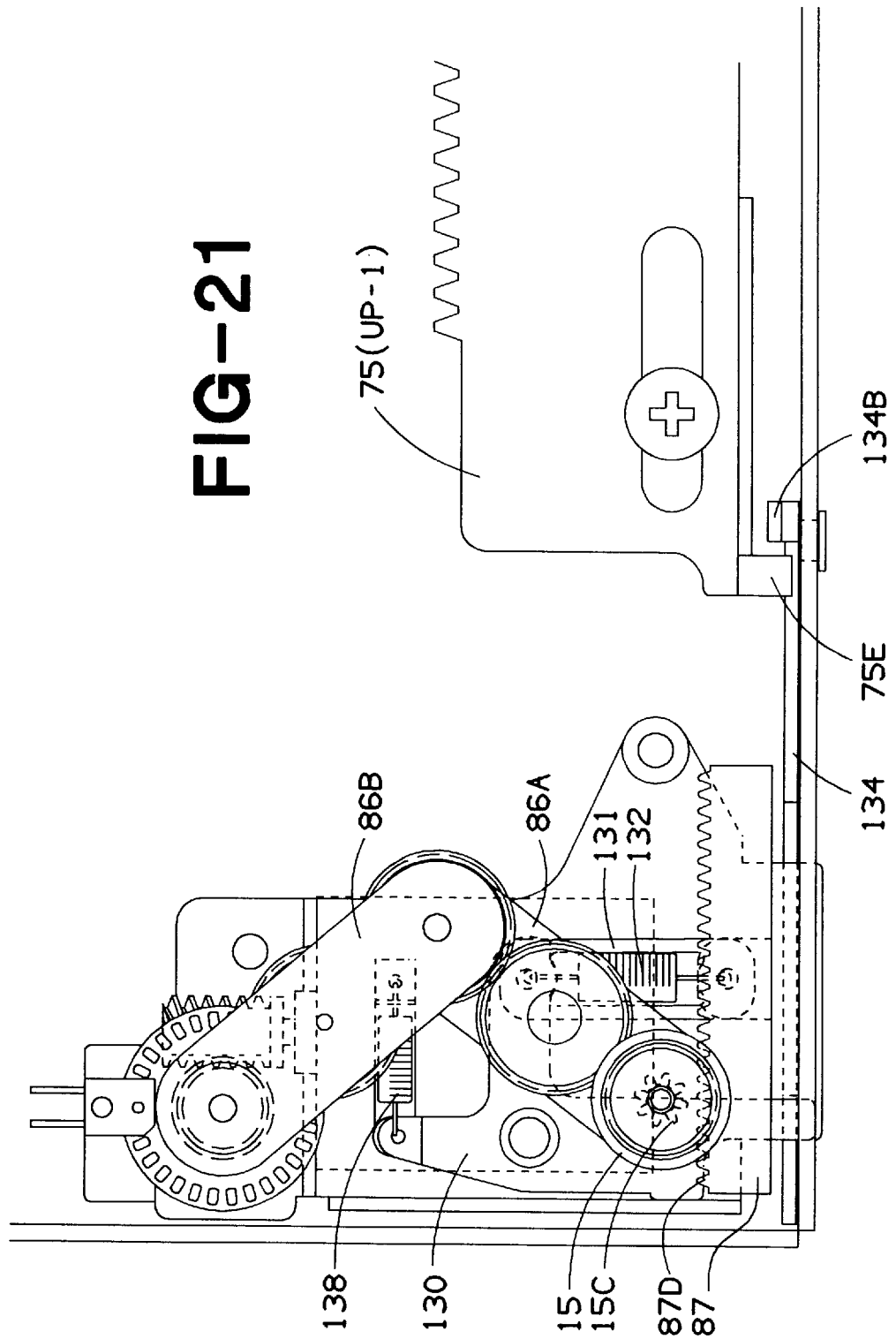
FIG. 21 a top-view of the loading plate open/close mechanism with sliding plate in position UP-1.

(2) Loading plate opening/closing mechanism 1004 is in an off state, and rack member 87 is moved away from timing pulley 15 (see FIG. 19).

Figure 24:
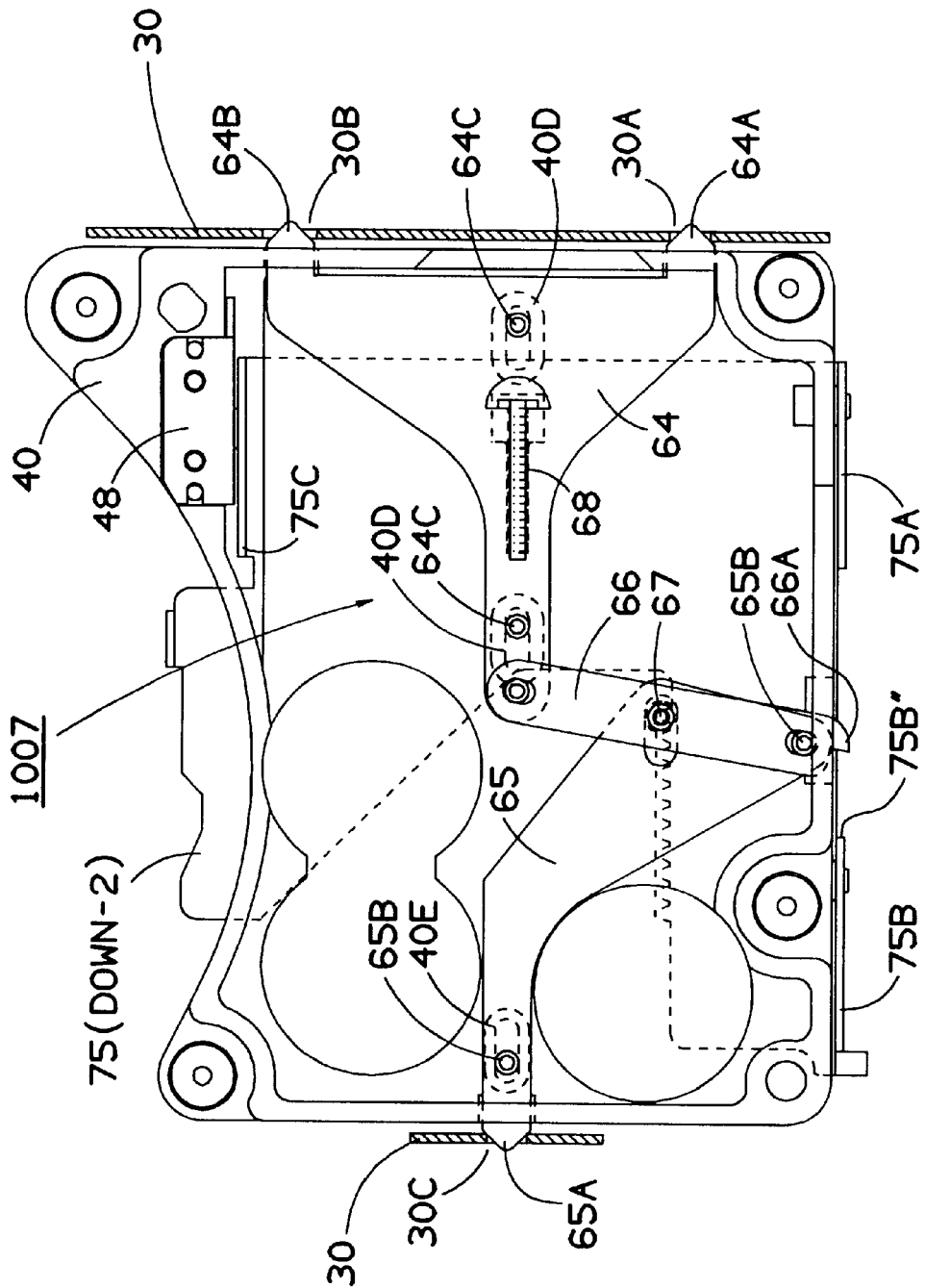
FIG. 24 is a top-view of a damper lock mechanism with a sliding plate in position DOWN-2.
Figure 25:
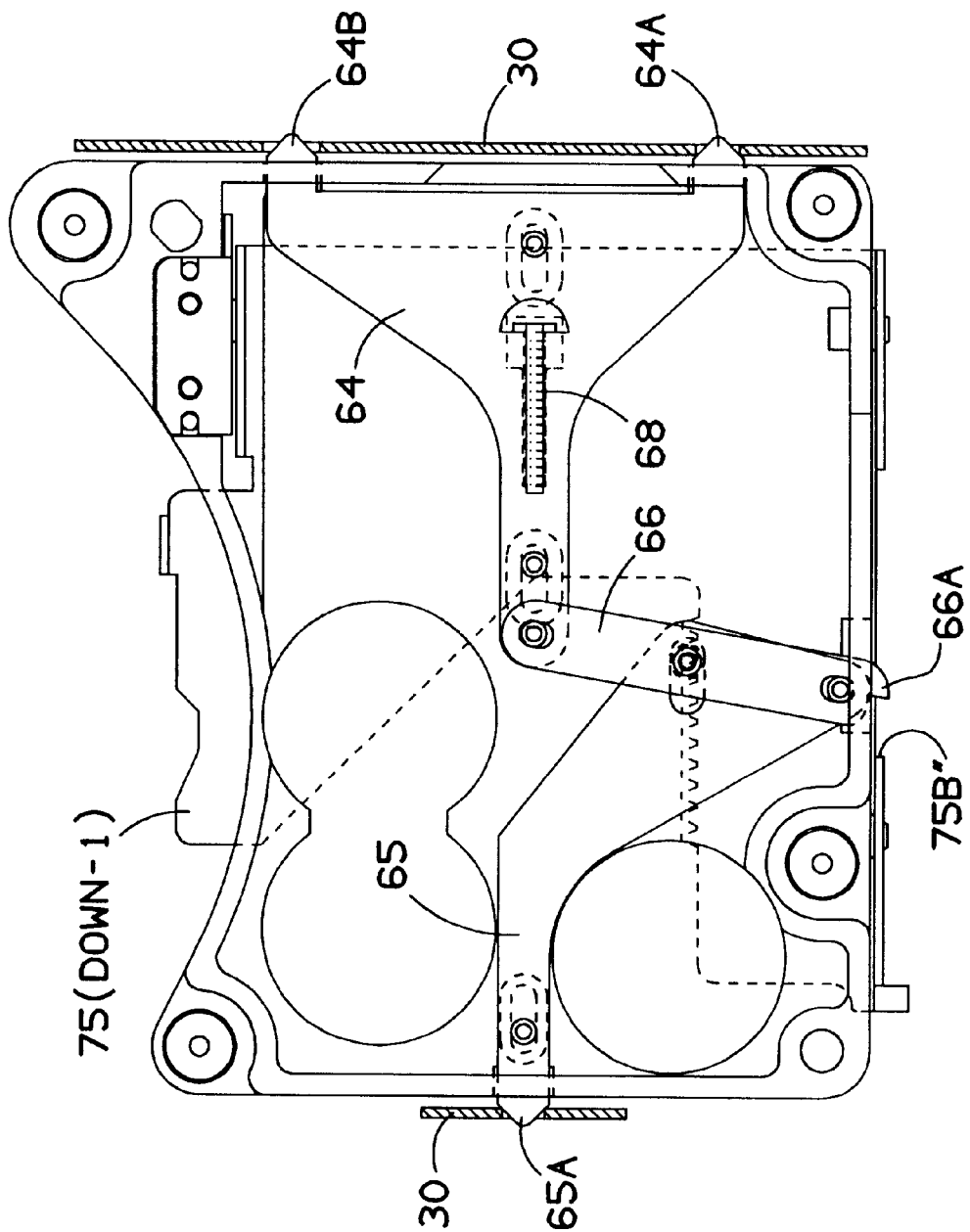
FIG. 25 is a top-view of the damper lock mechanism at a point where the sliding plate in a position DOWN-1.
Figure 26:
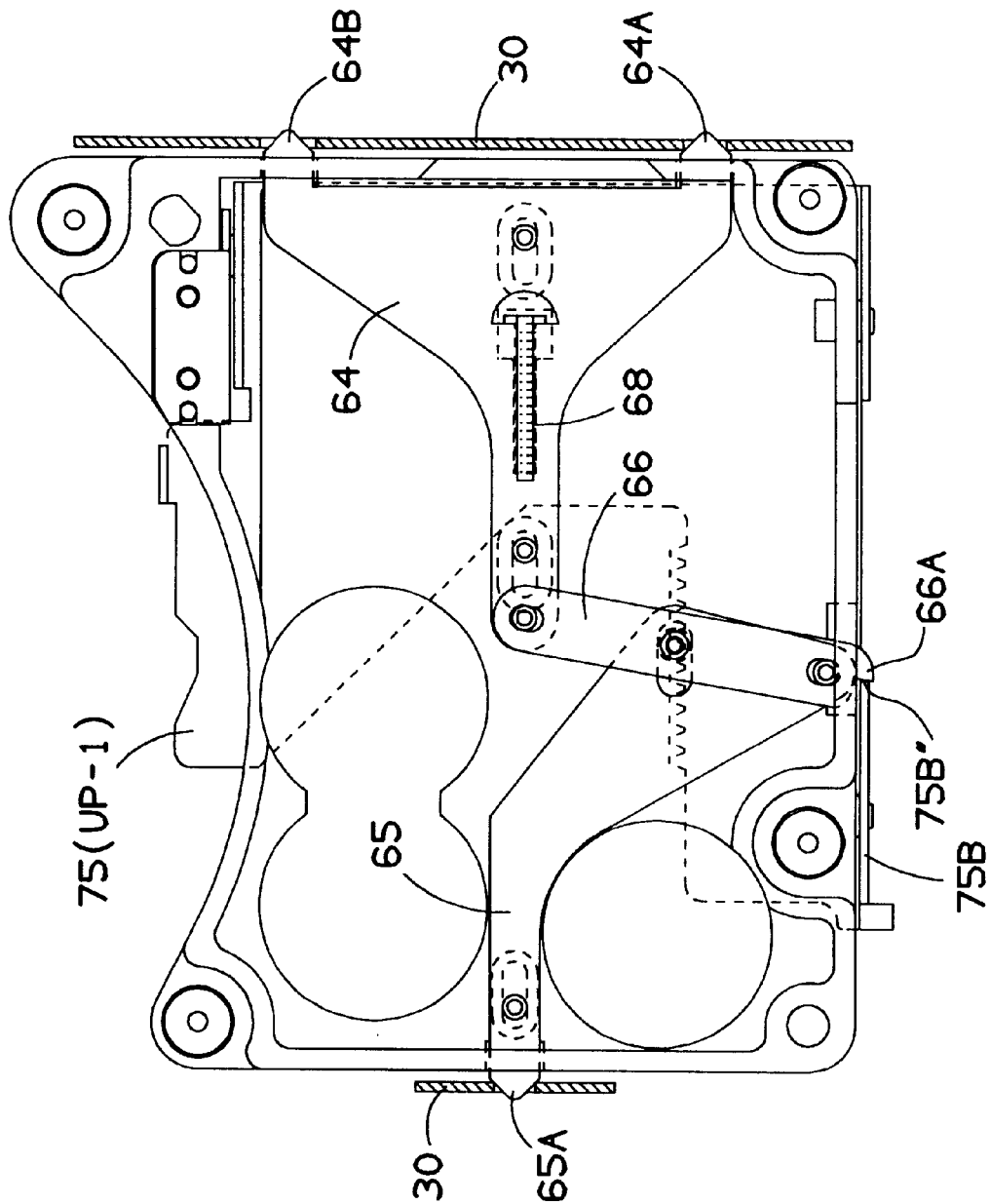
FIG. 26 is a top-view of the damper lock mechanism at a point where the sliding plate in a position UP-1.

(3) Damper lock mechanism 1007 is in a locked state, and optical mechanism 1006 is locked relative to base 40 (see FIG. 24).

(4) Sliding plate 75 is brought to position DOWN-2 (see FIG. 28, FIG. 29), and lift mechanism 1008 moves optical mechanism 1006 to the down position (see FIG. 37).

Figure 36:
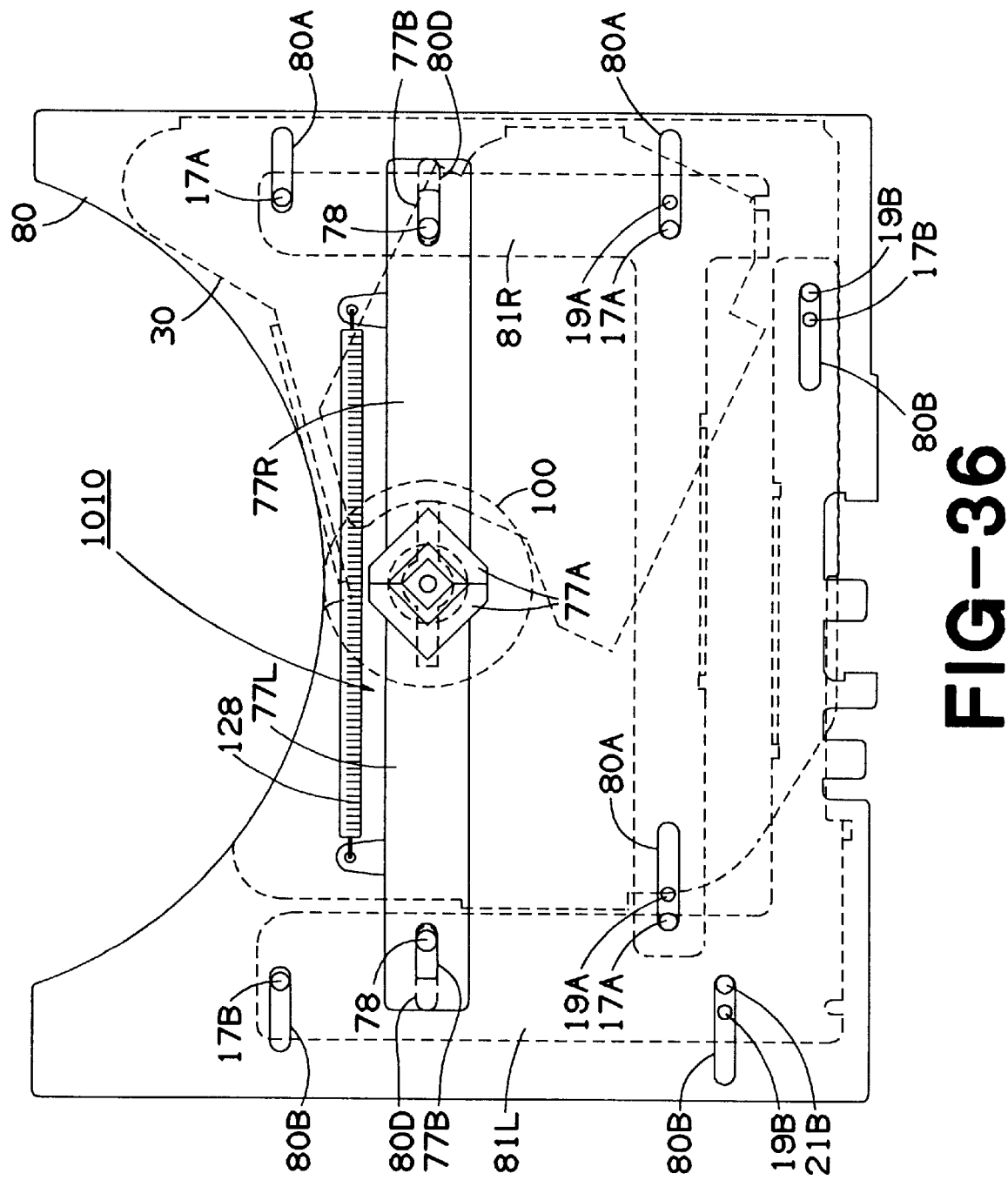
FIG. 36 is a top-view of the clamper support mechanism in the disk receiving state.

(5) Clamper support mechanism 1010 position3 damper 1009 at the support position (see FIG. 36, FIG. 37).

(6) Disk lock mechanism 1013 is in a locked state, and lower disk lock shaft 156 is moved to the lock position, to close the gap between lower and upper disk lock shafts 156 and 158 (see FIG. 45, FIG. 46).

Figure 53:
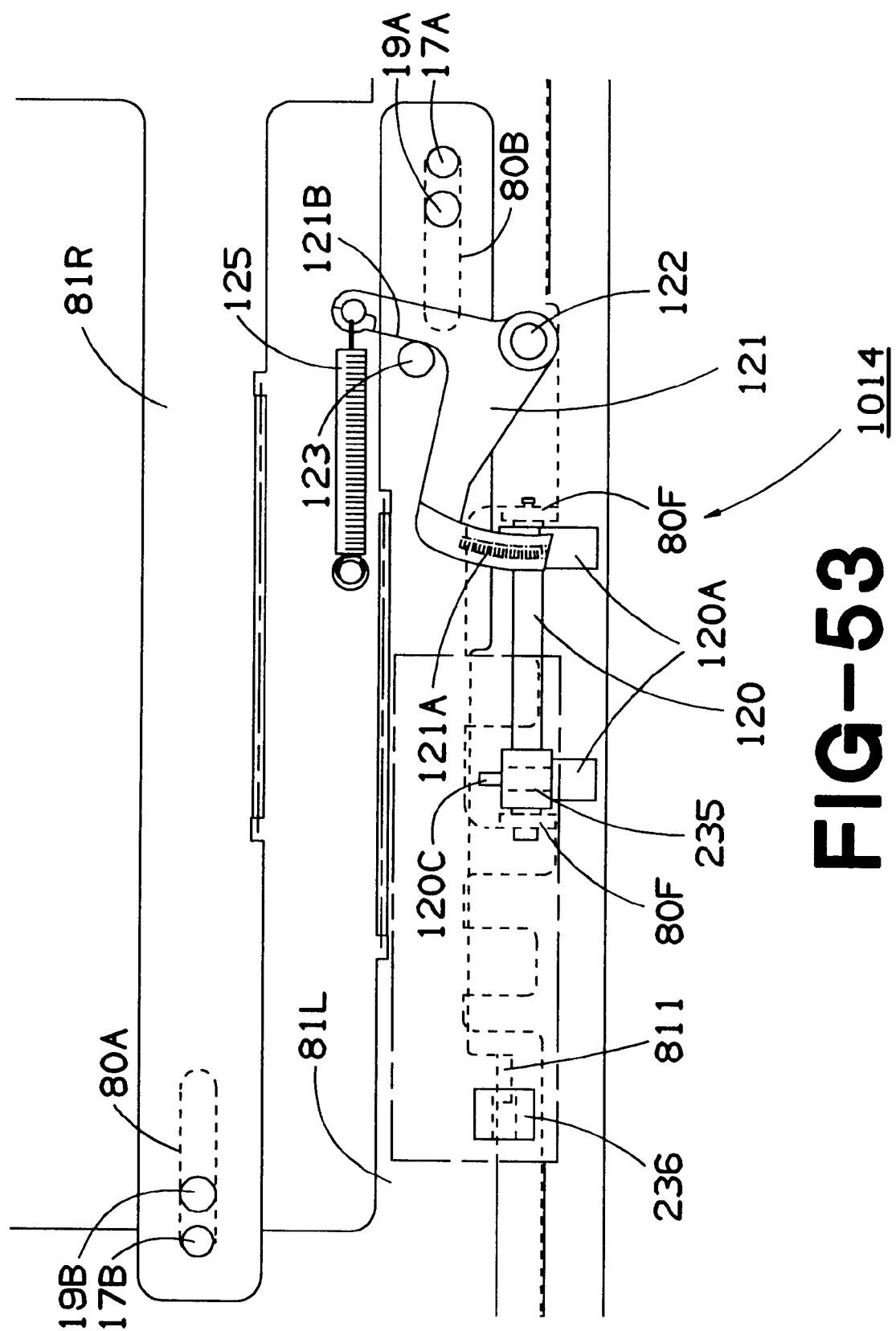
FIG. 53 is a top-view of the disk insertion error prevention mechanism during the disk-receiving state.
Figure 54:
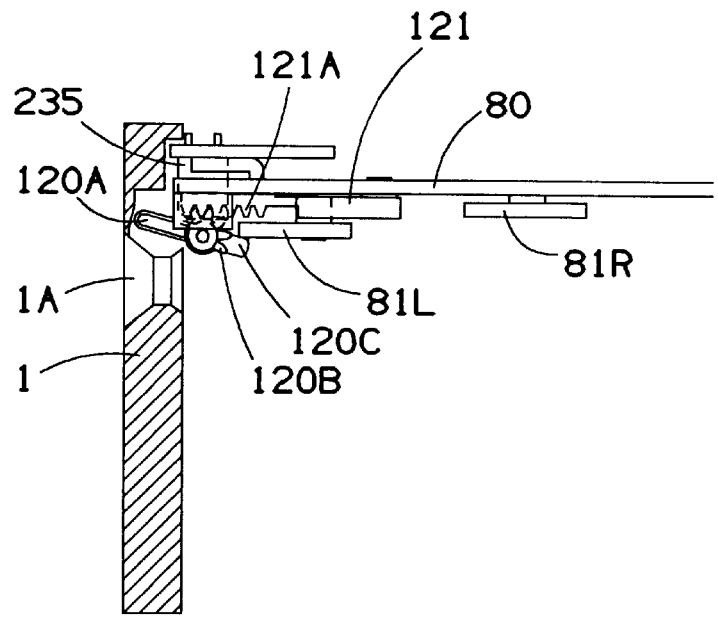
FIG. 54 is a schematic side-view of the disk insertion error prevention mechanism during the disk-receiving state.

(7) Disk insertion error prevention mechanism 1014 is in an open state, and shutter 120 is moved to an open position, where a disk can be inserted into disk insertion opening 1*a* (FIG. 53, FIG. 54).

Eject state (M.FLAG=EJECT)

(1) Disk transfer mechanism 1001 brings disk D to the eject position, the point where spindle hole Ds is outside of the device. Loading plates 81L, 81R are closed to disk receiving position POS.1 (see FIG. 18).

(2) Loading plate opening/closing mechanism 1004 is in an off state, and rack member 87 is disengaged from timing pulley 15 (see FIG. 19).

(3) Damper lock mechanism 1007 is in a locked state, and optical mechanism 1006 is locked relative to base 40 (see FIG. 24).

(4) Lift mechanism 1008 brings sliding plate 75 to position DOWN-2 (see FIGS. 28 and 29), causing optical mechanism 1006 to move to the down position (see FIG. 37).

(5) Clamper support mechanism 1010 raises damper 1009 to the support position (see FIGS. 36 and 37).

(6) Disk lock mechanism 1013 is in a locked state, and lower disk lock shaft 156 is brought to a locked position (see FIGS. 45 and. 46).

(7) Disk insertion error prevention mechanism 014 is in an open state. The positioning of shutter 120 is held at an open position as shown in FIGS. 53 and 54.

Stand-by state (M.FLAG=STAND-BY)

Figure 16:
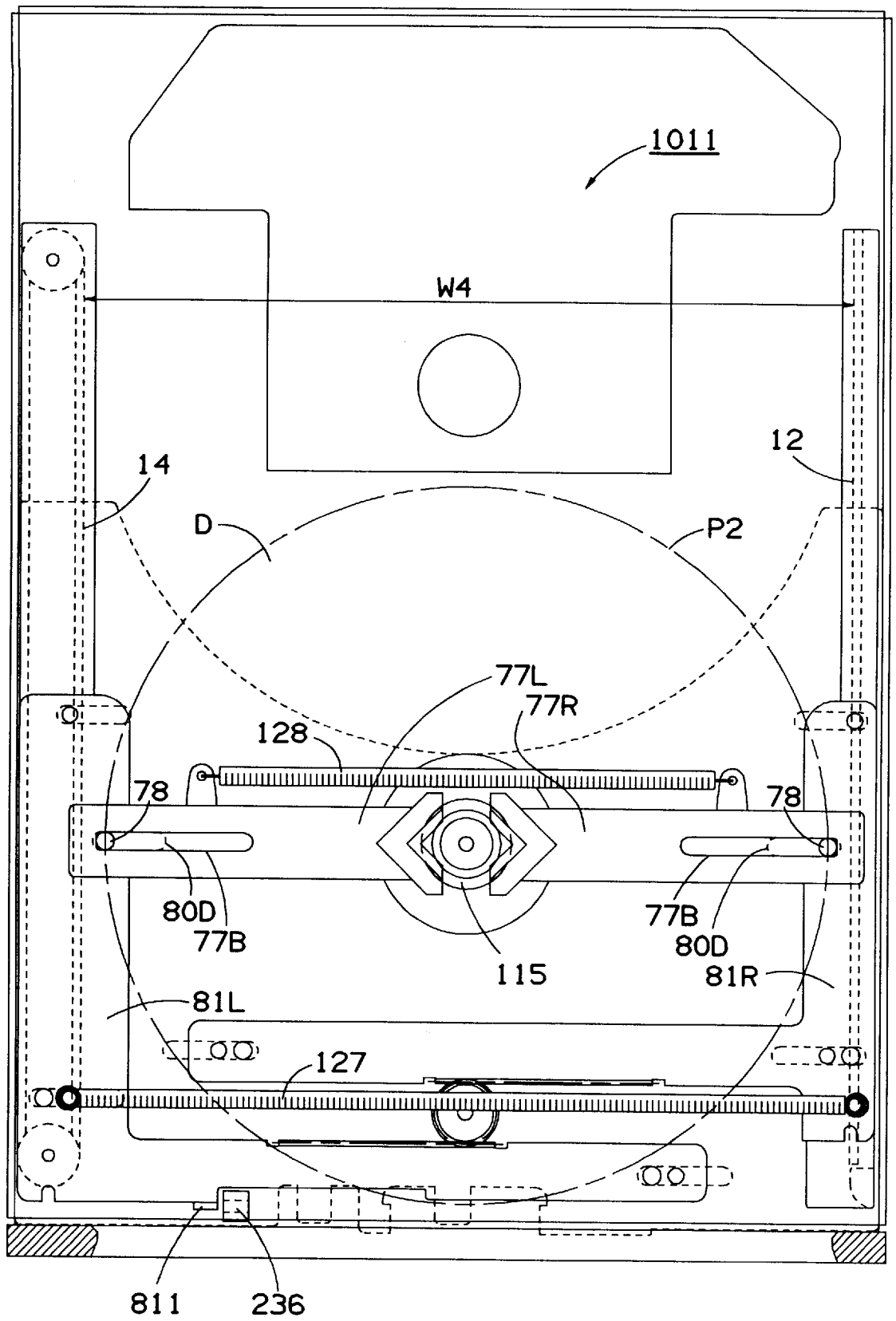
FIG. 16 is a top-view of the disk transfer mechanism in a stand-by state.

(1) Disk transfer mechanism 1001 is moved to the open position POS.3, where timing belt 14 and friction belt 12 are separated from the outer perimeter De of disk D (see FIG. 16).

(2) Loading plate open/close mechanism 1004 is in an on state. Rack member 87 is engaged from timing pulley 15, and disk transfer mechanism 1001 is maintained in the open position POS.3 (see FIG. 23).

(3) Damper lock mechanism 1007 is in the unlocked state. Optical mechanism 1006 is elastically supported by lower and upper dampers 41 and 44 (see FIG. 27).

(4) Lift mechanism 1008 brings sliding plate 75 to position UP-2 (see FIG. 34, FIG. 35), and moves optical mechanism 1006 to the up position (see FIG. 43).

(5) Clamper support mechanism 1010 releases the support on damper 1009, and damper 1009 clamps disk D to turntable 102 (see FIG. 42 and FIG. 43).

Figure 52:
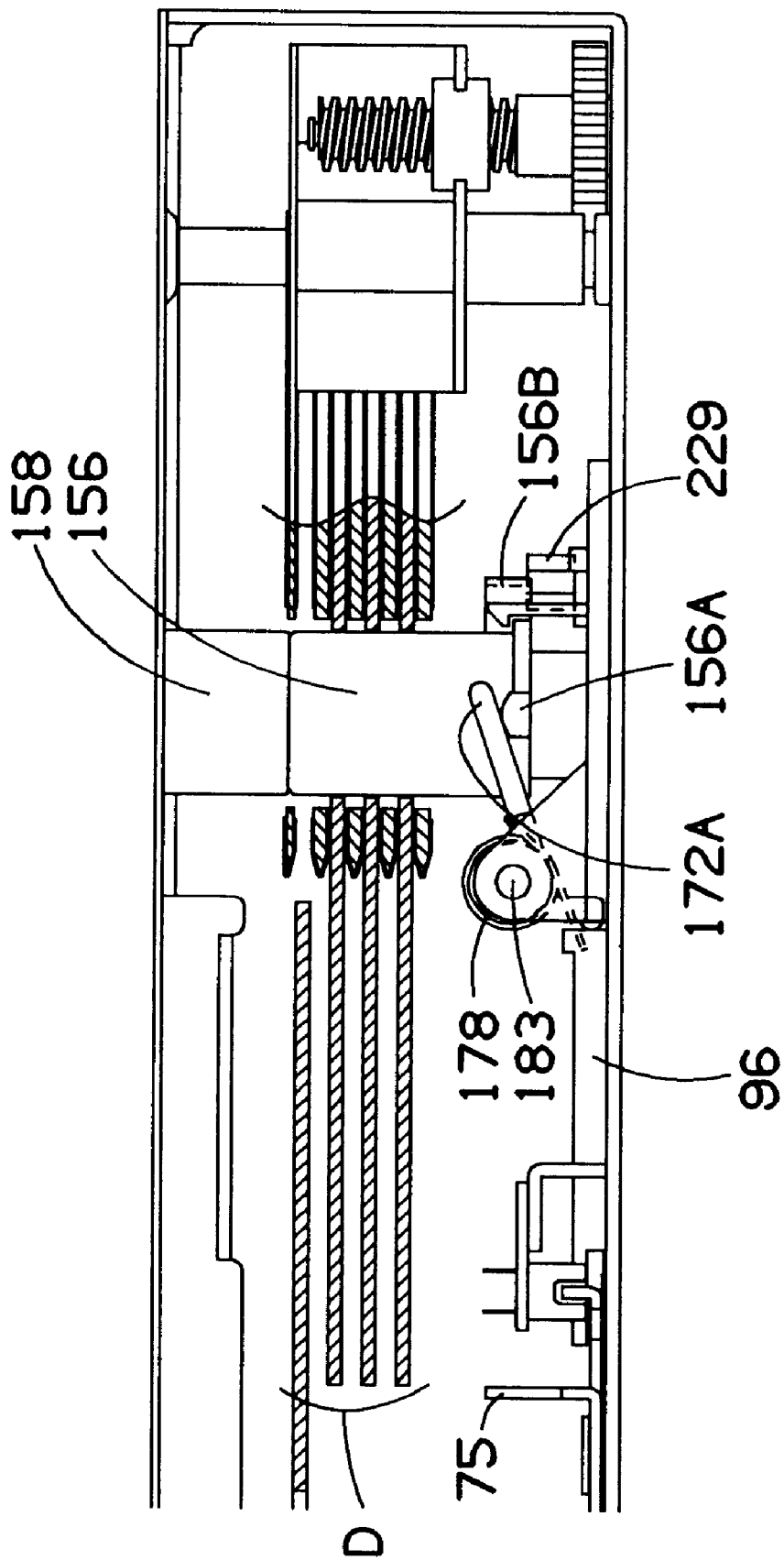
FIG. 52 is a schematic side-view of the disk-lock mechanism with sliding plate 75 in position UP-2.

(6) Disk lock mechanism 1013 is in the locked state, and lower disk lock shaft 156 is moved to a locked position (see FIG. 51, FIG. 52).

Figure 56:
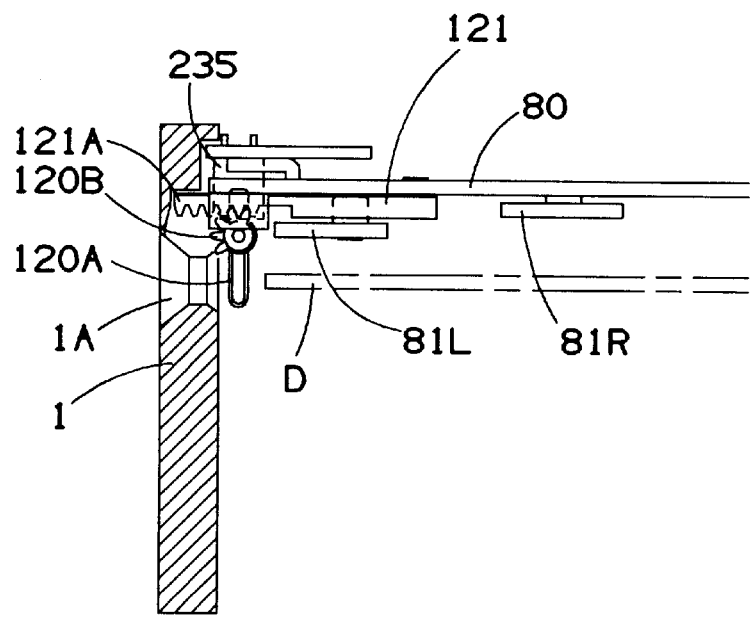
FIG. 56 is a schematic side-view of the disk insertion error preventing mechanism while the loading plates are opening.

(7) Disk insertion error prevention mechanism 1014 is in a closed state, and shutter 120 is moved to a closed position preventing the insertion of a disk into disk insertion opening 1A (see FIG. 56).

Stock state (M.FLAG=STOCK)

(1) Disk transfer mechanism 1001 is moved to the open position POS.3, where timing and friction belts 14 and 12 are separated from outer perimeter De of disk D (see FIG. 17).

(2) Loading plate opening/closing mechanism 1004 is in the on state. Rack member 87 is engaged with timing pulley 15, and disk transfer mechanism 1001 is held in the open position POS.3 (see FIG. 23).

Figure 27:
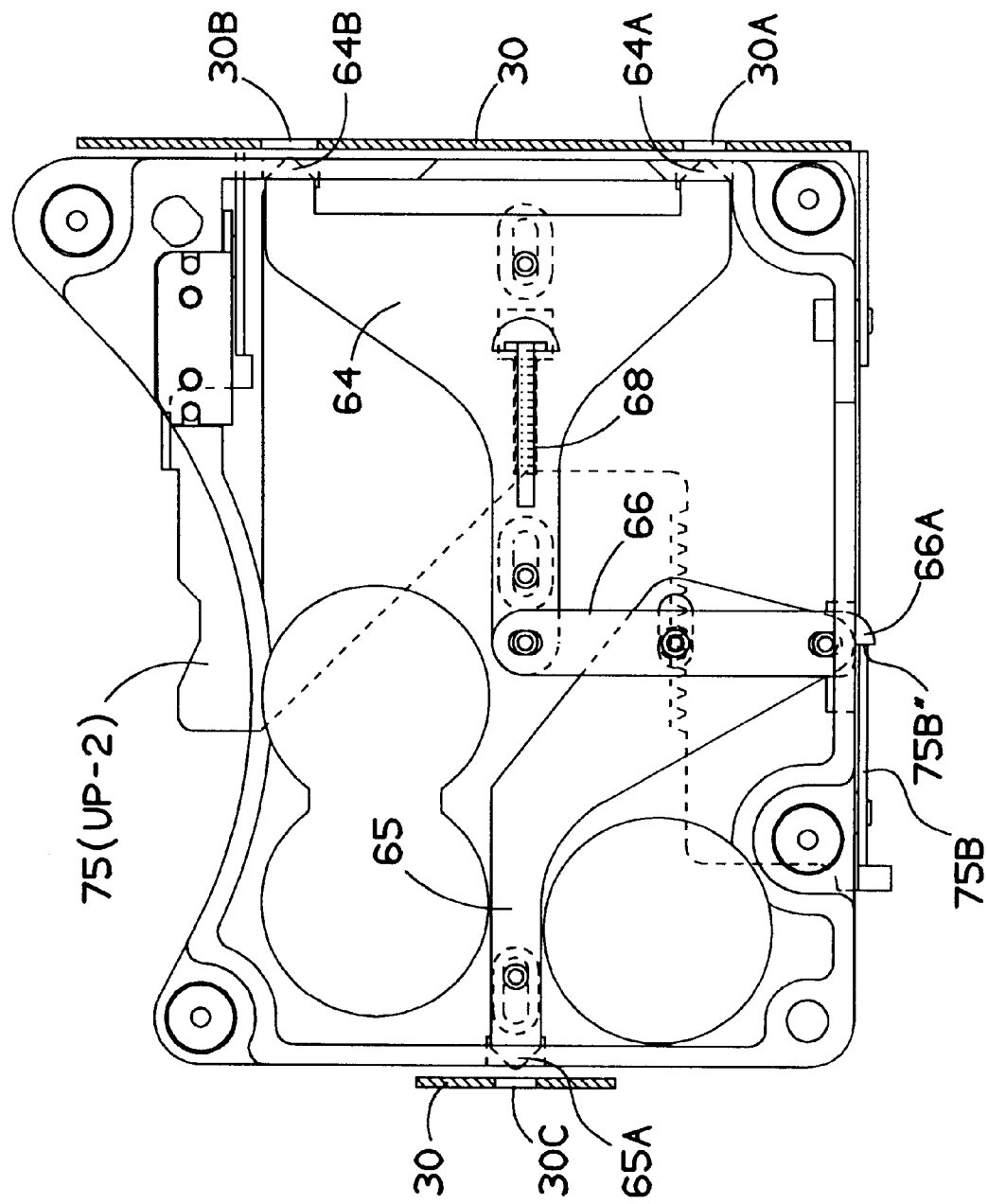
FIG. 27 is a top-view of the damper lock mechanism with sliding plate 75 in position UP-2.
Figure 28:
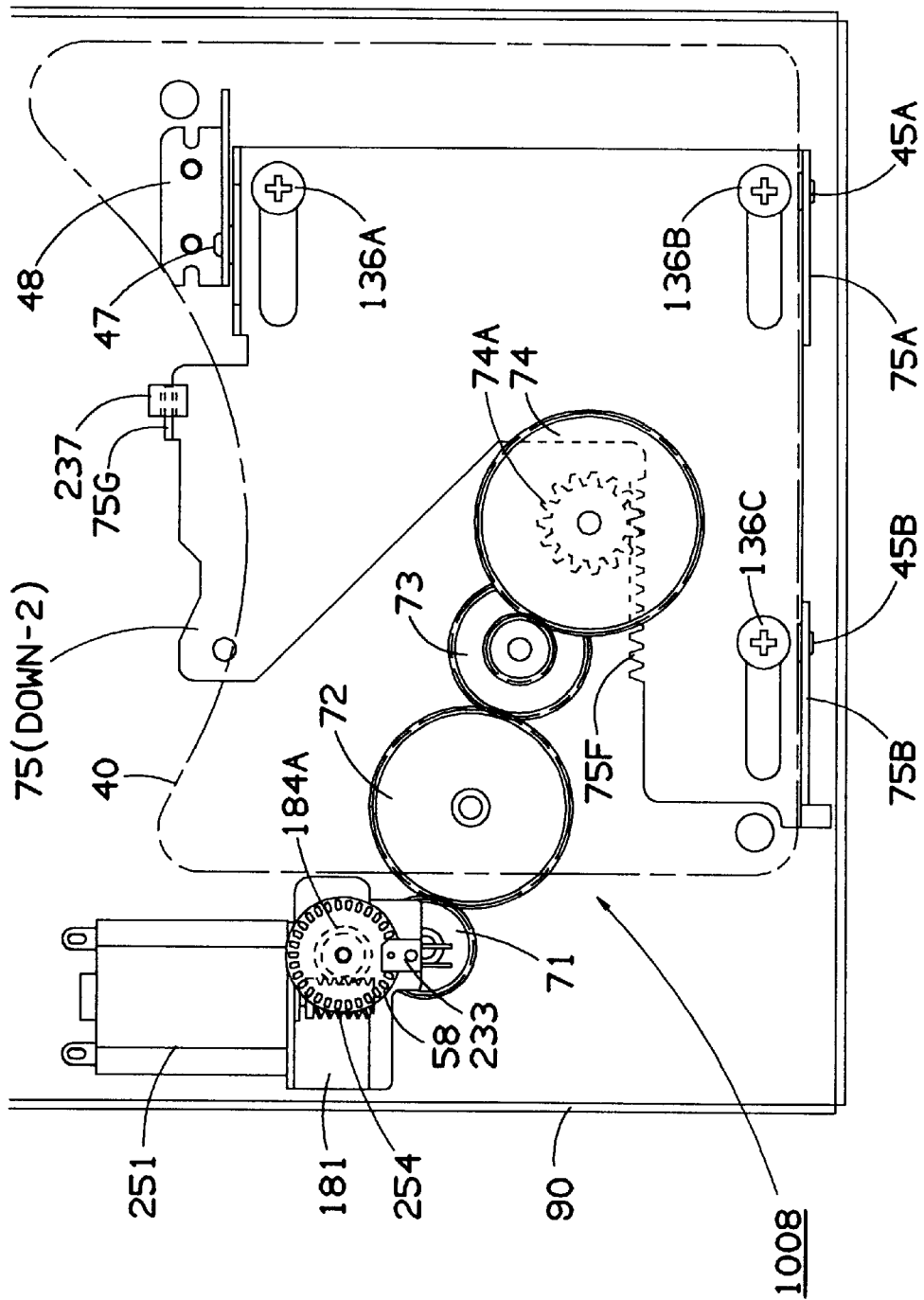
FIG. 28 is a top-view of the optical mechanism vertical transfer mechanism with sliding plate in position DOWN-2.
Figure 29:
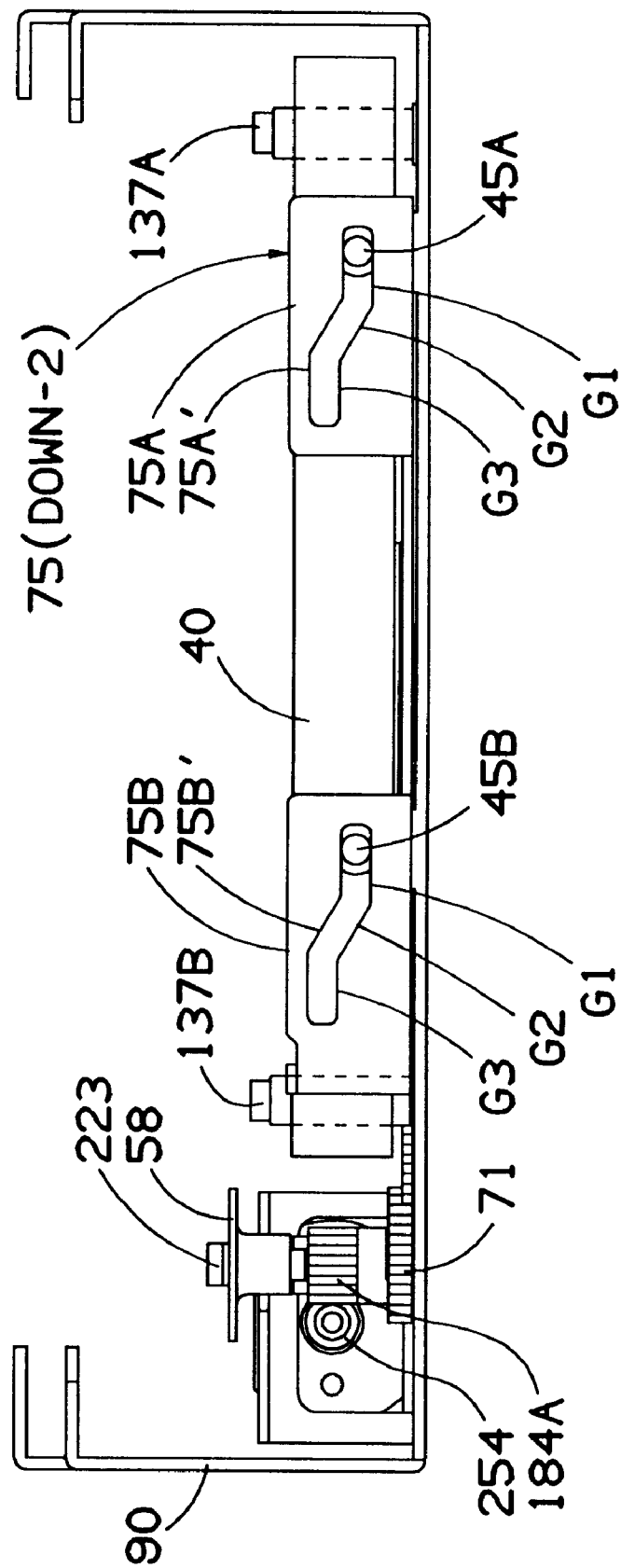
FIG. 29 is a side-view of the optical mechanism vertical transfer mechanism with sliding plate in position DOWN-2.
Figure 30:
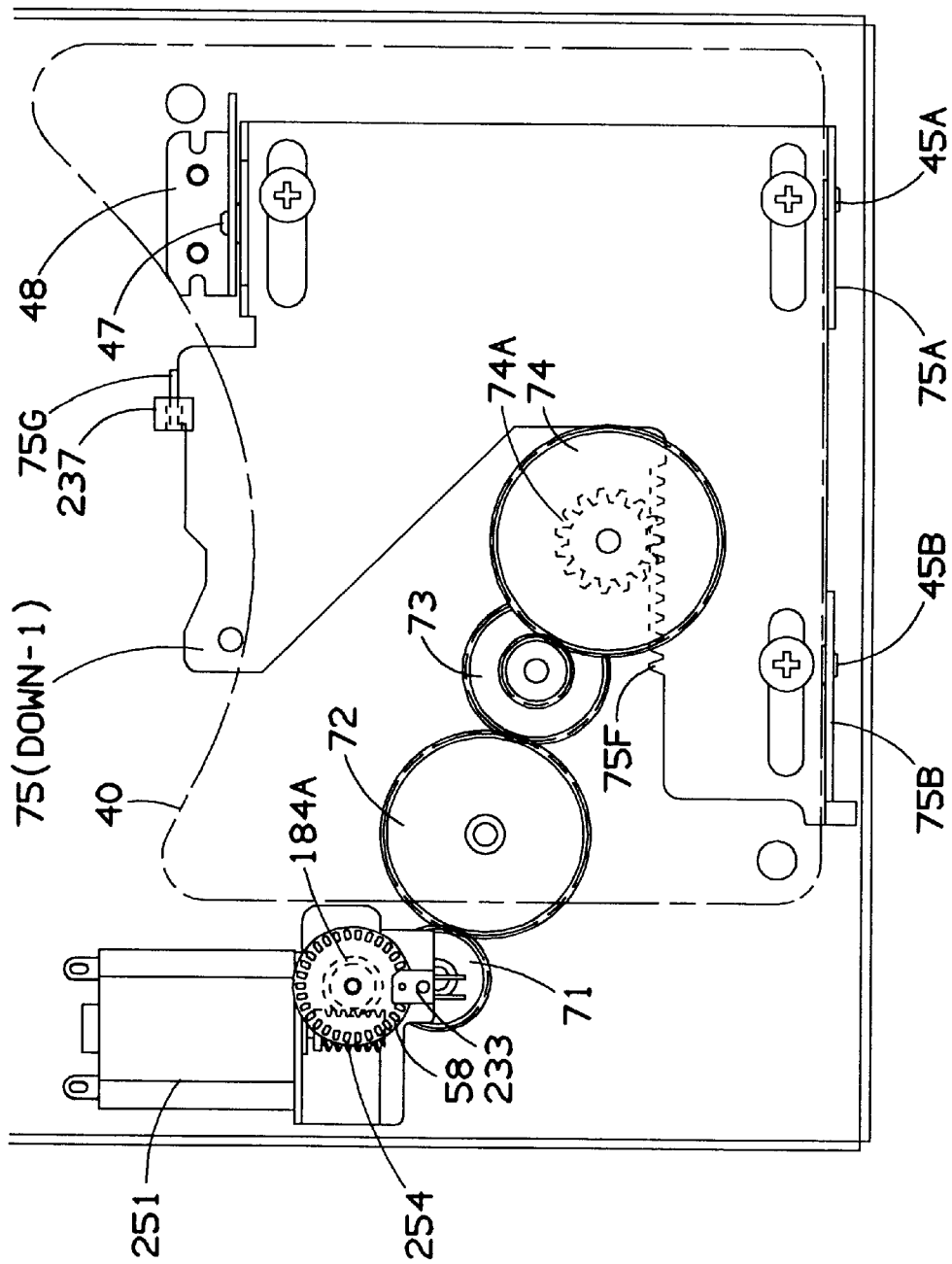
FIG. 30 is a top-view of the optical mechanism vertical transfer mechanism with sliding plate 75 in position DOWN-1.
Figure 31:
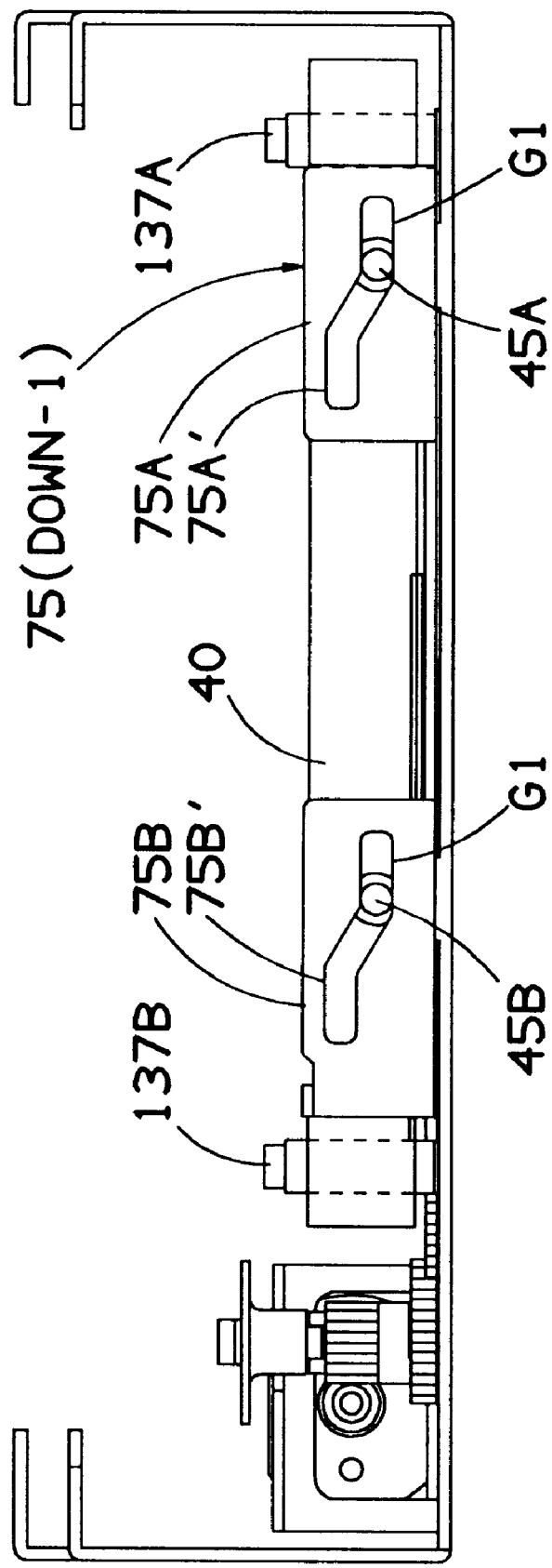
FIG. 31 is a side-view of the optical mechanism vertical transfer mechanism with sliding plate 75 in position DOWN-1.
Figure 32:
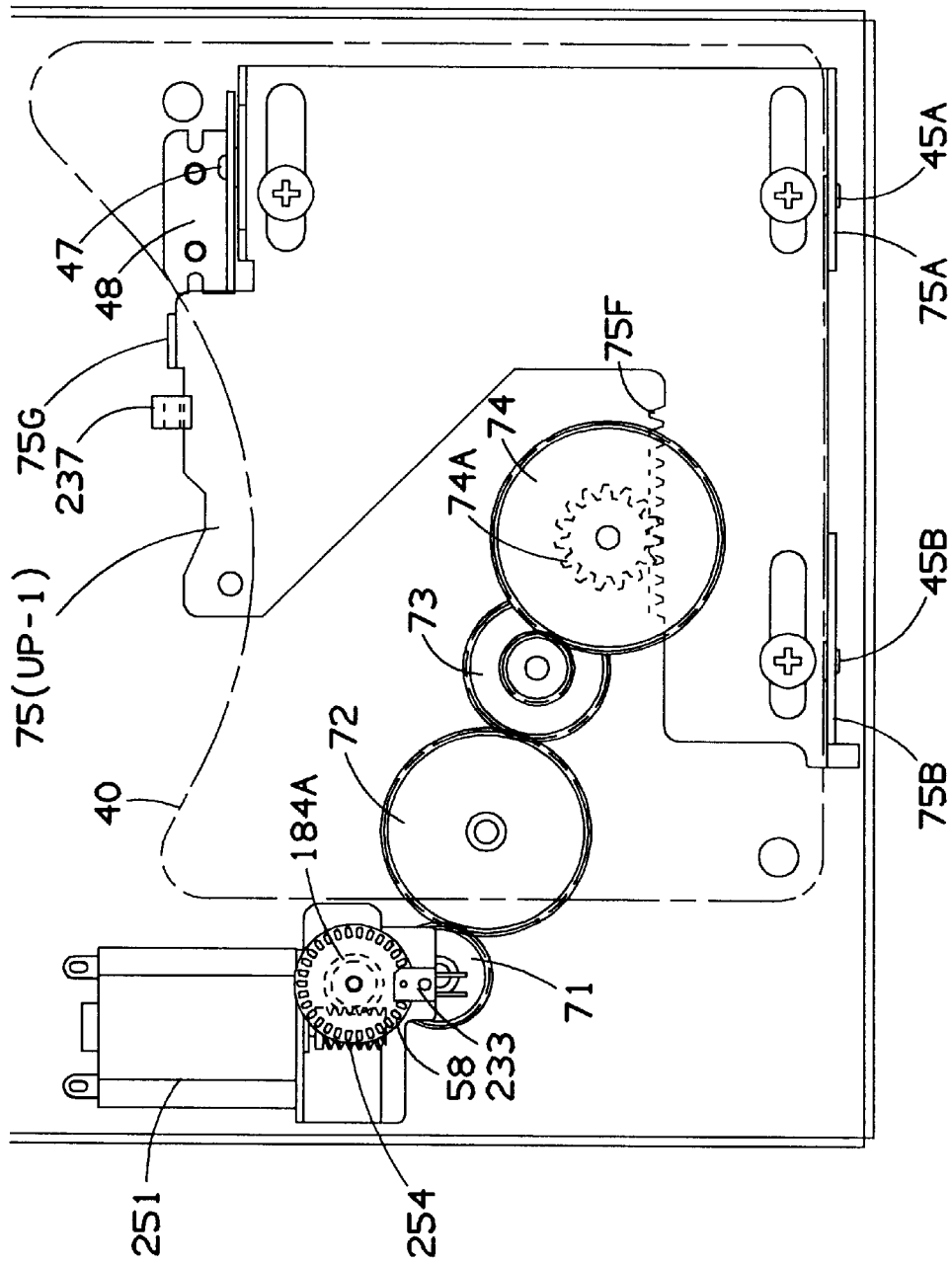
FIG. 32 is a top-view of the optical mechanism vertical transfer mechanism with sliding plate 75 in position UP-1.
Figure 33:
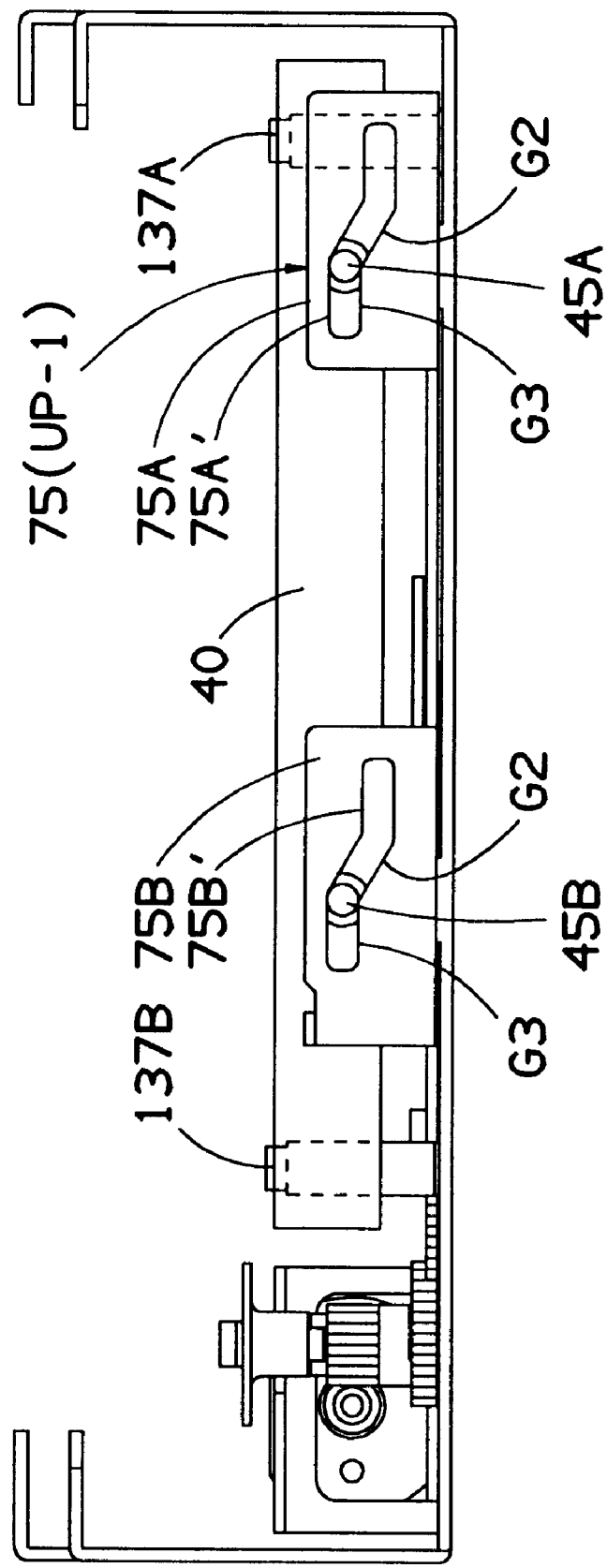
FIG. 33 is a side-view of the optical mechanism vertical transfer mechanism with sliding plate 75 in position UP-1.
Figure 34:
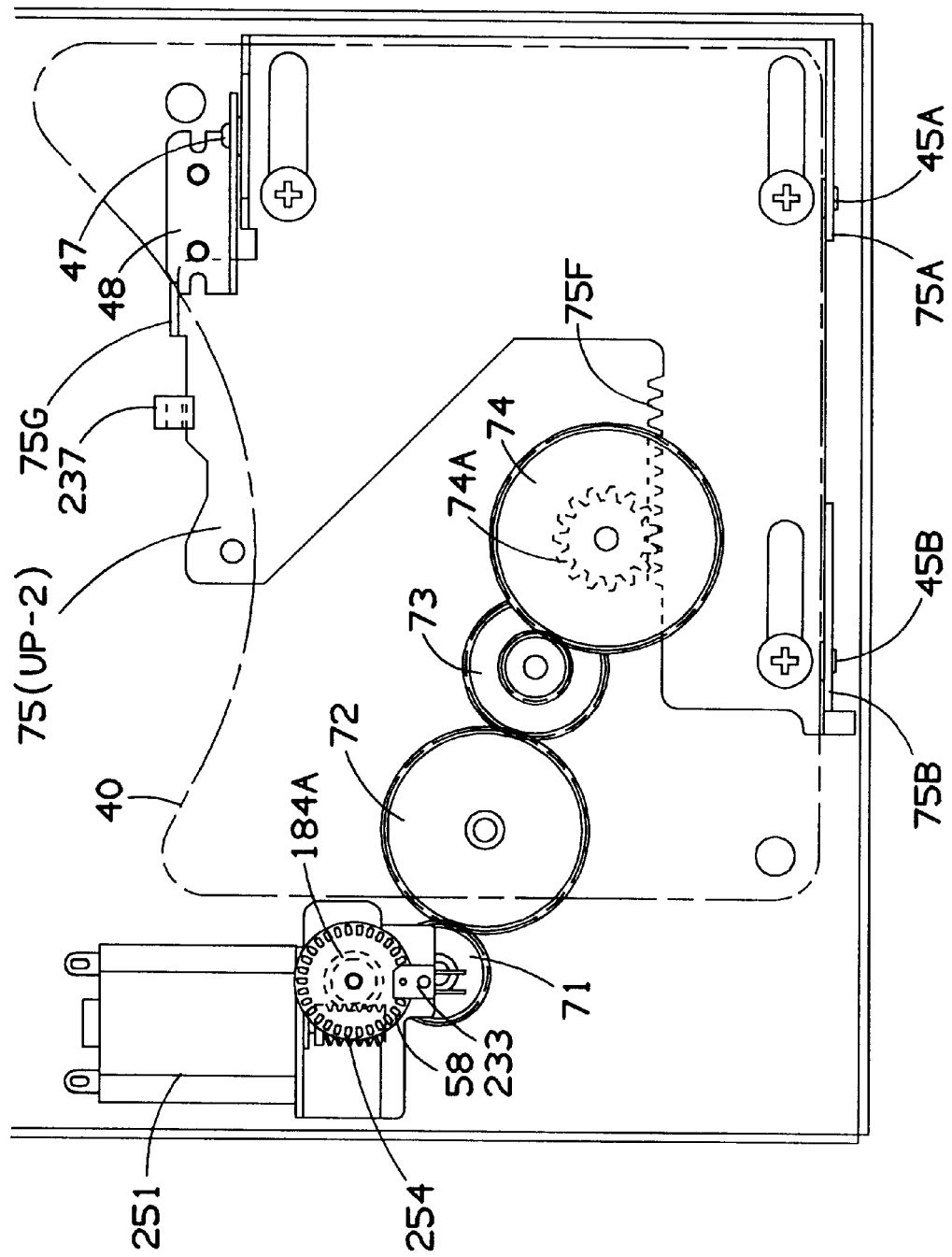
FIG. 34 is a top-view of the optical mechanism vertical transfer mechanism with sliding plate 75 in position UP-2.
Figure 35:
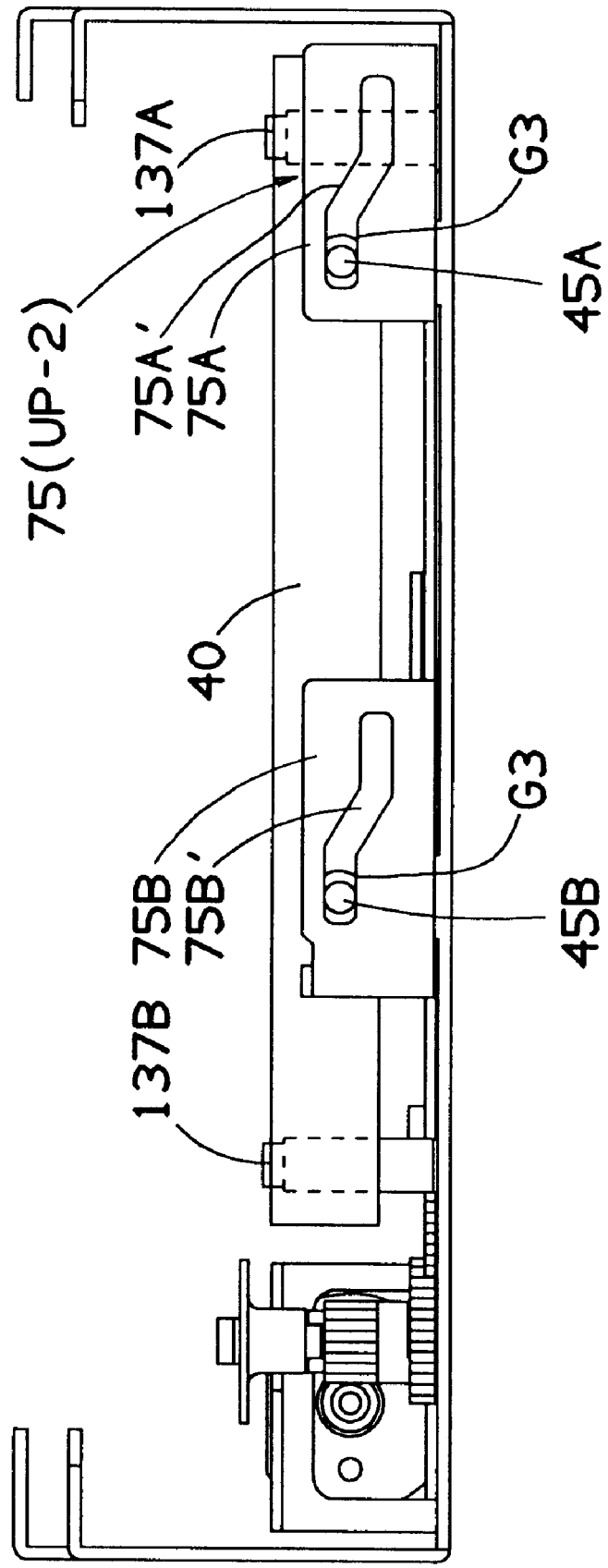
FIG. 35 is a side-view of the optical mechanism vertical transfer mechanism with sliding plate 75 in position UP-2.

(3) Damper lock mechanism 1007 is in the unlocked state, and optical mechanism 1006 is elastically supported by lower and upper dampers 41 and 44 (see FIG. 27).

(4) Lift mechanism 1008 brings sliding plate 75 to position UP-2 (see FIGS. 34 and 35) and moves optical mechanism 1006 to the up position (see FIG. 44).

(5) Clamper support mechanism 1010 releases the support on damper 1009. Clamper 1009, attracted by magnet 105, is mounted on centering spindle 101 (see FIG. 44).

(6) Disk lock mechanism 1013 is in a locked state, and lower disk lock shaft 156 is in the lock position (see FIGS. 51 and 52).

(7) Disk insertion error prevention mechanism 1014 is in a closed state, and shutter 120 is brought to a closed position where disks are prevented from being inserted into disk insertion opening la (see FIG. 56).

The description of the states of each of the mechanisms in the play state (M.FLAG=PLAY) are identical to those in the stand-by state, and therefore they will be omitted here.

Main Flow

Figure 61:
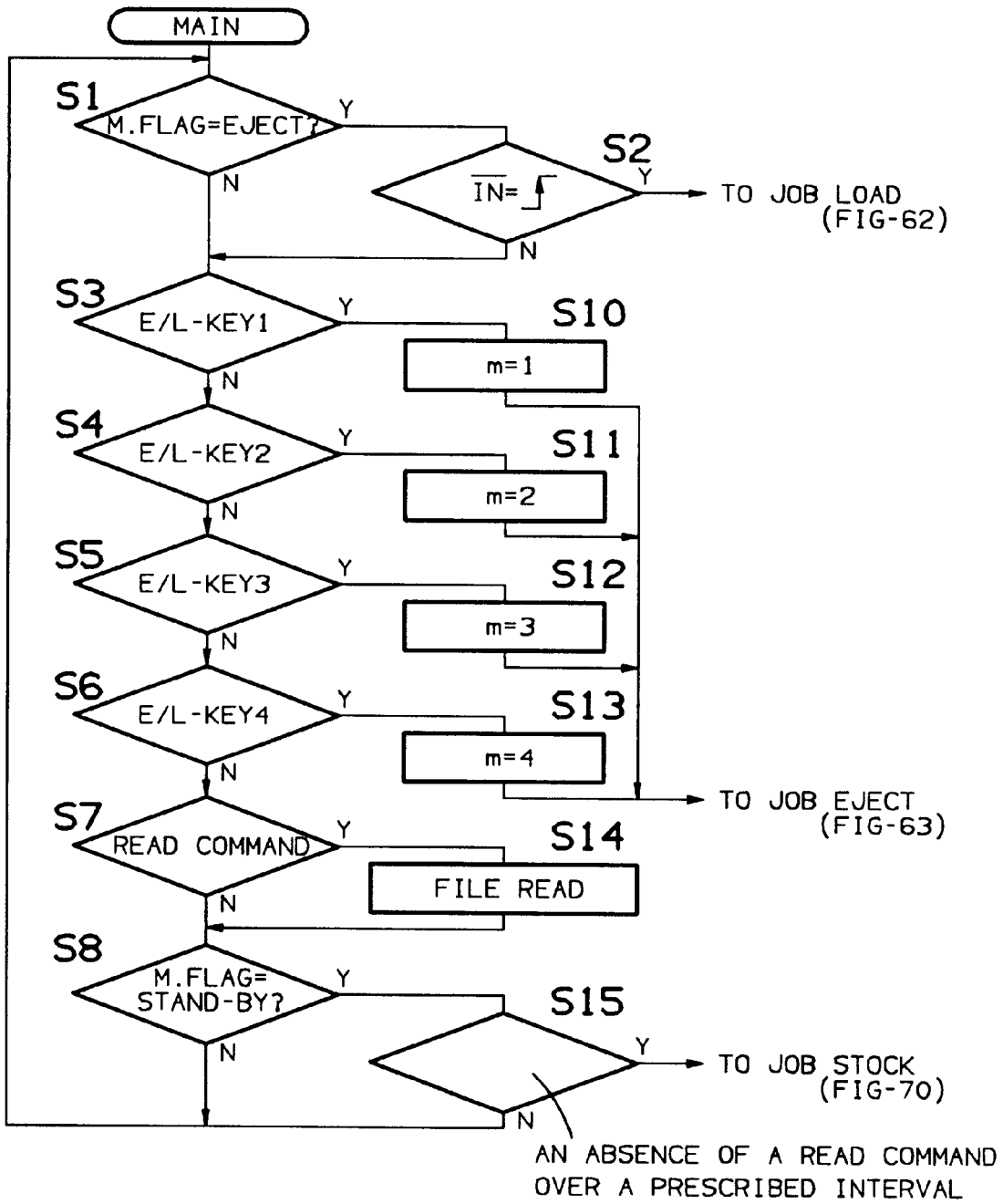
FIG. 61 is a flowchart of the main routine of system controller.

Referring to FIG. 61, when the power supply is turned on, controller 300 executes the main routine. In the loop at steps S1–S8, S15, disk insertion detection, eject/load key actuation and read commands from the computer are repeatedly monitored. Also, in standby mode, controller 300 checks periodically to see that there has not been a read command over a prescribed interval.

Disk Loading Operation

When disk D is inserted into disk insertion opening 1A of front panel 1, outer perimeter De of the disk engages with pulley wrap portion 14C of timing belt 14 and a disk guide wall 11E of resin material. This causes the edge of the disk to slide against guide wall 11E with the insertion of disk D, and loading plates 81L, 81R to be spread apart. Referring to FIG. 53, pin 123, disposed on loading plate 81L, moves in tandem with the opening motion of plate 81L. This causes lever 121 to rotate counterclockwise due to the pressure from spring 125, thus sealing shutter 120. Referring to FIG. 57, shutter 120 slides on top of disk D as disk D is inserted completely into the device, the lower end of flap 120A being held up by the upper surface of disk D. Since felt, compressed urethane or similar material lines the outside of flap 120A, the top surface of disk D is not damaged.

Figure 62:
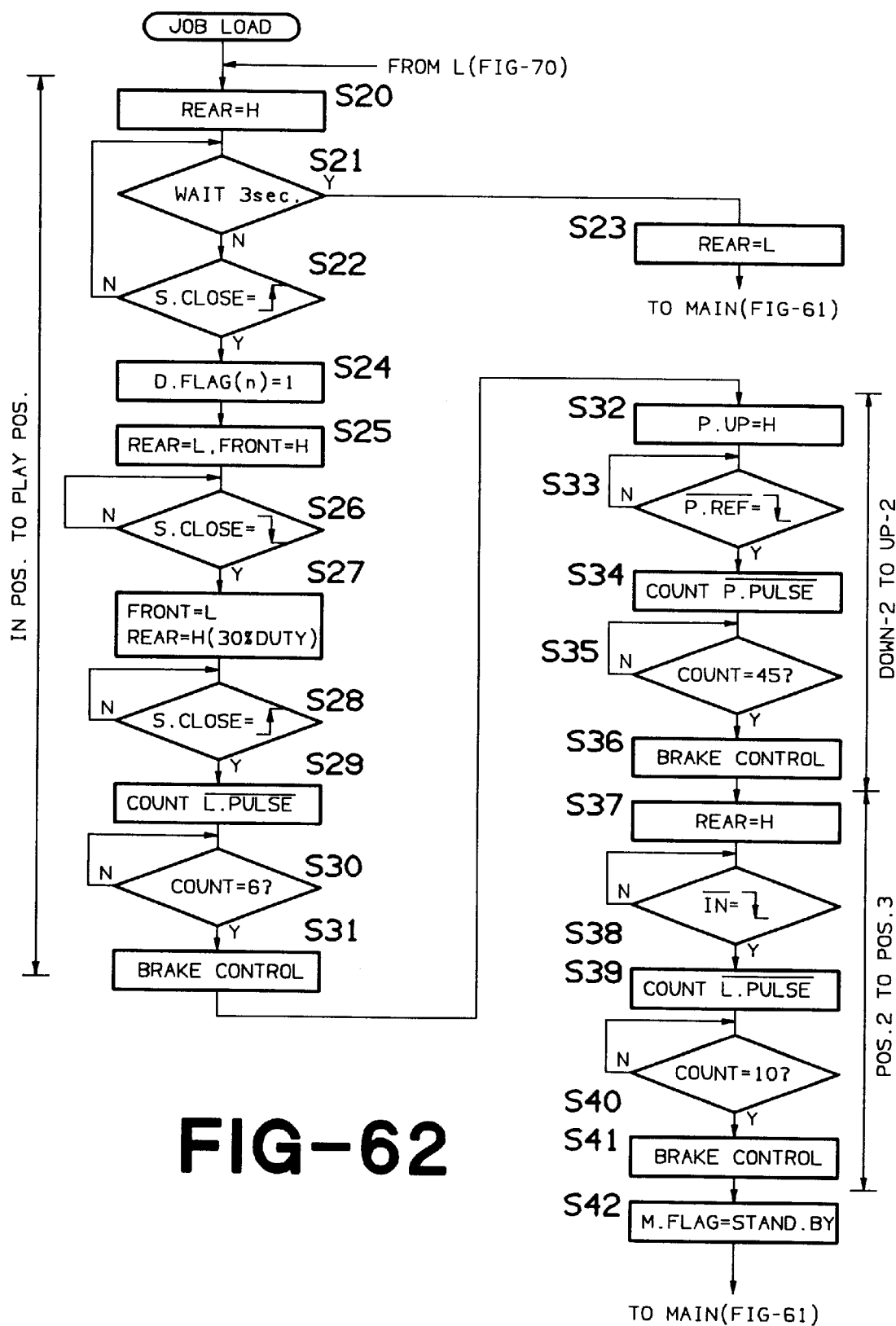
FIG. 62 is a flowchart of JOB LOAD.
Figure 63:
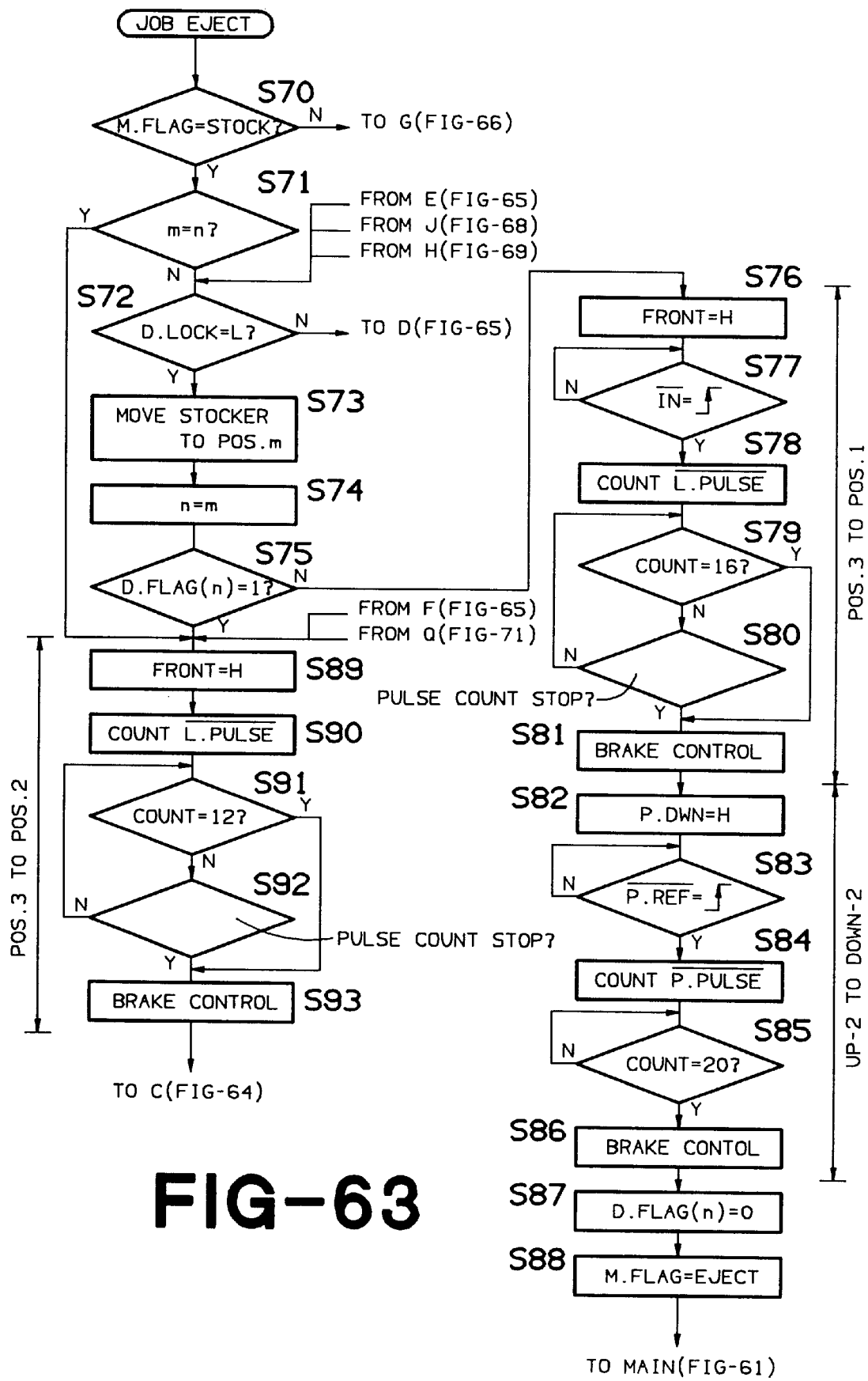
FIG. 63 is a flowchart of JOB EJECT.

Referring also to FIG. 14, when disk D is pushed to position P0, the output from optical sensor 236 (signal $\overline{\text{IN}}$) changes to "H" and controller 300 goes from step S1 to S2 then to procedure JOB LOAD, shown in FIGS. 62 and 63. Disk D is brought to playback position in steps S20–S31. First, controller 300 changes signal REAR to "H" at step S20, and then waits for signal S.CLOSE to change to "H" in three seconds or less at the loop in step S21, S22. In disk transfer mechanism 1001, when signal REAR changes to "H", timing belt 14 is rotated counter-clockwise, disk D is rotated clockwise along the left side surface 12B of friction belt 12, to move disk D toward the rear of the device.

When the disk reaches position P1 of FIG. 15, flap 120A of shutter 120 drops away from the upper surface of disk D and falls to the closed position. Signal S.CLOSE then changes to "H". Beginning at step S24, controller 300 sets disk presence flags D.FLAG(n) to 1, returns signal REAR to the "L" state and sets signal FRONT to "H". At step S26, controller 300 waits for signal S.CLOSE to change to "L".

When signal FRONT changes to "H", timing belt 14 of disk transfer mechanism 1001 is rotated clockwise, moving disk D toward the front of the device as it rotates in the opposite direction. Disk D forces shutter 120 open toward the outside of the device. When signal S.CLOSE changes to "L", controller 300 returns signal FRONT to "L" and changes signal REAR to a 30% duty cycle pulse output at step S27. At step S28, controller 300 waits again for signal S.CLOSE to change to "H". Thus, in disk transfer mechanism 1001, timing belt 14 is again rotated counterclockwise, and disk D is moved toward the rear of the device as it rotates in reverse.

The movement of disk D causes shutter 120 to close and changes signal S.CLOSE to "H". At step S29, controller 300 begins counting the output (signal $\overline{\text{L. PULSE}}$) from optical sensor 232. At step S30, controller 300 waits for the pulse count to reach "6". When the count reaches "6", indicating disk D has arrived at playback position P2, at step S31, controller 300 sets signal FRONT and signal REAR to "H" for a prescribed period of time (50 msec), electromagnetically braking motor 250. In the loop in steps S21, S22, if signal S.CLOSE did not change in three seconds or less, it indicates to controller 300 that the disk cannot be moved into the device, for example because the inserted disk was intentionally pulled out. At step S23, controller 300 returns signal REAR to the "L" state, stops the belt drive and returns to the main routine in FIG. 61.

In steps S26–S28, controller 300 moves disk D while rotating it in reverse, and begins counting pulses from signal $\overline{\text{L. PULSE}}$ after signal S.CLOSE has changed to "H". Thus, even if the user obstructs the closing of shutter 120 after inserting disk D all the way, or if there is slipping between disk D and timing belt 14, there is no change in the pulse count, and so disk D can be brought to the appropriate position accurately. Also, since the disk is transferred to the playback position by transferring the disk at low speeds, the disk does not over-run the playback position, avoiding the need for reverse rotation and avoiding error in the pulse count.

In steps S32–S36, controller 300 moves sliding plate 75 from position DOWN-2 to position UP-2. First, at step S32, controller 300 sets signal P.UP to "H", and at step S33, waits for the output from optical sensor 237 (signal $\overline{\text{P.REF}}$) to change to "L". When signal P.UP changes to "H", sliding plate 75 is driven to the right of the device, and once it passes position DOWN-1, optical mechanism 1006 is moved upward toward the up position. Also, sliding plate 75 makes lower disk lock shaft 156 move downward to the unlock position, and then makes lock disk lock shaft 156 move upward to the lock position again When signal $\overline{\text{P.REF}}$ changes to "L" due to the motion of sliding plate 75, controller 300 begins counting the output from optical sensor 233 (signal $\overline{\text{P.PULSE}}$) at step S34. Then, at step S35, controller 300 waits for the pulse count (COUNT) to reach "45".

When the pulse count (COUNT=count of signal $\overline{\text{P.PULSE}}$) reaches "45", indicating to controller 300 that the sliding plate is at position UP-2, at step S36, signal P.UP and signal P.DWN are set to "H" for 50 msec, electromagnetically braking motor 251 to stop it. Referring to FIG. 41, once sliding plate 75 is brought to position UP-2, optical mechanism 1006 is brought to position UP, where disk D is mounted on turntable 102. Then magnet 105 attracts damper 1009. When sliding plate 75 moves to position UP-2, damper lock mechanism 1007 is unlocked and the lock on optical mechanism 1006 is released. Thus, optical mechanism 1006 is resiliently supported with damping on damper base 40. Lower disk lock shaft 156 is moves to the lock position (FIG. 52) and rack member 87 is moves to engage with timing pulley 15 (FIG. 22).

At steps S37–S41, controller 300 moves loading plates 81L, 81R from support position POS.2 to open position POS.3. This causes belts 12 and 14 to disengage from outer perimeter De of disk E). First, at step S37, controller 300 sets signal REAR to "H", and then waits for signal $\overline{\text{IN}}$ to change to "L" at step S38. When signal REAR changes to "H", timing pulley 15 is rotated counterclockwise, causing timing pulley 15 to move along rack member 87B toward the left of the device, thereby separating loading plates 81L, 81R At the instant timing pulley 15 begins to rotate, a clockwise rotation force is applied to disk D since timing belt 14 is still engaged with outer perimeter De of disk D. However, disk D does not move because it is held at the playback position by centering spindle 101 of turntable 102. When loading plates 81L, 81R open, damper holders 77L, 77R are spread apart and the support on damper 1009 is released. As a result, damper 1009 is attracted to the turntable via magnet 105, and disk D is held against the turntable.

The opening motion of loading plates 81L, 81R causes signal IN to change to "L". At step S39, controller 300 begins counting pulses from signal $\overline{\text{L.PULSE}}$, and waits for the pulse count to reach "10" at step S40. When the pulse count reaches "10", indicating to controller 300 that the loading plates have reached open position POS.3, at step S41, signal FRONT and signal REAR are set to "H" for 50 msec, electromagnetically braking motor 250. At step S42, mode flag M.FLAG is set to "STAND-BY". Controller 300 then returns to the main routine shown in FIG. 61.

Control Steps Corresponding to the E/L Keys

When E/L key "n" (one of the keys E/L key 1 through E/L key 4) is pressed, while the current stocker position "m" corresponds to "n", controller 300 brings disk D at the stock or playback position to the eject position. If an E/L key corresponding to a position other than the current stocker position is pressed "m<>n", stocker 1011 is transferred to the position corresponding to the E/L key, bringing disk D in the corresponding position to the eject position. If there is no disk D at the specified position, the stocker is transferred to the position indicated by the E/L key, and the loading plates 81L, 81R are brought to the disk receiving position.

Control Steps Corresponding to E/L Key Operation in Stock State

The following is a description of the disk changer's response to the pressing of an E/L key during the stock state. When E/L key 1 through E/L key 4 is pressed, controller sets constant m to a corresponding value ("1" through "4") at the corresponding step in steps S10–S13. Referring to FIGS. 63–69, controller 300 proceeds to flowchart JOB EJECT. At step S70, controller 300 checks to see if M.FLAG is set to "STOCK". If M.FLAG is set to "STOCK", controller 300 proceeds to step S71, where it checks to see if the values for m and n are identical, hus determining whether an E/L key having the same number as the current stocker position was entered. If the values are identical, controller 300 executes steps S89–S93, in which the loading plates are moved from open position POS.3 to support position POS.2. At step S89, controller 300 sets signal FRONT to "H", and at step S90, counting of signal $\overline{\text{L.PULSE}}$ is initiated. At steps S91 and S92, controller 300 waits for either the pulse count to reach "12" or the pulse count to stop. The reason the pulse count was made smaller than the value "13" shown in FIG. 58 is that the belt stops right before it engages with the disk edge. The reason controller 300 checks to see if signal $\overline{\text{L.PULSE}}$ stops is that it is possible for an error in the pulse count or incorrect positioning of the loading plate to cause the belt to engage with the disk edge so that the prescribed pulse count is never reached.

When signal FRONT becomes "H", timing pulley 15 is rotated clockwise, causing it to move to the right of the device along rack 87B, causing loading plates 81L, 81R to converge. The converging of loading plates 81L, 81R causes damper 1009 to be picked up by damper holders 77L, 77R under the urging of spring 128. When the pulse count reaches "12" or when the signal $\overline{\text{L.PULSE}}$ stops, it indicates to controller 300 that the loading plates have nearly reached support position POS.2. At step S93, signal FRONT and signal REAR are changed to "H" for 50 msec, electromagnetically braking motor 250.

Figure 64:
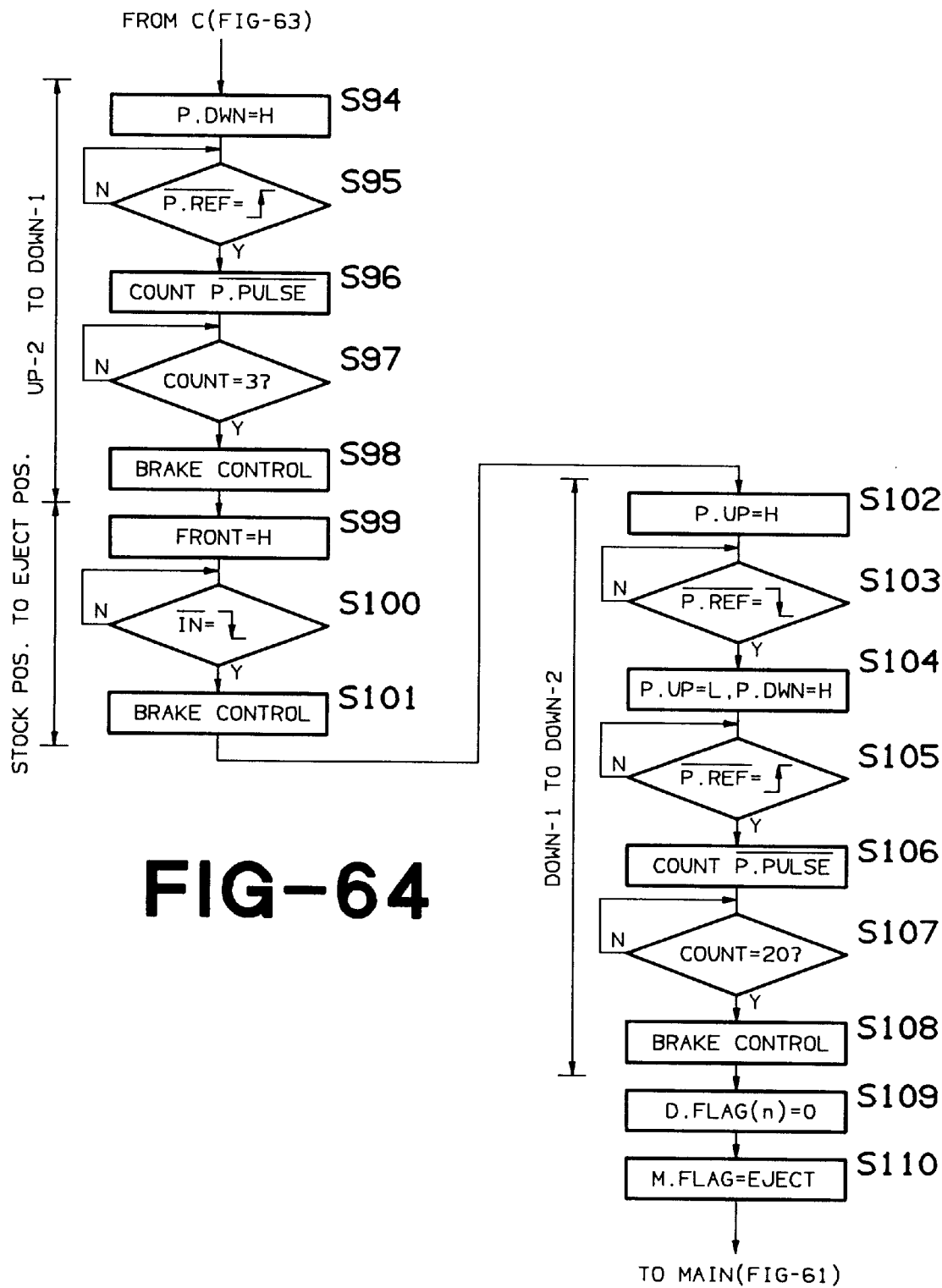
FIG. 64 is a flowchart of JOB EJECT.

Referring to FIG. 64, controller 300 moves sliding plate 75 from position UP-2 to position DOWN-1 in steps S94–S98. First, at step S94, controller 300 sets signal P.DWN to "H". At step S95 controller 300 waits for signal $\overline{\text{P.REF}}$ to change to "H". When signal P.DWN becomes "H", sliding plate 75 is moved toward the left of the device. Damper lock mechanism 1007 locks optical mechanism 1006 to base 40, and loading plate open/close mechanism 1004 is disengaged so that rack member 87 release and retreats from timing pulley 15. The release of rack member 87 allows spring 127 to bring timing and friction belts 14, 12 of disk transfer mechanism 1001 together slightly to a position to support disk D. The motion of sliding plate 75 causes lower disk lock shaft 156 to descend. When sliding plate 75 moves beyond position UP-1, optical mechanism 1006 is moved downward.

When signal $\overline{\text{P.REF}}$ changes to "H", controller 300 begins counting signal $\overline{\text{P.PULSE}}$ at step S96. Controller 300 waits for the pulse count to reach "3" at step S97. When the pulse count reaches "3", it indicates to controller 300 that sliding plate 75 has reached position DOWN-1. At step S98, signal P.UP and signal P.DWN are set to "H" for 50 msec, electromagnetically braking motor 251. When sliding plate 75 reaches position DOWN-1, optical mechanism 1006 and lower disk lock mechanism 156 are brought to the down position and tie unlock position respectively, to allow disk transfer within stocker 1011.

In steps S99–S102, controller 300 brings disk D, initially inside the stocker, to the eject position. First, at step S99, controller 300 sets signal FRONT to "H". Then, at step S100, controller 300 waits for signal $\overline{IN}$ to go low ("L"). When signal FRONT becomes "H", disk transfer mechanism 1001 moves disk D moving, while it rotates counterclockwise, toward the front of the device. When loading plates 81L, 81R are converged to the position shown in FIG. 14 and signal $\overline{IN}$ changes to "L", it indicates to controller 300 that disk D has arrived approximately at the eject position. At step S101, signal FRONT and signal REAR are set to "H" for 50 msec and an electromagnetic brake is applied to stop the motor. A slight overrun brings disk D to the eject position shown in FIG. 18 where spindle hole Ds lies beyond insertion opening 1A. According to the present embodiment, when disk D is in the eject position, spindle hole Ds of the disk is outside of disk insertion opening 1A, and belts 14 and 12 are brought together until the distance W1 between the two is equal to that of the disk receiving state (112 mm).

In steps S102–S110, controller 300 moves sliding plate 75 from position DOWN-1 to position DOWN-2. First, at step S102, controller 300 sets signal P.UP to "H". At step S103, controller 300 waits for signal $\overline{P.\text{REF}}$ to change to "L". Sliding plate 75 is moved toward the right of the device. When signal $\overline{P.\text{REF}}$ changes to "L, controller 300 sets signal P.UP to "L" and signal P.DWN to "H" at step S104, reversing the direction of movement of sliding pate 75. At step S105, controller 300 waits for signal $\overline{P.\text{REF}}$ to change to "H". Sliding plate 75 continues to move toward the left of the device causing signal $\overline{P.\text{REF}}$ to change to "H". Then, at step S106, controller 300 begins counting signal $\overline{P.\text{PULSE}}$.

When the pulse count reaches "20" at step S107, it indicates to controller 300 that the sliding plate has reached position DOWN-2. At step S108, signal P.UP and signal P.DWN are set to "H" for 50 msec, electromagnetically braking motor 251. At step S109, S110, D.FLAG(n) is set to "0" and M.FLAG is set to "EJECT". Controller 300 then returns to the main routine in FIG. 61.

Referring again to FIG. 63, if the values of m and n are not identical at step S71, then at step S72 controller 300 checks the status of output (D.LOCK) from optical sensor 229 to see if it is at level "L" at step S72, to confirm whether lower disk lock shaft 156 has been brought to the lock position. If it has been brought to the lock position, then signal D.LOCK is in the "L" state, and at step S73, controller 300 moves stocker 1011 to position POS.m, where m is specified by the E/L key entered (for example, position POS.4 if E/L key 4 was entered). Once stocker 1011 has arrived at the specified position, controller 300 sets constant n to m at step S74. At step S75, controller 300 checks to see if D.FLAG(n) is "1" to confirm whether a disk D is at position POS.m of the stocker. If D.FLAG(n) is "1", then controller 300 proceeds to step S89 described above. Loading plates 81L, 81R are moved from open position POS.3 to support position POS.2, and disk D is brought to the eject position.

If, at step S75, D.FLAG(n) is "0", controller 300 moves loading plates 81L, 81R from open position POS.3 to disk receiving position POS.1 in steps S76–S81. First, controller 300 sets signal FRONT to "H" at step S76, and then waits for signal $\overline{IN}$ to change to "H" at step S77. When signal FRONT changes to "H", timing pulley 15 is rotated clockwise. The rotation of timing pulley 15 causes timing pulley 15 to move along rack 87B, closing loading plates 81L, 81R. The movement Ot the loading plates changes signal $\overline{IN}$ to "H", and controller 300 begins counting signal $\overline{L.\text{PULSE}}$ at step S78. At step S79 and S80, controller 300 waits for the pulse count to reach "16" or for signal $\overline{L.\text{PULSE}}$ to stop. If the pulse count reaches "16" or signal $\overline{L.\text{PULSE}}$ stops, it indicates to controller 300 that loading plates 81L, 81R have been brought to disk receiving position POS.1, and at step S81 signal FRONT and signal REAR are set to "H" for 50 msec to electromagnetically brake motor 250.

In steps S82–S86, controller 300 moves sliding plate 75 from position UP-2 to position DOWN-2. First, at step S82, controller 300 sets signal P.DWN to "H", and at step S83, controller 300 waits for signal $\overline{P.\text{REF}}$ to change to "H". Sliding plate 75 is driven to the left of the device, and optical mechanism 1006 is lowered once position UP-1 is past Lower disk lock shaft 156 is lowered and then brought back up to the lock position. When the movement of sliding plate 75 is sufficient to change signal $\overline{P.\text{REF}}$ to "H", controller 300 begins counting signal $\overline{P.\text{PULSE}}$ at step S84. At step S85, controller 300 waits for the pulse count to reach "20".

When the pulse count reaches "20", it indicates to controller 300 that sliding plate 75 has arrived at position DOWN-2, and at step S86 signal P.UP and signal P.DWN are set to "H", electromagnetically braking the motor. At steps S87, S88, controller 300 sets D.FLAG(n) and M.FLAG to "0" and "EJECT" respectively. Controller 300 then returns to the main routine.

Disk Lock Error, Retry Operation

Figure 65:
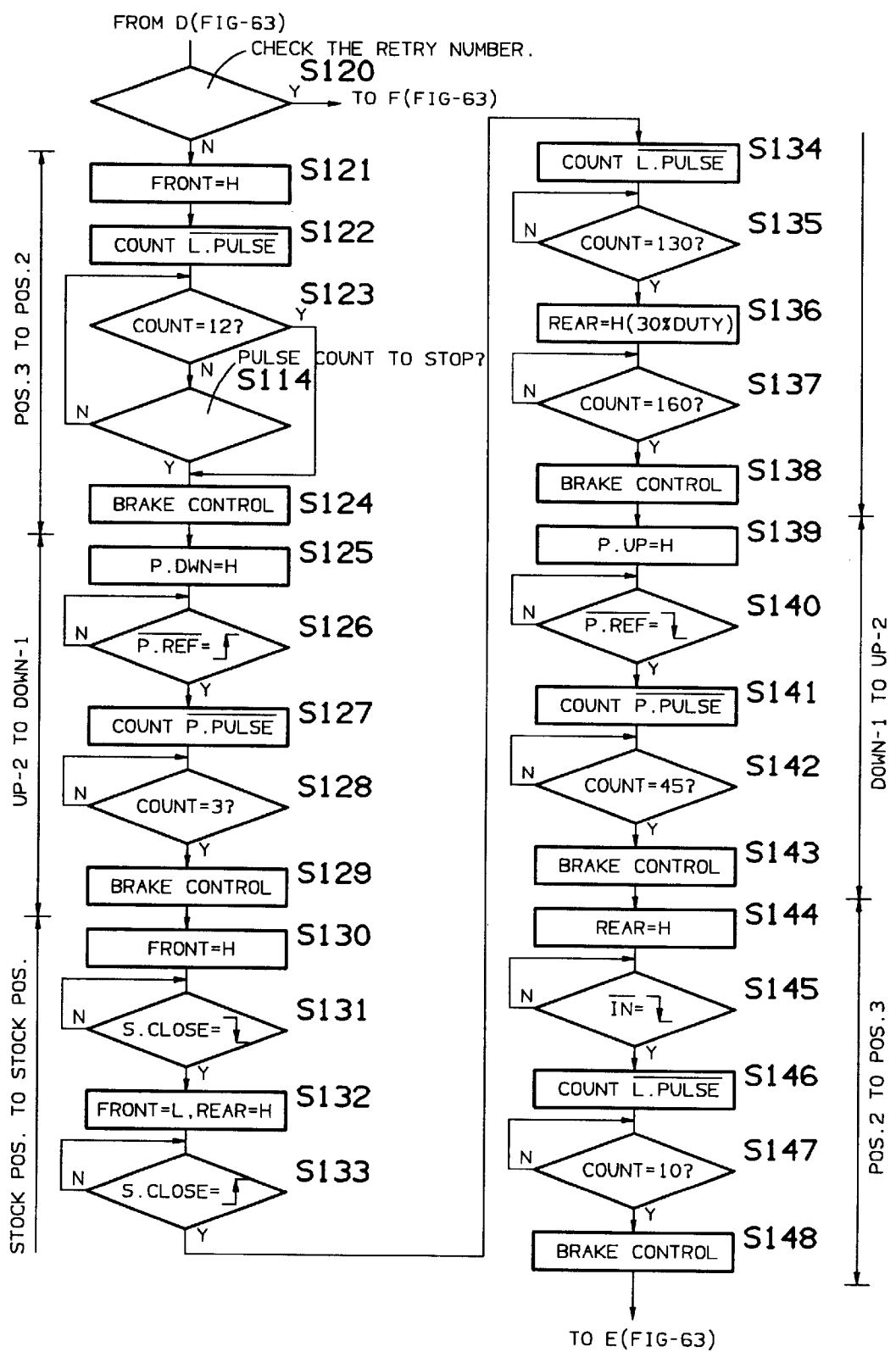
FIG. 65 is a flowchart of JOB EJECT.
Figure 66:
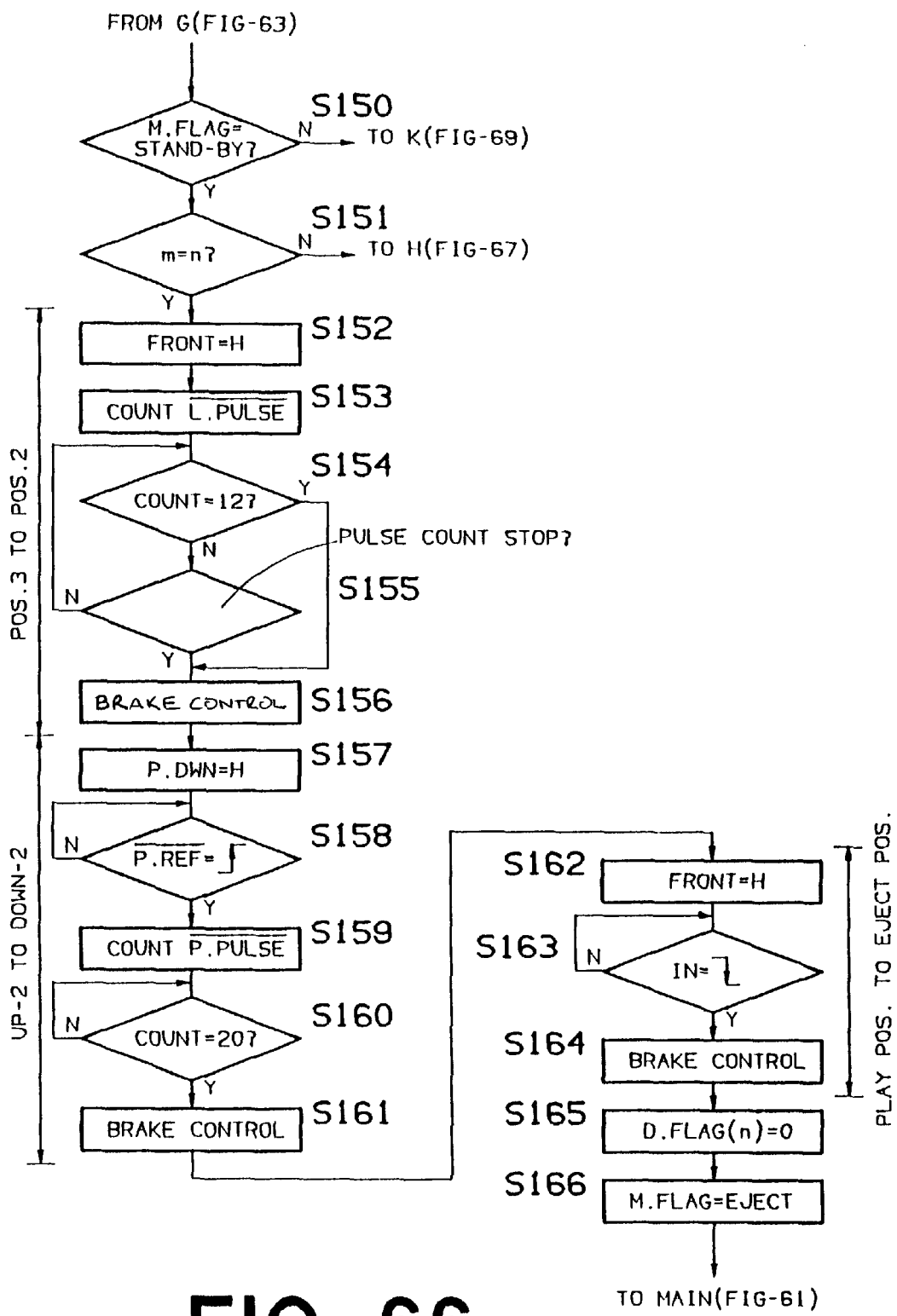
FIG. 66 is a flowchart of JOB EJECT.

If, in step S72, D.LOCK is not "L", then controller 300 proceeds to the flowchart shown in FIG. 65. Disk D, which is offset, is moved to a position where shutter 120 is opened, and disk D is moved again to the stock position. First, controller 300 proceeds from step S72 to step S120, and checks the number of retry attempts made. Then, in steps S121–S124, the same control steps as steps S89–S93 are carried out, with loading plates 81L, 81R being moved from open position POS.3 to support position POS.2. Then, in steps S125–S129, the same control steps as steps S94–S98 are carried out, with sliding plate 75 being moved from position UP-2 to position DOWN-1, and optical mechanism 1006 and lower disk lock shaft 156 being moved to the down position and the unlock position, respectively.

In steps S130–S136, controller 300 moves disk D, which is at an offset, to a position where shutter 120 is opened, and then disk D is moved to the stock position again. First, at step S130, controller 300 sets signal FRONT to "H". At step S131, controller 300 waits for signal S.CLOSE to change to "L". When signal FRONT changes to "H", disk transfer mechanism 1001 moves disk D toward the front of the device as disk D rotates counterclockwise. Disk D forces shutter 120 open, and when signal S.CLOSE changes to "L", controller 300 changes signal FRONT back to "L" and sets signal REAR to "H" at step S132. At step S133, controller 300 waits for signal S.CLOSE to chance to "H" again as the rearward movement of disk D, initiated by changing REAR to "H" and FRONT to "L", causes shutter 120 to close. When signal S.CLOSE changes to "H", controller 300 begins counting signal $\overline{L.\text{PULSE}}$ at step S134. At step S135, controller 300 waits for the pulse count to reach "130". When the pulse count reaches "130", controller 300 changes signal READ to a 30% duty cycle pulse output at step S136. This slows disk D down. At step S137, controller 300 waits for the pulse count to reach "160". When the pulse count reaches "160" it indicates to controller 300 that the disk has been brought to the stock position. At step S138, controller 300 sets signal FRONT and signal REAR to "H" for 50 msec, electromagnetically braking motor 250.

In steps S139–S143, controller 300 moves sliding plate 75 from position DOWN-1 to position UP-2. First, at step S139, controller 300 sets signal P.UP to "H". At step S140, controller 300 waits for signal $\overline{\text{P.REF}}$ to change to "L". Sliding plate 75 is moved to the right of the device, and when signal $\overline{\text{P.REF}}$ changes to "L", controller 300 begins counting signal $\overline{\text{P.PULSE}}$ at step S141. At step S142, controller 300 waits for the pulse count to reach "45". When the pulse count reaches "45", it indicates to controller 300 that sliding plate 75 has reached position UP-2. At step S143, signal P.UP and signal P.DWN are set to "H" for 50 msec, electromagnetically braking motor 251.

In steps S144–S148, which perform the same control steps as steps S37–S41, controller 300 moves the loading plates to open position POS.3. Referring to FIG. 63, controller 300 returns to step S72 and checks if D.LOCK has changed to "L".

Disk Lock Error, Eject Operation

If disk lock errors occur even after the retry operation described above is repeated three times, controller 300 proceeds from step S120 in FIG. 65 to step S89 in FIG. 63. Disk D, which is at an offset position, is brought to the eject position.

Control Responsive to E/L Key Actuation During Stand-by Mode

The following is a description of control steps that are performed when an E/L key is entered during stand-by mode. When one of E/L key 1 through E/L key 4 is pressed in stand-by mode, controller 300 sets constant m to "1" through "4" at the corresponding step in steps S10-S13, shown in FIG. 61. Controller 300 then proceeds to step S150 in FIG. 66 via step S70 in FIG. 63, and checks to see if M.FLAG is set to "STAND-BY". Since M.FLAG is set to "STAND-BY" in the stand-by state, controller 300 proceeds to step S151 and checks to see if the values for m and n are identical, thus determining if the E/L key pressed has a number identical to the current stocker position. If the numbers are the same, then in steps S152–S156, which perform the same functions as steps S89–S93, loading plates 81L, 81R are moved from open position POS.3 to position POS.2.

Then, in steps S157–S161, which perform the same control functions as steps S82–S86, controller 300 moves sliding plate 75 from position UP-2 to position DOWN-2. In steps S162–S164, controller 300 brings disk D, which is at the playback position, to the eject position. First, at step S162, controller 300 sets signal FRONT to "H". When signal FRONT becomes "H", disk D has moved toward the front of the device while rotated counterclockwise. At step 163, controller 300 begins waiting for signal $\overline{\text{IN}}$ to go low "L". When loading plates 81L, 81R close to the position indicated in FIG. 14 and signal $\overline{\text{IN}}$ changes to "L", it indicates to controller 300 that disk D has arrived approximately at the eject position. At step S164, signal FRONT and signal REAR are set to "H" for 50 msc, electromagnetically braking the motor. At step S165 and S166, D.FLAG(n) and M.FLAG are set to "0" and "EJECT", respectively, and control returns to the main routine.

Figure 67:
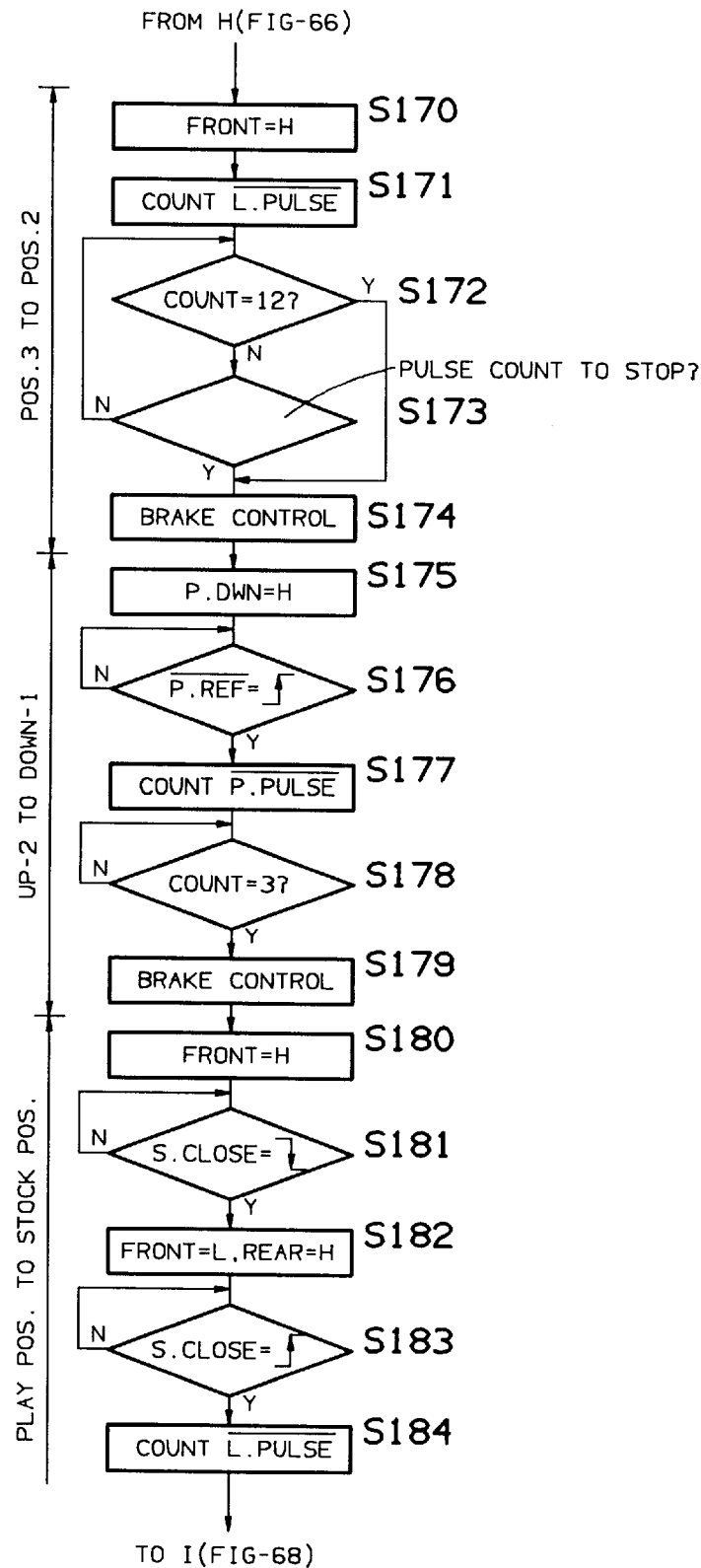
FIG. 67 is a flowchart of JOB EJECT.
Figure 68:
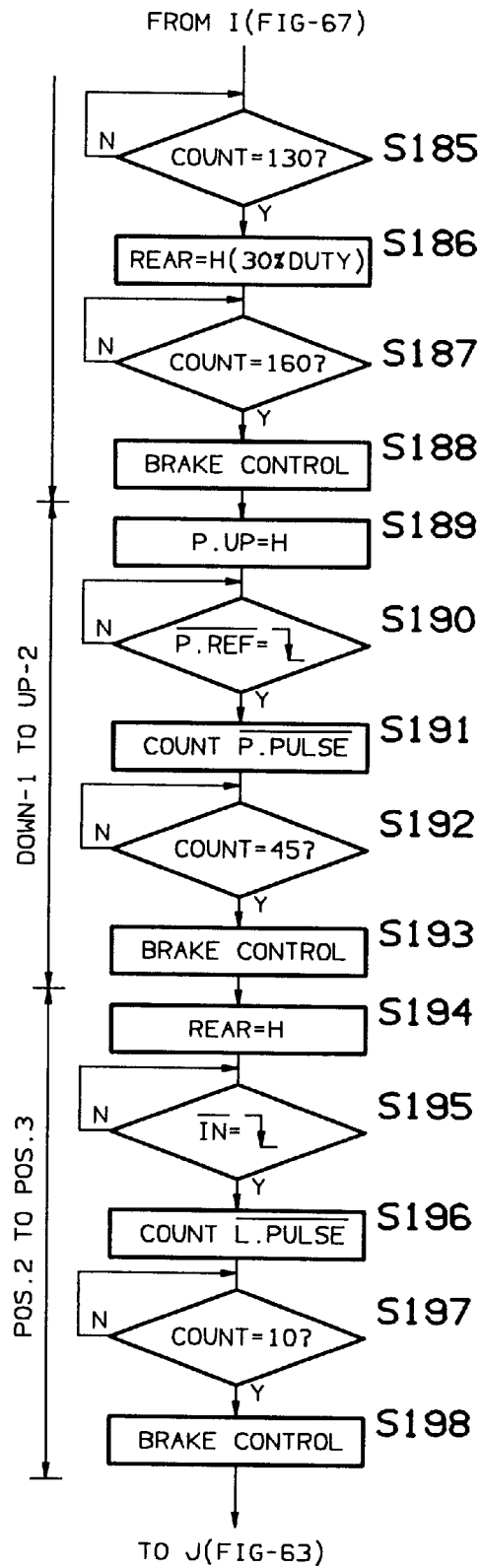
FIG. 68 is a flowchart of JOB EJECT.

If, at step S151 described above, the values for m and n were not identical, then controller 300 proceeds to step S170 shown in FIG. 67. In steps S170-S198, which perform the same control functions as steps S121–S148, the following are performed: (1) loading plates 81L, 81R are moved from open position POS.3 to support position POS.2; (2) sliding plate 75 is moved from position UP-2 to position DOWN-1; (3) disk D at the playback position is brought to the stock position; (4) sliding plate 75 is transferred from position DOWN-1 to position UP-2; (5) loading plates 81L, 81R are moved to open position POS.3. Controller 300 then proceeds to step S72, shown in FIG. 63, and moves stocker 1011 to the specified position POS(n) and brings the disk to the eject position.

Control Responsive to E/L Key Entry in Eject Mode

Figure 69:
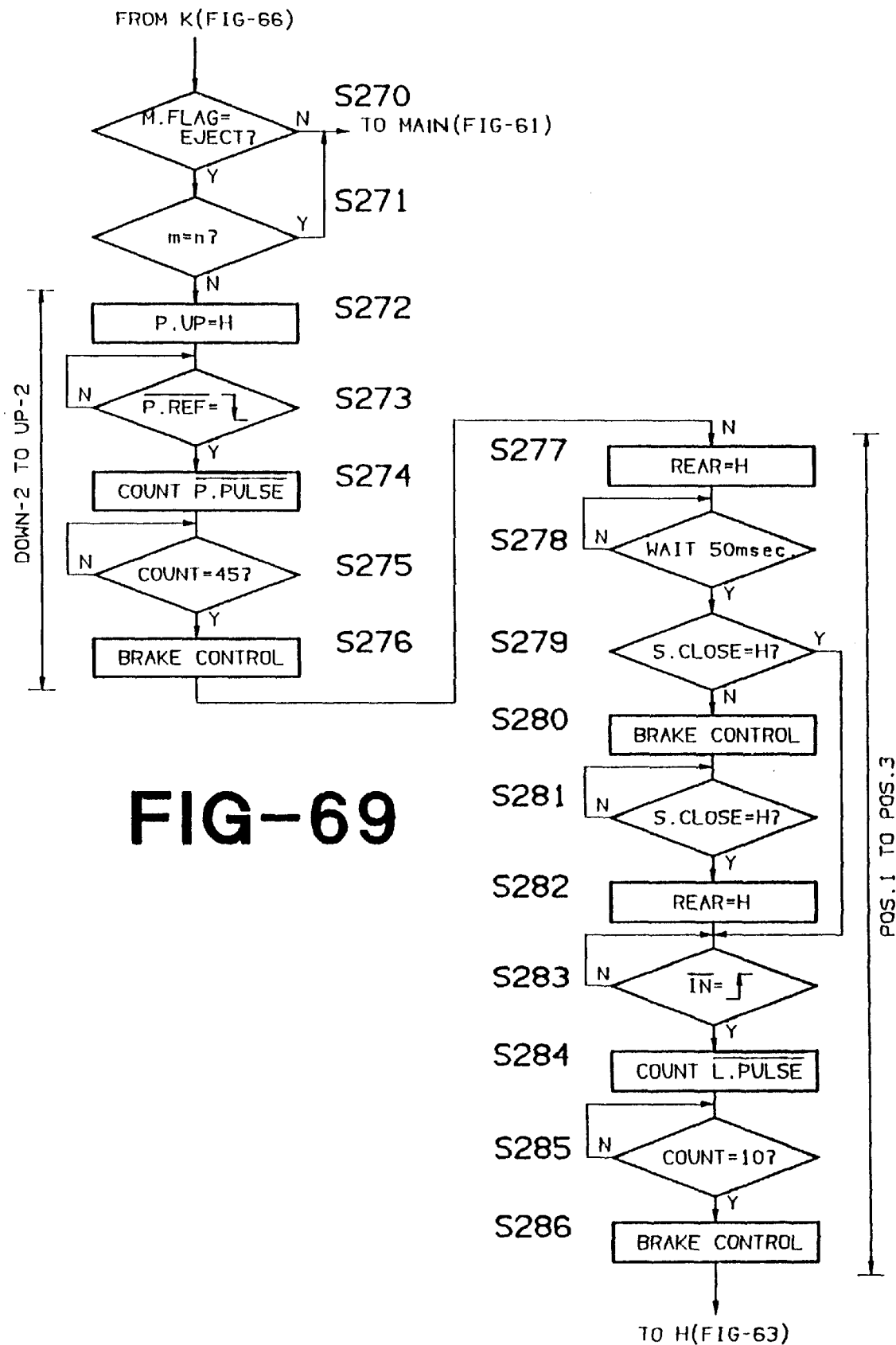
FIG. 69 is a flowchart of JOB EJECT.

Referring to FIGS. 61, 63, and 69, the following is a description of the control steps that are performed when an E/L key is pressed in eject mode. When one of E/L key 1 through E/L key 4 is pressed, controller 300 sets constant m to the appropriate value "1" through "4" at the corresponding step in steps S10–S13. Controller 300 then proceeds to step S270 in FIG. 69 via step S70 in FIG. 63 and step S150 in FIG. 66, and checks to see if M.FLAG is set to "EJECT". Since M.FLAG is set to "EJECT", controller 300 proceeds to step S271, and checks to see if the values for m and n are the same, thus determining if the E/L key pressed and the current stocker position are identical. According to the present embodiment, if m=n, it must be that disk D is ejected and the distance W1 between belts 14 and 12 is the distance of the disk receiving state (112 mm). Thus, the disk cannot be drawn into the device unless the user pushes it in. Therefore, when an E/L key is pressed that corresponds to the ejected disk, the controller 300 immediately returns to the main routine, ignoring the E/L key entry.

If, in step S271, the values of m and n are not identical, controller 300 proceeds to steps S272–S276, which perform the same functions as steps S32—36. Sliding plate 75 is transferred from position DOWN-2 to position UP-2, and then at step S277, signal REAR is set to "H" and loading plates 81L, 81R are further separated.

According to the present embodiment, if disk D in the eject position has not been removed, the loading plates may open in response to the E/L key entry and the disk would be unstable. The disk may fall outside of the device and be damaged, or the disk may tall inside the device and cause a malfunction. To avoid this problem, controller 300 sets signal REAR to "H" at step S277 and waits for 50 msec at step S278. At step S279, controller 300 checks to see if signal S.CLOSE is "H". According to the present embodiment, after a 50 msec interval, loading plate 81L will move to a position where shutter 120 can close. If there is no disk at the eject position, shutter 120 will be closed by spring 125, as shown in FIG. 56, and signal S.CLOSE will become "H". However, if there is a disk at the eject position, shutter 120 will not completely close because flap 120A will be held up by the top surface of disk D, as shown in FIG. 57, and signal S.CLOSE will not be "H".

If signal S.CLOSE is "L", it indicates to controller 300 that a disk is present at the eject position, and at step S280, signal FRONT and signal REAR are set to "H" for 50 msec to stop motor 250. At step S281, the disk is removed, and controller 300 waits for signal S.CLOSE to change to "H". When the disk is removed by the user, shutter 120 rotates to the closed position, setting signal S.CLOSE to "H". At step S282, controller 300 sets signal REAR to "H" again, and loading plates 81L, 81R are separated. At step S283, controller 300 waits for signal $\overline{\text{IN}}$ to change to "H". If, at step S279, controller 300 finds that signal S.CLOSE is "H", then it jumps to step S283 and waits for signal $\overline{\text{IN}}$ to change to "H".

When signal $\overline{\text{IN}}$ changes to "L" due to the motion of the loading plate, controller 300 begins counting signal L. PULSE at step S284. At step S285, controller 300 waits for the pulse count to reach ten. Along with step S285, it would also be possible to add a step -hat checks to see if signal P. PULSE has stopped. When the pulse count reaches "10", it indicates to controller 300 that the loading plates have been brought to open position POS.3. At step S286, signal FRONT and signal REAR are both set to "H" for 50 msec, electromagnetically braking motor 250. Controller 300 then proceeds to step S72 and moves stocker 1011 to specified position POS(n), as described above, and brings the disk to the eject position.

Control Responsive to the Read Command

Referring to FIGS. 60 and 61, when an externally connected computer 303 (FIG. 60) sends a read command, controller 300 proceeds from step S7 to step S14 in the main routine (FIG. 61). The various mechanisms are controlled as described above, to bring the selected disk D to the playback position and send the read command for the specified file to signal processing circuit 307 and servo circuit 308. The read signal generated by optical pickup 2 is sent to signal processing circuit 307 via RF amp 309. After EFM demodulation, de-interleaving, error correction and other necessary functions are performed, the signal is sent to externally connected computer 303 via interface circuit 302, and the prescribed data processing performed. Once the specified file has been read, controller 300 stops signal processing circuit 307 and servo circuit 308. Next M.FLAG is set to "STAND-BY" and controller 300 returns to the main routine.

Disk Stock Operation

Figure 70:
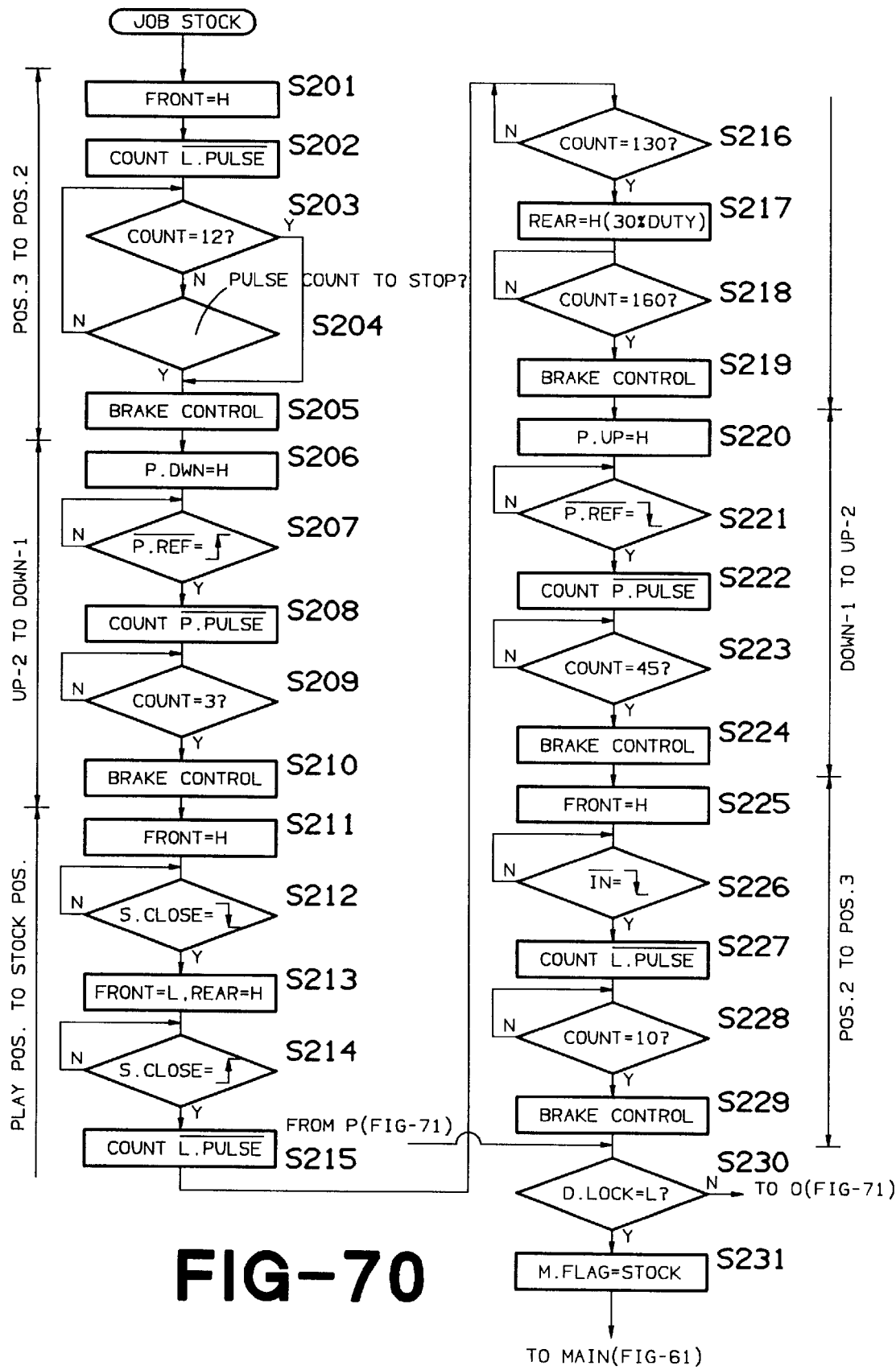
FIG. 70 is a flowchart of JOB STOCK.
Figure 71:
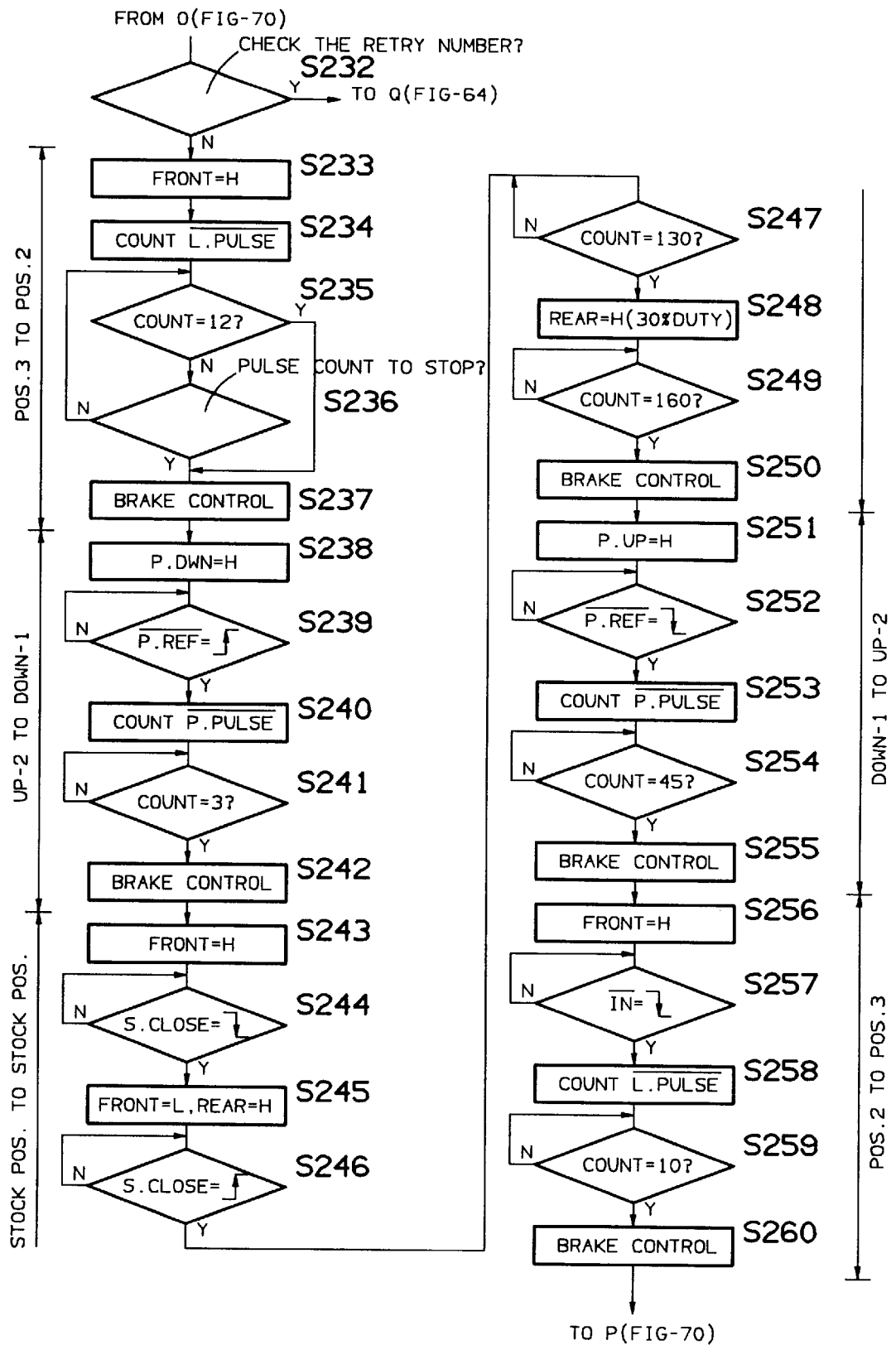
FIG. 71 is a flowchart of JOB STOCK.

If, in stand-by mode, controller 300 does not receive a read command from computer 303 for a prescribed interval, e.g. 10 minutes, then controller 300 proceeds to JOB STOCK, shown in FIGS. 70 and 71, via steps S8 and S15. In steps S201–S229, which perform the same functions as steps S121–S148 described above, the following steps are carried out: (1) Loading plates 81L, 81R are moved from open position POS.3 to support position POS.2; (2) sliding plate 75 is moved from position UP-2 to position DOWN-1; (3) disk D, at the playback position, is brought to the stock position; (4) sliding plate 75 is brought from position DOWN-1 to position UP-2; and (5) loading plates 81L, 81R are moved to open position POS.3. Then, at step S230, controller 300 checks to see if signal D.LOCK is "L", and if it is, M.FLAG is set to "STOCK" at step S231. Control then returns to the main routine.

Referring now also to FIG. 71, if at step S230 signal D.LOCK is not "L", then controller 300 proceeds to step S232. In steps S232–S260, controller 300 moves the disk, which is in an incorrect position, to a position where shutter 120 is opened, and the disk is brought again to the stock position. This re-registers the disk position. Then, controller 300 returns to step S230 shown in FIG. 70, and signal D.LOCK is checked again. The details of the functions performed in steps S232–S260 are identical to those performed in steps S121–S148 described above, so the description will be omitted here.

Other Examples of Control Routines Responsive to E/L Key Actuation During Eject State Referring to FIG. 69, in the flowchart described above, controller 300 checks to see if signal S.CLOSE is "H" at step S279. If signal S.CLOSE is "L", controller 300 stops the opening motion of the loading plates at step S280, and continues to wait for signal S.CLOSE to change to "H" at step S281. However, it would also be possible to have controller 300 return the loading plates to disk receiving position POS.1, move the sliding plate to position DOWN-2, and return to the main routine, thus ignoring the E/L key entry.

Figure 73:
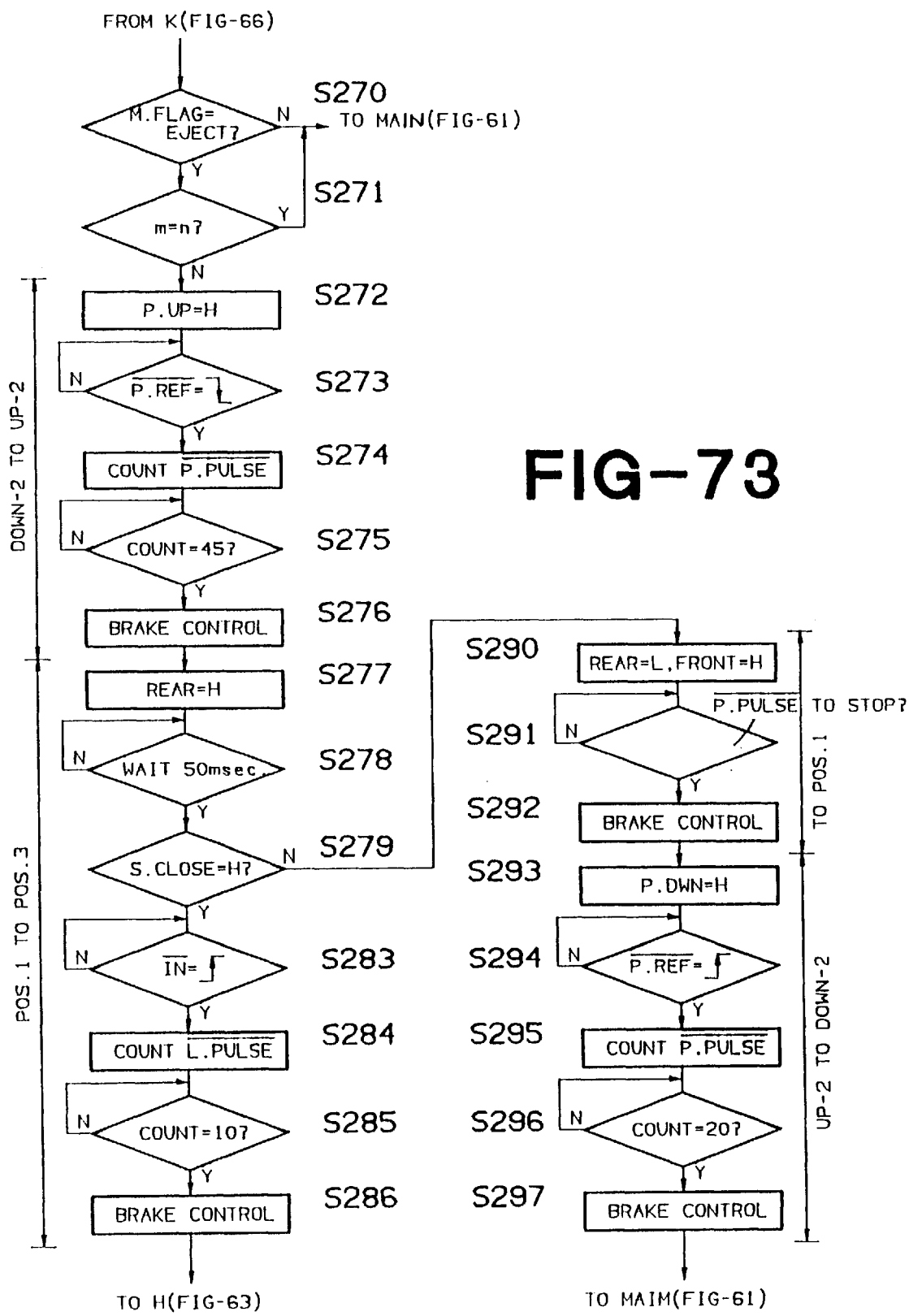
FIG. 73 is a flowchart of an alternative version of JOB EJECT. EJECT.

Thus, if signal S.CLOSE is "L", controller 300 sets signal REAR to "L" and signal FRONT to "H" at step S290 so that the loading plate is closed. Controller 300 waits for signal P. PULSE to stop at step S291. When the loading plates move to receiving position POS.1 and signal P. PULSE stops, controller 300 executes steps S293–S297, which perform the same functions as steps S82–S86 described above. Sliding plate 75 is moved from position UP-2 to position DOWN-2, and controller 300 returns to the main routine shown in FIG. 61. Steps in FIG. 73 that are identical to the steps in FIG. 63 are given the same step numbers, so their descriptions are need not be repeated here.

One of the problems addressed by the invention is stabilizing the disk during transport. This is done by urging a surface of the disk against a parallel surface of the disk guide to keep the disk in a constant pitch orientation as the disk is moved. According to a feature of the invention, this can be addressed without any damage to the recorded surface of the disk by providing that the portion of the surface of the disk urged against the parallel surface of the disk guide is restricted to an edge portion that has no recorded data. In addition, avoidance of damage to the disk is accomplished by insuring the parallel surface of the disk guide is of a low friction material. Another feature of the invention is the use of an angled surface 12B to simultaneously urge the disk toward the drive side disk guide and urge the disk toward the parallel surface of the disk guide to provide for pitch stability. As discussed above, the ideal range for this angle is in the range 45–75 degrees and the optimal, specified for the preferred embodiment with its specific design features, is about 60 degrees.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

For example, the present invention is used in a changer-type disk playback device in the above embodiment, but it would also be possible to use the invention in a single-disk playback device that does not have a stocker 1011. Also, the embodiment above transferred the disk by rotating it with a drive-side disk guide 1002 and a fixed-side disk guide 1003. However, it would also be possible to configure fixed-side disk guide 1003 in a similar manner as drive-side disk guide 1002, and to transfer the disk without rotating the disk by using a pair of belts 14.

In the embodiment described above, drive-side disk guide 1002 and fixed-side disk guide 1003 are fixed to loading chassis 80 so that they can move in parallel in a direction perpendicular to the direction of disk insertion. However, it would also be possible to have the guides supported so that they can freely rotate around the rear of the device, thus allowing motion toward the disk transfer surface toward the disk insertion opening. In this case, the axis of rotation would be positioned so that the guides do not open and close when the disk is moved, excluding tie cases when the disk is inserted or removed. Also, the embodiment described above connected the guides with pinion gear 85, but it would also be possible to fix one guide to the chassis and have only one be movably supported. If drive-side disk guide 1002 is fixed to the chassis, it could further simplify drive mechanism 1004, which drives timing pulley 15. In this case, moving belt 14 away from disk edge De becomes difficult, but the need for a spindle motor would be eliminated if disk rotation during playback can be performed by using belt 14 to drive the disk edge, and belt 14 would not have to be moved away from the outer disk perimeter.

Furthermore, in the embodiment described above, a disk at playback position is transferred to a position where the disk spindle hole is completely exposed outside of the device from the disk insertion opening. However, the position to which the disk is transferred does not have to result in the spindle hole being completely outside, as long as it is possible for the user to support the disk spindle hole and the edge. In addition, the present invention is applicable to designs in which the spindle hole is not accessible at all to the user for holding the disk since a disk can also be grasped by a user without providing access to the spindle hole. Also, in the eject state, loading plates 81L, 81R are brought to disk receiving position POS.1, but they can also be brought to an intermediate position. In this case, when the disk is removed, the two plates would move to disk receiving position POS.1 due to the action of spring 127.

The embodiment described above is a changer-type disk playback device that uses a permanent stocker that is not removable from the changer. The invention, however, is also applicable to a changer-type disk playback device that uses a removable magazine.

Also, in the device of the embodiment described above, the disk is transferred by moving timing belt 14 and rolling the disk along sloped surface 12B of friction belt 12. However, it would also be possible to have a drive pulley engageable with the disk edge disposed rotatably on the chassis, as in the disk transfer device described in Japanese laid-open publication number 61-210556. The rotation of the drive pulley would drive the disk edge, and the disk would be transferred by being rolled.

Although in the embodiment described above, the disk is in contact with an unlined surface of the disk guide, it is clear from the specification that low friction is desired and that a lining material that insures low friction could be provided on the surface 11D of the disk guide 1003. Such variations are within the scope of at least some of the claims.

Although in the embodiment of the invention described herein, a sloped surface is used to urge a surface of the disk against an orienting surface of a disk guide, it is possible that alternative urging means for urging can be employed. For example, surface 12B could be angled perpendicular to the recorded surface of the disk and provide no urging force against the surface 11D at all. To provide the urging force, a second element could be provided, that has low friction, such as a wave-spring between the surface opposite surface 11D and the disk (Refer to FIG. 6). Such alternatives are within the scopes of at least some of the claims below.

Although in the embodiment of the invention described herein, the disk is pitch stabilized and urged against a drive belt by a surface 12B that is a constant-slope flat surface, it is possible that curvilinear shapes could also be used. For example, a shape that curves around corner De could present a normal precisely at corner De that applies both a force with both disk-surface-parallel and a disk-surface-normal component. Such a curvilinear or cylindrical surface would provide faster spring rates in the disk-surface-parallel and a disk-surface-normal directions as the disk distorted the material of which a guide 12 was made. Once disadvantage of such a curved surface would be the possibility of greater abrasion on the upper disk surface.

While the embodiment above used a sloped surface for side 12B of friction belt 12, it would also be possible to have right side surface 14A of timing belt 14 be the sloped surface, and it would also be possible to have both sides 12B, 14A of the belts be sloped surfaces.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

What is claimed is:

1. A disk transfer device for transporting a recorded disk with a recorded surface, a back surface opposite said recorded surface, and an edge surface running around a perimeter of said disk, comprising:

a first longitudinal guide having a first surface oriented to engage said edge surface at a first portion of said edge surface;

said first surface having a fixed planar slope;

a second longitudinal guide having a second surface oriented to engage said edge surface at a second portion of said edge surface opposite said first portion of said edges surface;

said first longitudinal guide having a guide surface extending parallel to a direction of travel of said disk;

said guide surface also being parallel to said recorded surface; and said first longitudinal guide having a resilient element positioned to urge said first surface against said disk such that one of said recorded surface and said back surface is urged against said guide surface.

2. A device as in claim 1, wherein said first surface is a surface of said resilient element.

3. A device as in claim 2, wherein said first surface has a portion that is non-parallel with said edge surface of said disk.

4. A device as in claim 2, wherein:

said first longitudinal guide has a channel; and said first surface lies inside channel.

5. A device as in claim 1, wherein:

said first longitudinal guide has a channel; and sid first surface lies inside said channel.

6. A device as in claim 1, wherein:

said first surface is a surface of said resilient element; and said first surface has a portion that is non-parallel with said edge surface of said disk.

7. A device as in claim 1, further comprising an urging mechanism positioned to force said first and second longitudinal guides together so that a pair of constant oppositely-directed forces is applied to said disk edge surface.

8. A device as in claim 7, wherein said first surface is a surface of said resilient element.

9. A device as in claim 8, wherein said first surface has a portion that is non-parallel with said edge surface of said disk.

10. A device as in claim 8, wherein:

said first longitudinal guide has a channel; and said first surface lies inside said channel.

11. A device as in claim 7, wherein:

said first longitudinal guide has a channel; and said first surface lies inside said channel.

12. A device as in claim 7, wherein:

said first surface is a surface of said resilient element; and said first surface has a portion that is non-parallel with said edge surface of said disk.

13. A device as in claim 1, wherein one of said first and second surfaces is driven in said direction of travel to cause said disk travel.

14. A disk transfer device for transporting a recorded disk with a recorded surface, a back surface opposite said recorded surface, and an edge surface running around a perimeter of said disk, comprising:

a longitudinal guide having a first surface oriented to engage said edge surface;

an urging mechanism and a second surface, both being oriented to engage said disk edge and urge said edge surface against said first surface;

said longitudinal guide having a guide surface extending parallel to a direction of travel of said disk;

said guide surface also being parallel to said recorded surface; and said first surface having a fixed planar slope which is non-parallel with said edge surface of said disk such that said first surface urges one of said recorded surface and said back surface against said guide surface.

15. A device as in claim 14, said first surface has a portion that forms an angle between 45 and 75 degrees with said recorded surface.

16. A device as in claim 15, wherein said portion of said first surface is positioned to engage a corner of said disk where said edge surface meets one of said recorded surface and said back surface.

17. A device as in claim 14, further comprising:

a resilient element attached to said longitudinal guide; and said first surface being a surface portion of said resilient element.

18. A device as in claim 17, wherein said first surface has a portion that forms an angle between 45 and 75 degrees with said recorded surface.

19. A device as in claim 18, wherein said portion of said first surface is positioned to engage a corner of said disk where said edge surface meets one of said recorded ace and said back surface.

20. A device as in claim 19, wherein said guide surface engages an edge portion of said recorded surface on which no data is recorded.

21. A device as in claim 14, wherein said urging mechanism is a another longitudinal guide.

22. A disk transporting device for transporting a disk, with an edge, a recorded surface, and a back surface opposite said recorded surface, from an insertion position to a first position of said device, comprising:

first and second disk transfer guides movably supported in said device;

said first disk transfer guide including first means for engaging a first portion of said edge;

said second disk transfer guide including second means for engaging a second portion of said edge;

means for urging said first and second disk transfer guides toward one another so that said disk can be supported therebetween;

at least one of said first and second disk transfer guides including drive means for moving said disk along said first and second disk transfer guides;

one of said first and second disk guides having an urging surface and a guiding surface; and said urging surface having a fixed planar sloped portion positioned to engage said edge at a corner thereof, said fixed planar sloped portion being oriented to urge said disk toward the other of said first and second disk guides and also urge one of said recorded back surfaces against said guide surface.

23. A device as in claim 22, wherein an orientation of said guide surface is such as to maintain a constant pitch angle of said disk as said disk is transported.

24. A device as in claim 23, wherein said guide surface engages an edge portion of said recorded surface on which no data is recorded.

25. A device as in claim 22, further comprising:

a resilient element with a surface on said one of said first and second disk guides;

said urging surface is a portion of said surface of said resilient element.

26. A device as in claim 25, wherein an orientation of said guide surface is such as to maintain a constant pitch angle of said disk as said disk is transported.

27. A device as in claim 26, wherein said guide surface engages an edge portion of said recorded surface on which no data is recorded.

28. A disk device as in claim 22, wherein said fixed planar sloped portion is oriented to urge said back surface of said disk against said guiding surface, said guiding surface being substantially parallel to said back surface of said disk.

29. A disk device as in claim 22, wherein said first and second disk transfer guides are longitudinal guides extending in a common direction.

30. A disk device as in claim 22, wherein said first and second disk transfer guides are longitudinal guides extending in a common direction from said insertion position to said first position; and said fixed planar sloped portion is oriented to urge said back surface of said disk against said guiding surface, said guiding surface being substantially parallel to said back surface of said disk.

31. A disk transporting device for transporting a disk, with an edge, a recorded surface, and a back surface opposite said recorded surface, from an insertion position to a first position of said device, comprising:

a first longitudinal disk transfer guide;

a second longitudinal disk transfer guide;

said first and second longitudinal disk transfer guides are substantially parallel to one another;

said first and second disk transfer guides are movably supported in said device;

said first disk transfer guide including first means for engaging a first portion of said edge;

said second disk transfer guide including second means for engaging a second portion of said edge;

means for urging said first and second disk transfer guides toward one another such that said disk can be supported therebetween;

one of said first and second disk transfer guides including drive means for moving said disk along said first and second disk transfer guides;

one of said first and second disk guides having an urging surface and a guiding surface, said guiding surface having a flat portion which is substantially parallel to said back surface of said disk; and said urging surface having a fixed planar sloped portion positioned to engage said edge at a corner thereof, said fixed planar sloped portion being oriented to urge said disk toward the other of said first and second disk guides and also urge one of said recorded back surfaces against said flat portion.

* * * * *